US008743047B2

(12) United States Patent
Kawabata et al.

(10) Patent No.: US 8,743,047 B2
(45) **Date of Patent: *Jun. 3, 2014**

(54) LIQUID CRYSTAL DISPLAY DEVICE, METHOD FOR DRIVING LIQUID CRYSTAL DISPLAY DEVICE, AND TELEVISION RECEIVER

(75) Inventors: Masae Kawabata, Osaka (JP); Fumikazu Shimoshikiryoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 228 days.

This patent is subject to a terminal disclaimer.

(21) Appl. No.: 12/998,731

(22) PCT Filed: Oct. 5, 2009

(86) PCT No.: PCT/JP2009/067363

§ 371 (c)(1),
(2), (4) Date: May 25, 2011

(87) PCT Pub. No.: WO2010/061687

PCT Pub. Date: Jun. 3, 2010

(65) Prior Publication Data

US 2011/0221972 A1 Sep. 15, 2011

(30) Foreign Application Priority Data

Nov. 26, 2008 (JP) ................................ 2008-301290

(51) Int. Cl.

| | |
|---|---|
| ***G09G 3/36*** | (2006.01) |
| ***G09G 5/00*** | (2006.01) |
| ***G06F 3/038*** | (2013.01) |
| ***G09G 5/10*** | (2006.01) |

(52) U.S. Cl.
USPC ............. 345/103; 345/204; 345/690; 345/87; 345/94; 345/96

(58) Field of Classification Search
USPC ................................... 345/204, 690, 87–104
See application file for complete search history.

(56) References Cited

U.S. PATENT DOCUMENTS 4,792,857 A * 12/1988 Akiyama ...................... 348/793
5,457,474 A 10/1995 Ikeda (Continued)

FOREIGN PATENT DOCUMENTS

CN 101131808 2/2008
CN 101320179 12/2008

(Continued)

OTHER PUBLICATIONS

U.S. Office Action issued in U.S. Appl. No. 12/998,698 dated May 6, 2013.

(Continued)

*Primary Examiner* — Ilana Spar
(74) *Attorney, Agent, or Firm* — Harness, Dickey & Pierce, P.L.C.

(57) ABSTRACT

At least one embodiment of a liquid crystal display device including: pixels each of which includes a plurality of sub-pixels; and scanning signal lines provided in a display area, the scanning signal lines being divided into groups each of which includes a plurality of scanning signal lines, the groups being sequentially selected, the polarity POL of signal electric potentials being inverted when the selected group is changed from a preceding group to a succeeding group which is selected immediately after the preceding group, a plurality of (for example, two) dummy scanning periods being inserted between a horizontal scanning period corresponding to last horizontal scanning (scanning of G23) in the preceding group and a horizontal scanning period corresponding to first horizontal scanning (scanning of G2) in the succeeding group, and a scanning signal line (for example, G2) which belongs to a group selected after the preceding group being subjected to dummy scanning during each dummy scanning period so as to be made active for a predetermined period of time, and then deactivated. With the arrangement, it is possible to suppress horizontal-shaped unevenness that occurs in a case where block inversion driving is carried out in a multi-pixel mode liquid crystal display device.

38 Claims, 45 Drawing Sheets

(56) References Cited

U.S. PATENT DOCUMENTS

| | | | | |
|---|---|---|---|---|
| 5,699,076 | A * | 12/1997 | Tomiyasu | 345/103 |
| 6,335,719 | B1 * | 1/2002 | An et al. | 345/98 |
| 6,791,566 | B1 | 9/2004 | Kuratomi et al. | |
| 6,903,716 | B2 * | 6/2005 | Kawabe et al. | 345/99 |
| 2001/0022565 | A1 | 9/2001 | Kimura | |
| 2002/0030647 | A1 | 3/2002 | Hack et al. | |
| 2003/0090449 | A1 | 5/2003 | Arimoto et al. | |
| 2003/0201955 | A1 | 10/2003 | Song et al. | |
| 2003/0227429 | A1 | 12/2003 | Shimoshikiryo | |
| 2005/0036075 | A1 | 2/2005 | Taoka et al. | |
| 2005/0213015 | A1 | 9/2005 | Shimoshikiryo | |
| 2006/0007094 | A1 | 1/2006 | Kang et al. | |
| 2006/0023137 | A1 | 2/2006 | Kamada et al. | |
| 2006/0041805 | A1 | 2/2006 | Song | |
| 2006/0256271 | A1 | 11/2006 | Shimoshikiryo | |
| 2007/0052643 | A1 | 3/2007 | Li et al. | |
| 2007/0229447 | A1 | 10/2007 | Takahara et al. | |
| 2008/0012840 | A1 | 1/2008 | Higashino et al. | |
| 2008/0191985 | A1 | 8/2008 | Katayama et al. | |
| 2009/0085860 | A1 * | 4/2009 | Huang et al. | 345/102 |
| 2009/0167964 | A1 | 7/2009 | Lebrun et al. | |
| 2010/0045708 | A1 | 2/2010 | Higashino | |
| 2010/0097366 | A1 | 4/2010 | Kitayama et al. | |
| 2010/0118012 | A1 | 5/2010 | Irie et al. | |
| 2011/0063330 | A1 | 3/2011 | Bae et al. | |
| 2011/0170014 | A1 | 7/2011 | Irie et al. | |
| 2011/0221970 | A1 | 9/2011 | Kawabata et al. | |
| 2011/0221971 | A1 * | 9/2011 | Shimoshikiryoh et al. | 348/731 |

FOREIGN PATENT DOCUMENTS

| | | | |
|---|---|---|---|
| CN | 102160108 | | 8/2011 |
| EP | 1286202 | | 2/2003 |
| FR | 2 894 369 | | 6/2007 |
| JP | 06-222330 | | 8/1994 |
| JP | 07-134572 | | 5/1995 |
| JP | 11352938 | A | 12/1999 |
| JP | 2000-098343 | | 4/2000 |
| JP | 2002-055675 | | 2/2002 |
| JP | 2002-123209 | | 4/2002 |
| JP | 2002-140029 | | 5/2002 |
| JP | 2002-251170 | | 9/2002 |
| JP | 2004-004857 | | 1/2004 |
| JP | 200446236 | | 2/2004 |
| JP | 200462146 | | 2/2004 |
| JP | 2004046236 | A * | 2/2004 |
| JP | 2004-294540 | | 10/2004 |
| JP | 2006-003877 | A | 1/2006 |
| JP | 2006-030834 | | 2/2006 |
| JP | 200639290 | | 2/2006 |
| JP | 2006039542 | A | 2/2006 |
| JP | 2007-025239 | | 2/2007 |
| JP | 2007-286135 | | 11/2007 |
| JP | 2008-107369 | | 5/2008 |
| JP | 2008-145471 | | 6/2008 |
| JP | 200151252 | | 2/2011 |
| KR | 2008-0086617 | | 9/2008 |
| WO | WO 02063384 | | 8/2002 |
| WO | WO 2008/065773 | | 6/2008 |
| WO | WO-2008139693 | A1 | 11/2008 |
| WO | WO-2008139695 | A1 | 11/2008 |

OTHER PUBLICATIONS

U.S. Office Action issued in U.S. Appl. No. 12/998,833 dated Feb. 13, 2013.

Hori, Hiroo, and Koji Suzuki, eds., Series Advanced Display Technologies 2-Color Liquid Crystal Display, Kyoritsu Shuppan Col, Ltd. 1st Ed. Jun. 25, 2001, pp. 247-248.

U.S. Office Action issued in U.S. Appl. No. 12/998,833 dated Sep. 17, 2012.

U.S. Office Action issued in U.S. Appl. No. 12/998,725 dated May 3, 2013.

European Search Report dated Apr. 12, 2012, issued in International Application No. 09828934.1.

U.S. Office Action issued in U.S. Appl. No. 12/998,725, dated May 3, 2013.

U.S. Advisory Action issued in U.S. Appl. No. 12/998,833, dated Jun. 4, 2013.

U.S. Office Action dated Sep. 4, 2013, issued in U.S. Appl. No. 12/998,725.

U.S. Advisory Action dated Dec. 13, 2013, issued in U.S. Appl. No. 12/998,725.

U.S. Notice of Allowance dated Jan. 17, 2014, issued in U.S. Appl. No. 12/998,725.

* cited by examiner

LIQUID CRYSTAL DISPLAY DEVICE, METHOD FOR DRIVING LIQUID CRYSTAL DISPLAY DEVICE, AND TELEVISION RECEIVER

TECHNICAL FIELD

The present invention relates to driving (block inversion driving) in which a polarity of signal electric potentials supplied to a data signal line is inverted every plural horizontal scanning periods.

BACKGROUND ART

Liquid crystal display devices have excellent features such as high definition, low profile, light weight, and low power consumption. In recent years, a market scale of liquid crystal display devices has been rapidly increasing. In liquid crystal display devices, dot inversion driving in which a polarity of signal electric potentials supplied to a data signal line is inverted every 1 horizontal scanning period has been widely employed. However, in the dot inversion driving, polarity inversion frequency of the data signal line becomes high. This results in occurrence of problems such as reduction in pixel charging rate and increase in power consumption. In view of this, Patent Literature 1 for example proposes block inversion driving in which a polarity of signal electric potentials supplied to a data signal line is inverted every plural horizontal scanning periods. This block inversion driving allows an improvement in pixel charging rate and suppression of power consumption and heat generation, as compared with the dot inversion driving.

Patent Literature 1 discloses an arrangement in which a dummy scanning period is inserted immediately after polarity inversion in block inversion driving as shown in FIG. 46. According to the arrangement, a dummy scanning period (third horizontal scanning period in FIG. 46) for pre-charging and a horizontal scanning period (fourth horizontal scanning period in FIG. 46) for main charging (writing) are assigned to data (n+2) that comes immediately after the polarity inversion. This allows an increase in charging rate of a pixel corresponding to the data (n+2).

As a measure for improving viewing angle dependence of gamma characteristics (for example, holding down excess brightness and the like in a screen), Patent Literatures 2 and 3 for example disclose an arrangement in which a plurality of sub-pixels in a pixel are controlled to have different brightness so that a halftone is displayed by an area coverage modulation of these sub-pixels (multi-pixel mode).

CITATION LIST

Patent Literature 1

Japanese Patent Application Publication, Tokukai, No. 2001-51252 (Publication Date: Feb. 23, 2001)

Patent Literature 2

Japanese Patent Application Publication, Tokukai, No. 2004-62146 (Publication Date: Feb. 26, 2004)

Patent Literature 3

Japanese Patent Application Publication, Tokukai, No. 2006-39290 (Publication Date: Feb. 9, 2006)

SUMMARY OF INVENTION

Technical Problem

However, the inventors of the present invention found that the arrangement of FIG. 46 has the following problem. For example, load applied to a scanning signal line driving circuit during a horizontal scanning period H1 is Lz, load applied to the scanning signal line driving circuit during horizontal scanning periods H2 and H3 is Ly, and load applied to the scanning signal line driving circuit during horizontal scanning periods H4 and H5 is Lz where Ly represents load applied to the scanning signal line driving circuit while a single scanning signal line is being active, and Lz represents load applied to the scanning signal line driving circuit while two scanning signal lines are being active.

Accordingly, before scanning for writing of data (n+1) during the horizontal scanning period H2, load applied to the scanning signal line driving circuit is Lz, and during the scanning, load applied to the scanning signal line driving circuit is Ly. Before scanning for writing of the data (n+2) during the horizontal scanning period H4, load applied to the scanning signal line driving circuit is Ly, and during the scanning, load applied to the scanning signal line driving circuit is Lz. Before scanning for writing of the data (n+3) during the horizontal scanning period H5, load applied to the scanning signal line driving circuit is Lz, and during the scanning, load applied to the scanning signal line driving circuit is Lz.

In a case where there is variation in load applied to the scanning signal line driving circuit before and during scanning as above, there occurs a variation in electric potentials (and in display state) written into pixels even if the data (n+1), data (n+2), and data (n+3) are identical data. This may be viewed as stripe-shaped unevenness.

The present invention was attained in view of the above problem, and an object of the present invention is to reduce stripe-shaped unevenness and improve a display quality in a liquid crystal display device which carries out block inversion driving in the multi-pixel mode.

Solution to Problem

The present liquid crystal display device includes: pixels each of which is provided in a display area and includes a plurality of sub-pixels; and scanning signal lines provided in the display area; the scanning signal lines being divided into groups each of which includes a plurality of scanning signal lines, the groups being sequentially selected, signal electric potentials of an identical polarity being sequentially supplied to a data signal line while scanning signal lines belonging to a selected group are sequentially scanned horizontally, the polarity of the signal electric potentials being inverted when the selected group is changed from a preceding group to a succeeding group which is selected immediately after the preceding group, a dummy scanning period or a plurality of dummy scanning periods being inserted between a horizontal scanning period corresponding to last horizontal scanning in the preceding group and a horizontal scanning period corresponding to first horizontal scanning in the succeeding group, and a scanning signal line which belongs to a group selected after the preceding group is subjected to dummy scanning during the dummy scanning period so that the scanning signal line is made active for a predetermined period of time, and is then deactivated.

The term "horizontal scanning" used herein means that a scanning signal line is activated during a corresponding horizontal scanning period. Activation of a scanning signal line during a horizontal scanning period that does not correspond to the scanning signal line for the purpose of pre-charging etc. is not referred to as "horizontal scanning". Similarly, the term "dummy scanning" used herein means that a dummy scanning signal line is activated during a corresponding dummy scanning period.

According to the arrangement, in a case where a dummy scanning period is inserted immediately after polarity inversion of electric potentials supplied to a data signal line, a status of load applied to a scanning signal line driving circuit during a horizontal scanning period can be made identical to a status of load applied to the scanning signal line driving circuit during a dummy scanning period. Accordingly, a status of load applied to the scanning signal line driving circuit before and during scanning of one scanning signal line can be made identical to a status of load applied to the scanning signal line driving circuit before and during scanning of another scanning signal line. As a result, in a multi-pixel mode liquid crystal display device, it is possible to reduce a difference in charging rate between (i) pixels connected to scanning signal lines that are subjected to horizontal scanning before and after polarity inversion of electric potentials and (ii) the other pixels, thereby suppressing horizontal-striped unevenness which has been a problem in a case where block inversion driving is carried out.

The present liquid crystal display device may be arranged so as to further include: pixel electrodes; and storage capacitor wires respectively provided corresponding to the pixel electrodes, a single pixel electrode being provided for each of the plurality of sub-pixels, and storage capacitor wire signals respectively supplied to the storage capacitor wires controlling brightness of the plurality of sub-pixels, respectively.

The present liquid crystal display device may be arranged such that a storage capacitor wire signal supplied to a storage capacitor wire is not level-shifted during writing of a signal electric potential into a pixel electrode that forms capacitance with the storage capacitor wire, and is level-shifted to a positive side or a negative side relative to a reference electric potential in synchronization with or after end of the writing.

The present liquid crystal display device may be arranged such that a storage capacitor wire signal supplied to a storage capacitor wire that forms capacitance with one of two pixel electrodes included in a pixel is level-shifted in a direction opposite to a direction in which a storage capacitor wire signal supplied to a storage capacitor wire that forms capacitance with the other one of the two pixel electrodes is level-shifted.

The present liquid crystal display device may be arranged such that the storage capacitor wire signal has a level that is switched every predetermined period of time until one vertical scanning period elapses from the level-shift.

The present liquid crystal display device may be arranged such that the storage capacitor wire signal maintains a same level until one vertical scanning period elapses from the level-shift.

The present liquid crystal display device may be arranged so as to further include: a plurality of storage capacitor main wires to which different storage capacitor wire signals are supplied, each of the storage capacitor wires being connected to any one of the plurality of storage capacitor main wires.

The present liquid crystal display device may be arranged such that a single storage capacitor wire is provided per gap between two pixels that are adjacent in a direction in which the data signal line extends, and the single storage capacitor wire forms capacitance with a pixel electrode disposed in one of the two pixels and forms capacitance with a pixel electrode disposed in the other one of the two pixels.

The present liquid crystal display device may be arranged such that a dummy electric potential is supplied to the data signal line during the dummy scanning period. It is desirable that a polarity of the dummy electric potential is identical to the polarity of the electric potentials in the succeeding group.

The present liquid crystal display device may be arranged such that video data that correspond to respective horizontal scanning of the scanning signal lines are arranged in an order identical to that of the horizontal scanning, 1st through n-th dummy data is inserted between video data corresponding to the last horizontal scanning in the preceding group and video data corresponding to the first horizontal scanning in the succeeding group, the signal electric potentials correspond to the video data, respectively, and the dummy electric potential corresponds to the dummy data. The dummy data may be identical to the video data corresponding to horizontal scanning carried out immediately after the dummy scanning of the scanning signal line subjected to the dummy scanning. Alternatively, the dummy data may be identical to the video data corresponding to horizontal scanning carried out immediately before the dummy scanning of the scanning signal line subjected to the dummy scanning.

The present liquid crystal display device may be arranged such that a time interval between start of a horizontal scanning period and start of horizontal scanning is equal to a time interval between start of the dummy scanning period and start of the dummy scanning, and a time interval between end of horizontal scanning and end of a horizontal scanning period is equal to a time interval between end of the dummy scanning and end of the dummy scanning period.

The present liquid crystal display device may be arranged such that in a case where the plurality of dummy scanning periods are inserted between the horizontal scanning period corresponding to the last horizontal scanning in the preceding group and the horizontal scanning period corresponding to the first horizontal scanning in the succeeding group, different scanning signal lines are subjected to dummy scanning during the plurality of dummy scanning periods. Alternatively, the present liquid crystal display device may be arranged such that an identical scanning signal line is subjected to dummy scanning during the plurality of dummy scanning periods. The scanning signal lines subjected to dummy scanning may belong to the succeeding group. Further, the scanning signal lines subjected to dummy scanning may include a scanning signal line which is a first one to be subjected to horizontal scanning in the succeeding group. Further, the scanning signal lines subjected to dummy scanning may include a scanning signal line which belongs to a group selected after the succeeding group.

The present liquid crystal display device may be arranged such that each of the scanning signal lines is activated in synchronization with start of corresponding horizontal scanning, and is deactivated in synchronization with end of the corresponding horizontal scanning. In this case, the present liquid crystal display device may be arranged such that the scanning signal line subjected to dummy scanning is activated in synchronization with start of the dummy scanning of the scanning signal line, and is deactivated in synchronization with end of the dummy scanning of the scanning signal line. Further, the present liquid crystal display device may be arranged such that a width of a gate pulse for activating each of the scanning signal lines is equal to a single horizontal scanning period.

The present liquid crystal display device may be arranged such that each of the scanning signal lines is activated in synchronization with start of horizontal scanning or dummy scanning carried out immediately before corresponding horizontal scanning, and is deactivated in synchronization with end of the corresponding horizontal scanning. In this case, the present liquid crystal display device may be arranged such that the scanning signal line subjected to dummy scanning is activated in synchronization with start of horizontal scanning or dummy scanning carried out immediately before corresponding dummy scanning, and is deactivated in synchronization with end of the corresponding dummy scanning. Further, the present liquid crystal display device may be arranged such that a width of a gate pulse for activating each of the scanning signal lines is two times as wide as a single horizontal scanning period.

The present liquid crystal display device may be arranged such that a timing adjustment scanning period is inserted between a predetermined horizontal scanning period and a horizontal scanning period or a dummy scanning period which comes next after the predetermined horizontal scanning period, and a scanning signal line is subjected to timing adjustment scanning during the timing adjustment scanning period so as to be made active for a predetermined period of time, and is then deactivated.

The present liquid crystal display device may be arranged such that a timing adjustment scanning period is inserted between a predetermined horizontal scanning period and a horizontal scanning period or a dummy scanning period which comes next after the predetermined horizontal scanning period, and a dummy scanning signal line provided in a non-display area is subjected to timing adjustment scanning during the timing adjustment scanning period so as to be made active for a predetermined period of time, and is then deactivated.

The present liquid crystal display device may be arranged such that the dummy scanning period or the plurality of dummy scanning periods and the timing adjustment scanning period are inserted between a horizontal scanning period corresponding to last horizontal scanning in a next-to-last group and a horizontal scanning period corresponding to first horizontal scanning in a last group.

The present liquid crystal display device may be arranged such that one of the preceding group and the succeeding group includes only odd-numbered scanning signal lines, and the other one of the preceding group and the succeeding group includes only even-numbered scanning signal lines in a case where a predetermined scanning signal line in the display area is a first scanning signal line in counting.

In this case, the present liquid crystal display device may be arranged such that the predetermined scanning signal line and subsequent scanning signal lines in the display area are divided into blocks by borders parallel to the scanning signal lines, a group that is selected first is constituted by odd-numbered scanning signal lines included in a most upstream side block or constituted by even-numbered scanning signal lines included in the most upstream side block, the most upstream side block including the predetermined scanning signal line and being disposed at one end, a group that is selected last is constituted by odd-numbered scanning signal lines included in a most downstream side block or constituted by even-numbered scanning signal lines included in the most downstream side block, the most downstream side block being disposed at the other end, each of groups other than the group that is selected first and the group that is selected last is constituted by even-numbered scanning signal lines included in adjacent two blocks or constituted by odd-numbered scanning signal lines included in adjacent two blocks, and the groups are sequentially selected in an order from an upstream side to a downstream side.

Further, the present liquid crystal display device may be arranged such that the predetermined scanning signal line and subsequent scanning signal lines in the display area are divided into blocks by borders parallel to the scanning signal lines, the preceding group includes odd-numbered scanning signal lines included in one of the blocks and the succeeding group includes even-numbered scanning signal lines included in the one of the blocks, or the preceding group includes even-numbered scanning signal lines included in one of the blocks and the succeeding group includes odd-numbered scanning signal lines included in the one of the blocks, and the groups are selected in an order from a group included in a most upstream side block to a group included in a most downstream block, the most upstream side block including the predetermined scanning signal line and being disposed at one end, and the most downstream block being disposed at the other end.

The present liquid crystal display device may be arranged such that a predetermined scanning signal line and subsequent scanning signal lines in the display area are divided into blocks by borders parallel to the scanning signal lines, scanning signal lines in each of the blocks constitute a group, and groups thus created are sequentially selected in an order from a group constituted by scanning signal lines in a most upstream side block to a group constituted by scanning signal lines in a most downstream side block, the most upstream side block including the predetermined scanning signal line and being disposed at one end, and the most downstream block being disposed at the other end.

A liquid crystal display device of the present invention includes: a plurality of pixels each of which includes a plurality of sub-pixels; a plurality of data signal lines; and a plurality of scanning signal lines; signal electric potentials of a first polarity being supplied to the plurality of data signal lines during a first period constituted by a plurality of horizontal scanning periods, and signal electric potentials of a second polarity being supplied to the plurality of data signal lines during a second period constituted by a plurality of successive horizontal scanning periods, the second period coming next after the first period; and during a dummy scanning period inserted between the first period and the second period, scanning signal lines of the same number as scanning signal lines activated in each horizontal scanning period being made active for a predetermined period of time, and being then deactivated. In this case, the liquid crystal display device may be arranged such that during a horizontal scanning period within the second period or after the second period, the scanning signal lines that are made active during the dummy scanning period are made active for a predetermined period of time, and are then deactivated. Further, the liquid crystal display device may be arranged such that during a horizontal scanning period within the second period which horizontal scanning period is not a first one among the horizontal scanning periods of the second period, the scanning signal lines that are active during the dummy scanning period are made active for a predetermined period of time, and are then deactivated. Further, the liquid crystal display device may be arranged such that a dummy electric potential of the second polarity is supplied to the plurality of data signal lines during the dummy scanning period. Further, the liquid crystal display device may be arranged such that during a timing adjustment scanning period inserted between a predetermined horizontal scanning period and a horizontal scanning period or a dummy scanning period which comes next after the predetermined horizontal scanning period, scanning signal lines of the same number as scanning signal lines activated in each horizontal scanning period being made active for a predetermined period of time, and being then deactivated.

A method for driving the present liquid crystal display device which includes scanning signal lines disposed in a display area, the scanning signal lines being divided into groups each of which includes a plurality of scanning signal lines, the groups being sequentially selected, and signal electric potentials of an identical polarity being sequentially supplied to a data signal line while scanning signal line belonging to a selected group are sequentially scanned horizontally, includes the steps of: inverting the polarity of the signal electric potentials when the selected group is changed from a preceding group to a succeeding group which is selected immediately after the preceding group, inserting a dummy scanning period between a horizontal scanning period corresponding to last horizontal scanning in the preceding group and a horizontal scanning period corresponding to first horizontal scanning in the succeeding group, and causing a scanning signal line which belongs to a group selected after the preceding group to be subjected to dummy scanning during the dummy scanning period so that the scanning signal line is made active for a predetermined period of time, and is then deactivated.

The present television receiver includes the liquid crystal display device and a tuner section which receives television broadcast.

Advantageous Effects of Invention

As described above, according to the present liquid crystal display device, in a case where a dummy scanning period is inserted immediately after inversion of a polarity of electric potentials supplied to a data signal line, a status of load applied to a scanning signal line driving circuit during a horizontal scanning period can be made identical to a status of load applied to the scanning signal line driving circuit during a dummy scanning period. Accordingly, a status of load applied to the scanning signal line driving circuit before and during scanning of one scanning signal line can be made identical to a status of load applied to the scanning signal line driving circuit before and during scanning of another scanning signal line. As a result, in a multi-pixel mode liquid crystal display device, it is possible to reduce a difference in charging rate between (i) pixels connected to scanning signal lines that are subjected to horizontal scanning before and after inversion of electric potentials and (ii) the other pixels, thereby suppressing horizontal-striped unevenness which has been a problem in a case where block inversion driving is carried out.

DESCRIPTION OF EMBODIMENTS

Embodiments of the present invention are described below with reference to FIGS. 1 through 45. FIG. 3 is a view schematically illustrating a display area of the present liquid crystal display device (e.g., normally black mode). As shown in FIG. 3, in the display area of the present liquid crystal display device, scanning signal lines (G1 through G1080), and storage capacitor wires (CS1 through CS1081) parallel to the scanning signal lines are provided. A single pixel includes two sub-pixels aligned in a column direction (a direction in which the data signal lines extend), and a single pixel electrode is provided per sub-pixel. A single storage capacitor wire is provided per gap between two pixels adjacent in the column direction, and forms capacitance with one of pixel electrodes provided in one of the two pixels and forms capacitance with one of pixel electrodes provided in the other one of the two pixels.

Specifically, the storage capacitor wires CS1 and CS1081 are provided on both ends of the pixel column, respectively, and a single storage capacitor wire CS(i+1) is provided corresponding to a gap between a pixel Pi (i is an integer in a range from 1 to 1079) and a pixel P(i+1). Note that the pixel Pi is an i-th pixel in the pixel column. Further, the pixel Pi (i is an integer in a range from 1 to 1080) has two pixel electrodes each of which is connected to a scanning signal line G1 and a data signal line SL via a transistor. One of the two pixel electrodes forms storage capacitance with a storage capacitor wire CSi, and the other one of the two pixel electrodes forms storage capacitance with the storage capacitor wire CS(i+1).

For example, the storage capacitor wire CS1 is provided on one end (upstream side) of the pixel column, the storage capacitor wire CS2 is provided corresponding to a gap between a pixel P1 and a pixel P2, and the storage capacitor wire CS3 is provided corresponding to a gap between the pixel P2 and a pixel P3. The pixel P1 has two pixel electrodes each of which is connected to the scanning signal line G1 and the data signal line SL via a transistor, one of the two pixel electrodes forming storage capacitance with the storage capacitor wire CS1, and the other one of the two pixel electrodes forming storage capacitance with the storage capacitor wire CS2. Further, the pixel P2 has two pixel electrodes each of which is connected to the scanning signal line G2 and the data signal line SL via a transistor, one of the two pixel electrodes forming storage capacitance with the storage capacitor wire CS2, and the other one of the two pixel electrodes forming storage capacitance with the storage capacitor wire CS3.

Embodiment 1

Figure 1:
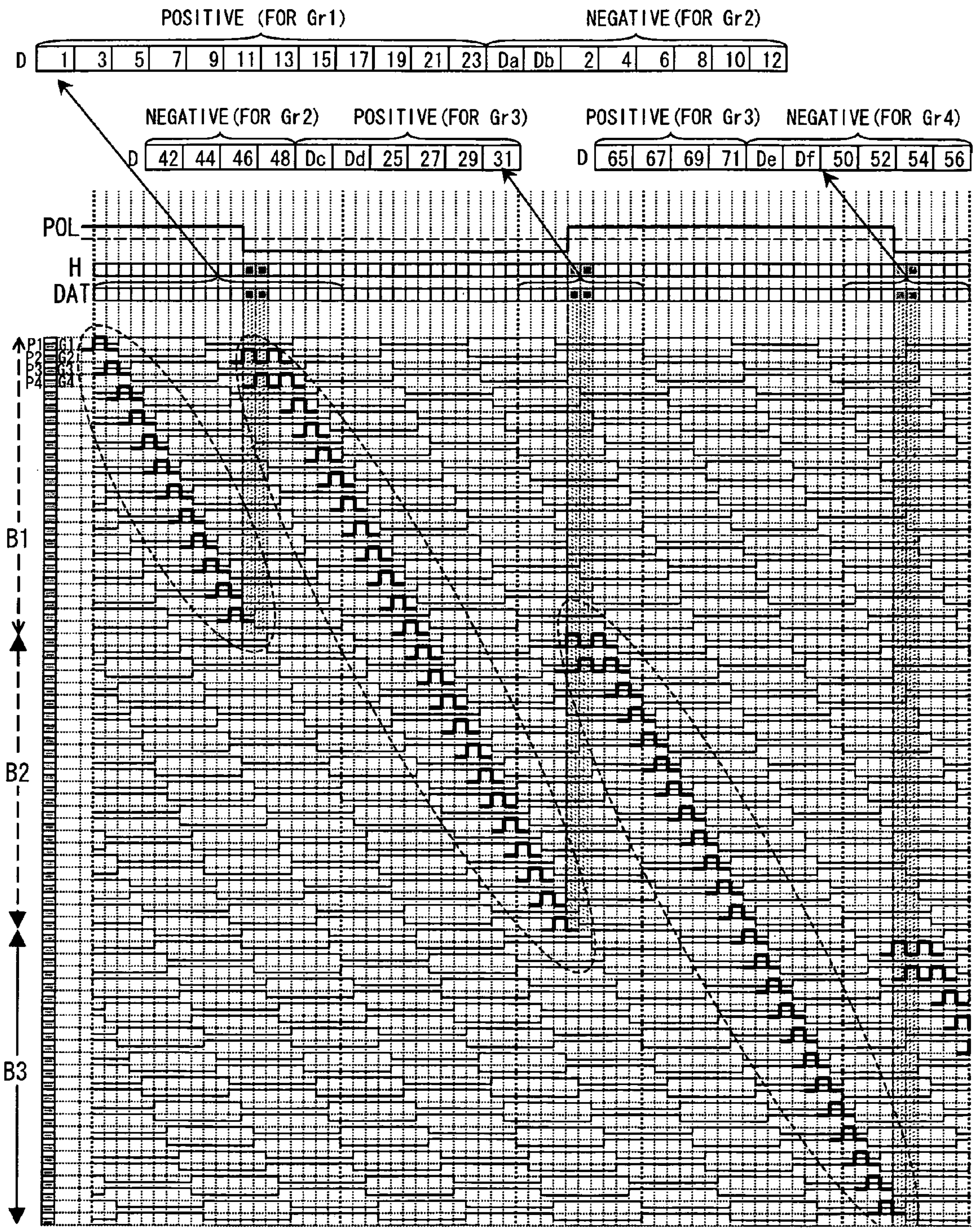
FIG. 1 is a timing chart showing an exemplary driving of a liquid crystal display device of Embodiment 1.
Figure 2:
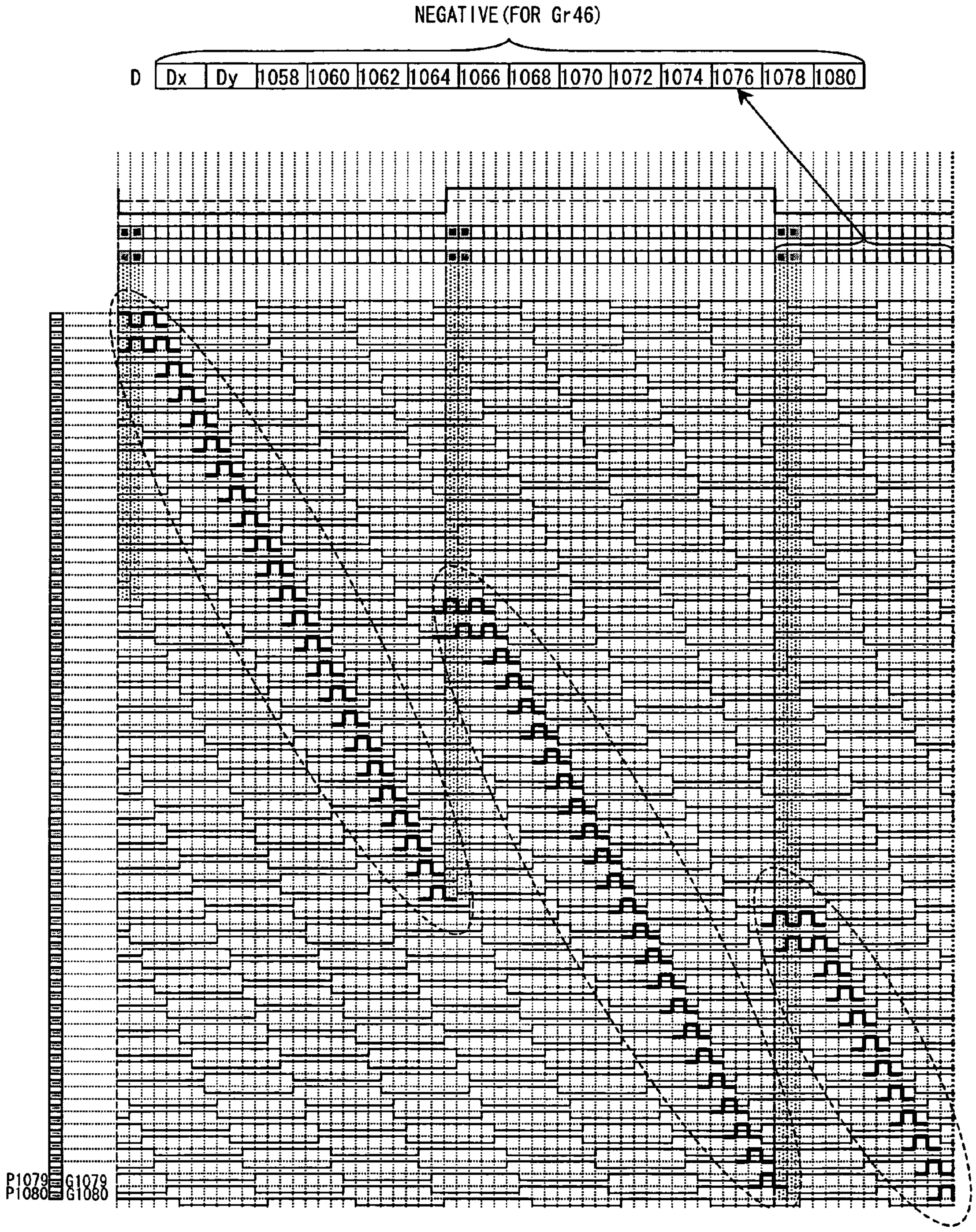
FIG. 2 is a continuation of the timing chart of FIG. 1.
Figure 3:
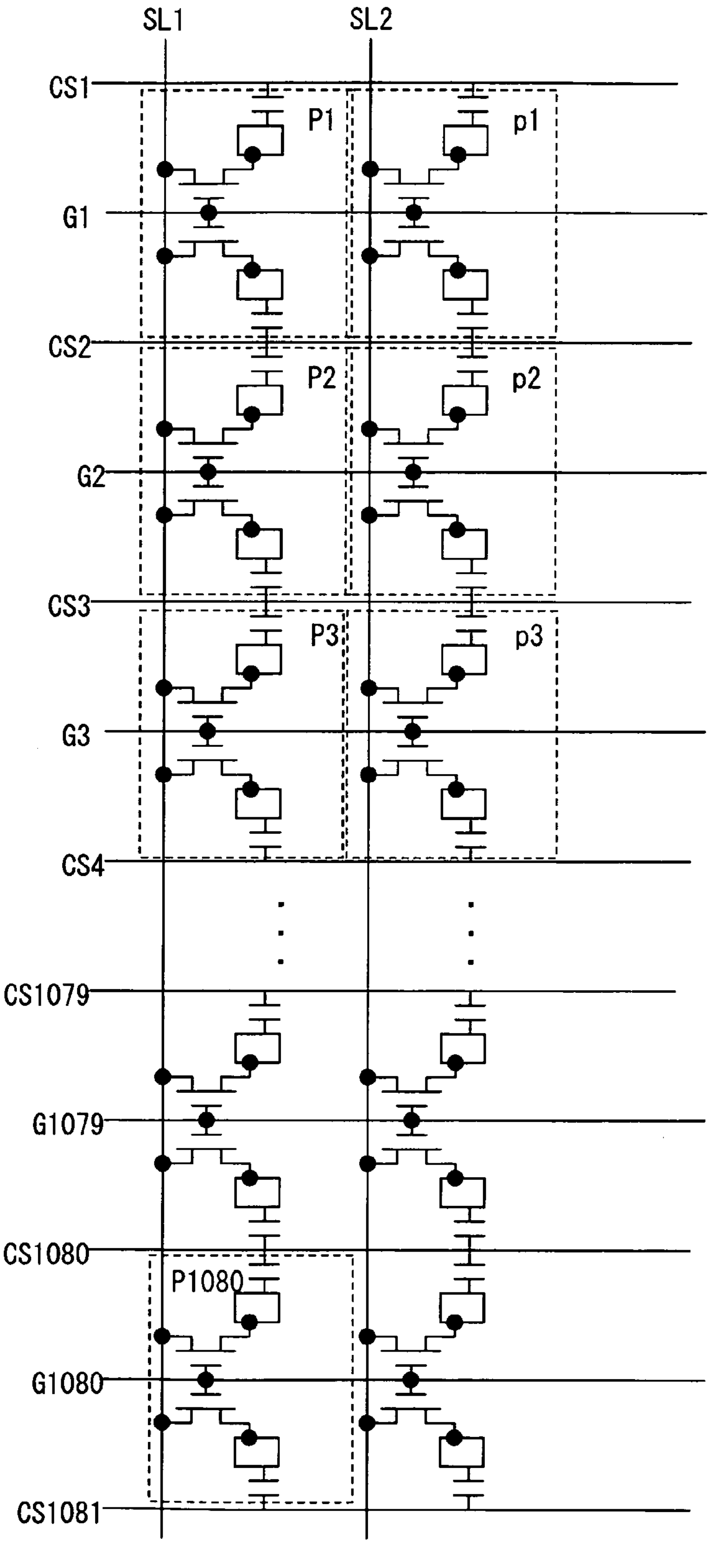
FIG. 3 is a view schematically illustrating a configuration of the present liquid crystal display device.

In the present embodiment, the scanning signal lines are interlace-scanned while the data signal lines are subjected to block inversion driving, as shown in FIGS. 1 and 2. First, the scanning signal line G1 and the subsequent scanning signal lines in the display area are divided into 45 blocks (B1 through B45) by 44 borders parallel to the scanning signal lines. Each of the blocks includes 24 successive scanning signal lines. For example, the block B1, which is a most upstream side block, includes the scanning signal lines G1 through G24, the block B2 includes the scanning signal lines G25 through G48, the block B3 includes the scanning signal lines G49 through G72, and the block B45, which is a most downstream side block, includes the scanning signal lines G1057 through G1080.

Then, the scanning signal lines are divided into groups as follows. Specifically, a top group Gr1 is formed which includes 12 odd-numbered scanning signal lines (G1, G3, . . . G23) included in the block B1, which is the most upstream side block, a group Gr2 is formed which includes 24 even-numbered scanning signal lines (G2, G4, . . . G48) included in the block B1 and the subsequent block B2, and a group Gr3 is formed which includes 24 odd-numbered scanning signal lines (G25, G27, . . . G71) included in the second block B2 and the subsequent block B3. Similarly, a process of forming a group including 24 even-numbered scanning signal lines included in a block Bj (j is an odd number in a range from 3 to 43) and a subsequent block B(j+1) and a process of forming a group including 24 odd-numbered scanning signal lines included in a block B(j+1) and a subsequent block B(j+2) are repeated. Thus, groups Gr4 through Gr45 are formed. Lastly, a last group Gr46 is formed which includes 12 even-numbered scanning signal lines (G1058, G1060, . . . G1080) included in the block B45 which is the most downstream side block. The groups Gr1 through Gr46 are sequentially selected in an order from the group Gr1 to the group Gr46. While scanning signal lines included in a selected group are sequentially scanned horizontally, signal electric potentials of an identical polarity are sequentially supplied to a data signal line. Note that the data D1 through D1080 shown in FIGS. 1 and 2 are video data (digital data) corresponding to the pixels P1 through P1080 (see FIG. 3) connected to the scanning signal lines G1 through G1080, respectively, and the polarity inversion signal POL is a signal for controlling a polarity of signal electric potentials supplied to the data signal line SL1. Further, as shown in FIGS. 1 and 2, a polarity (positive or negative) of signal electric potentials supplied to a data signal line is inverted when a selected group is changed from a preceding group to a succeeding group that is selected immediately after the preceding group.

Specifically, the group Gr1 is first selected. While the scanning signal lines (G1, G3, . . . G23) which belong to the group Gr1 are sequentially scanned horizontally, signal electric potentials of a positive polarity that respectively correspond to the video data (D1, D3, . . . D23) are sequentially supplied to the data signal line SL1. Then, the group Gr2 is selected. While the scanning signal lines (G2, G4, . . . G48) which belong to the group Gr2 are sequentially scanned horizontally, signal electric potentials of a negative polarity that respectively correspond to the video data (D2, D4, . . . D48) are sequentially supplied to the data signal line SL1. Then, the group Gr3 is selected. While the scanning signal lines (G25, G27, . . . G71) which belong to the group Gr3 are sequentially scanned horizontally, signal electric potentials of a positive polarity that respectively correspond to the video data (D25, D27, . . . D71) are sequentially supplied to the data signal line SL1. Here, it is assumed that a period in which a signal electric potential corresponding to single video data is supplied (outputted) to a data signal line is a horizontal scanning period (H).

Further, first and second dummy data are inserted between video data corresponding to last horizontal scanning in the preceding group and video data corresponding to first horizontal scanning in the succeeding group, and first and second dummy scanning periods are inserted between a horizontal scanning period corresponding to the last horizontal scanning in the preceding group and a horizontal scanning period corresponding to the first horizontal scanning in the succeeding group.

During the first dummy scanning period, a scanning signal line which is the first one to be subjected to horizontal scanning in the succeeding group is subjected to dummy scanning so as to be made active for a predetermined period of time. Then, the scanning signal line is deactivated. During the first dummy scanning period, a dummy electric potential which corresponds to the first dummy data and which has an identical polarity to a polarity of signal electric potentials in the succeeding group is supplied to a data signal line. The first dummy data is identical to video data corresponding to horizontal scanning carried out immediately after the dummy scanning of the scanning signal line (the first one in the succeeding group). Further, during the second dummy scanning period, a scanning signal line which is the second one to be subjected to horizontal scanning in the succeeding group is subjected to dummy scanning so as to be made active for a predetermined period of time. Then, the scanning signal line is deactivated. During the second dummy scanning period, a dummy electric potential which corresponds to the second dummy data and which has an identical polarity to that of the signal electric potentials in the succeeding group is supplied to the data signal line. The second dummy data is identical to video data corresponding to horizontal scanning carried out immediately after the dummy scanning of the scanning signal line (the second one in the succeeding group).

Here, timing of horizontal scanning in each horizontal scanning period is identical to timing of dummy scanning in each dummy scanning period. Specifically, start (start of output of a signal electric potential) and end (end of output of the signal electric potential) of a horizontal scanning period coincide with start (start of writing of the signal electric potential) and end (end of writing of the signal electric potential) of corresponding horizontal scanning, respectively. Further, start (start of output of a dummy electric potential) and end (end of output of the dummy electric potential) of a dummy scanning period coincide with start (start of writing of the dummy electric potential) and end (end of writing of the dummy electric potential) of corresponding dummy scanning, respectively.

Further, each of gate pulses GP1 through GP1080 respectively supplied to scanning signal lines G1 through G1080 has a width equal to 1 horizontal scanning period (1H). Accordingly, each scanning signal line is activated at the same time as start of corresponding horizontal scanning, and each of the scanning signal lines subjected to dummy scanning (the first one and the second one in the succeeding group) also is activated at the same time as start of corresponding dummy scanning.

Figure 4:
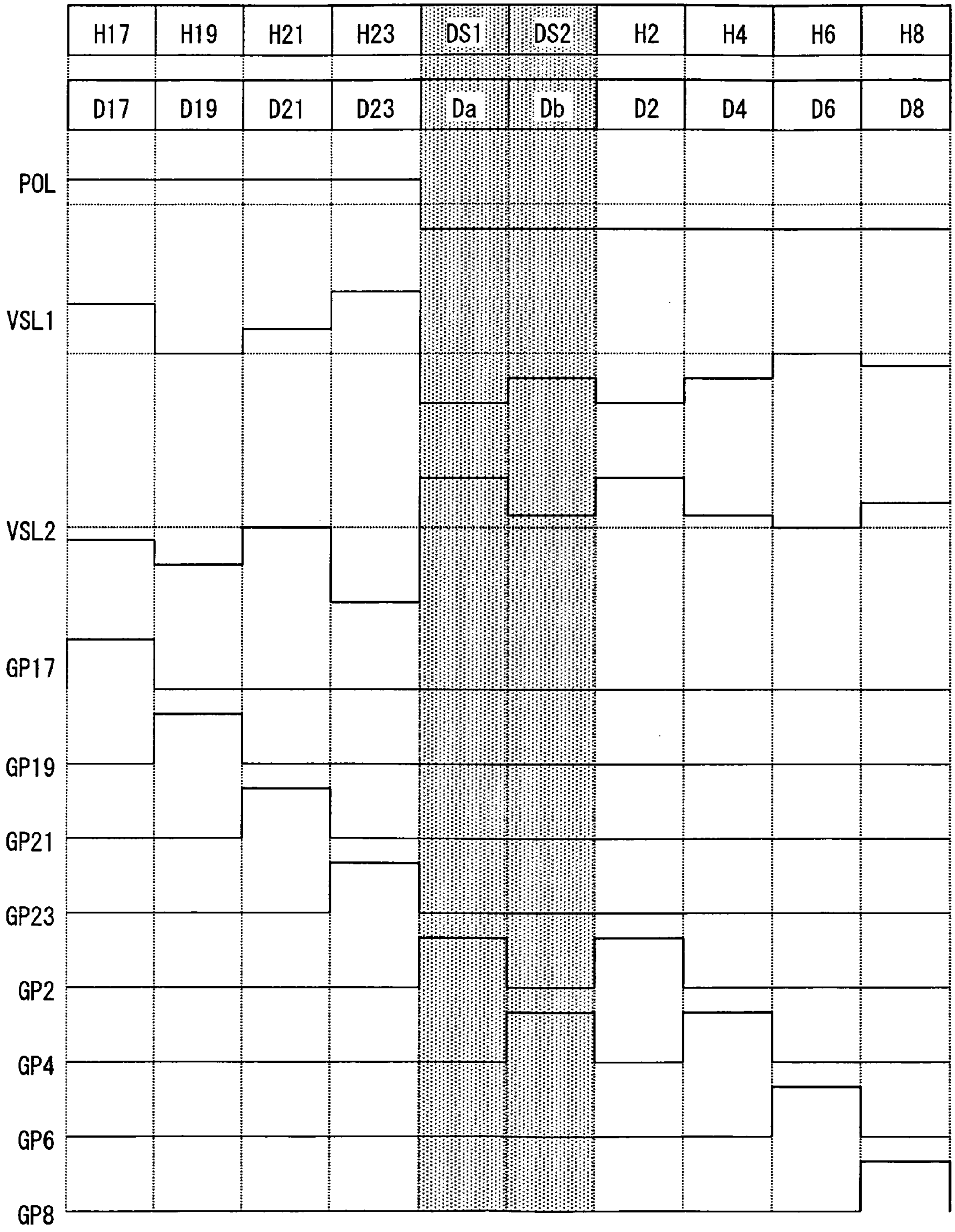
FIG. 4 is a timing chart showing in more detail the exemplary driving shown in FIGS. 1 and 2.

For example, as shown in FIGS. 1 and 4, first dummy data Da and second dummy data Db are inserted between video data D23 corresponding to the last horizontal scanning (horizontal scanning of G23) in the group Gr1 and video data D2 corresponding to first horizontal scanning (horizontal scanning of G2) in the group Gr2, and first dummy scanning period DS1 and second dummy scanning period DS2 are inserted between a horizontal scanning period H23 corresponding to the last horizontal scanning in the group Gr1 and a horizontal scanning period H2 corresponding to the first horizontal scanning in the group Gr2.

The gate pulse GP23 supplied to the scanning signal line G23 is activated at the same time as start of the horizontal scanning period H23, and the gate pulse GP23 is deactivated at the same time as end of the horizontal scanning period H23. During the horizontal scanning period H23, a signal electric potential which corresponds to the video data D23 (video data corresponding to a pixel connected to the scanning signal line G23) and which has the same polarity (positive polarity) as signal electric potentials in the group Gr1 is supplied to the data signal line SL1.

Next, the gate pulse GP2 supplied to the scanning signal line G2 which is the first one to be subjected to horizontal scanning in the group Gr2 is activated at the same time as start of the first dummy scanning period DS1, and the gate pulse GP2 is deactivated at the same time as end of the first dummy scanning period DS1. During the first dummy scanning period DS1, a dummy electric potential which corresponds to the first dummy data Da and which has the same polarity (negative polarity) as signal electric potentials in the group Gr2 is supplied to the data signal line SL1. The first dummy data Da is identical to the video data D2 (data of a next frame) corresponding to horizontal scanning that is carried out immediately after the dummy scanning of the scanning signal line G2. Accordingly, as indicated by the electric potential VSL1 (see FIG. 4) supplied to the data signal line SL1, the dummy electric potential supplied during the first dummy scanning period DS1 is identical to the signal electric potential supplied during the horizontal scanning period H2.

Next, the gate pulse GP4 supplied to the scanning signal line G4 which is the second one to be subjected to horizontal scanning in the group Gr2 is activated at the same time as start of the second dummy scanning period DS2, and the gate pulse GP4 is deactivated at the same time as end of the second dummy scanning period DS2. During the second dummy scanning period DS2, a dummy electric potential which corresponds to the second dummy data Db and which has the same polarity (negative polarity) as the signal electric potentials in the group Gr2 is supplied to the data signal line SL1. The second dummy data Db is identical to the video data D4 (data of a next frame) corresponding to the horizontal scanning that is carried out immediately after the dummy scanning of the scanning signal line G4. Accordingly, as indicated by the electric potential VSL1 (see FIG. 4) supplied to the data signal line SL1, the dummy electric potential supplied during the second dummy scanning period DS2 is identical to the signal electric potential supplied during the horizontal scanning period H4.

Next, the gate pulse GP2 supplied to the scanning signal line G2 is activated at the same time as start of the horizontal scanning period H2, and the gate pulse GP2 is deactivated at the same time as end of the horizontal scanning period H2. During the horizontal scanning period H2, a signal electric potential which corresponds to the video data D2 (video data corresponding to a pixel connected to the scanning signal line G2) and which has the same polarity (negative polarity) as the signal electric potentials in the group Gr2 is supplied to the data signal line SL1.

Figure 5:
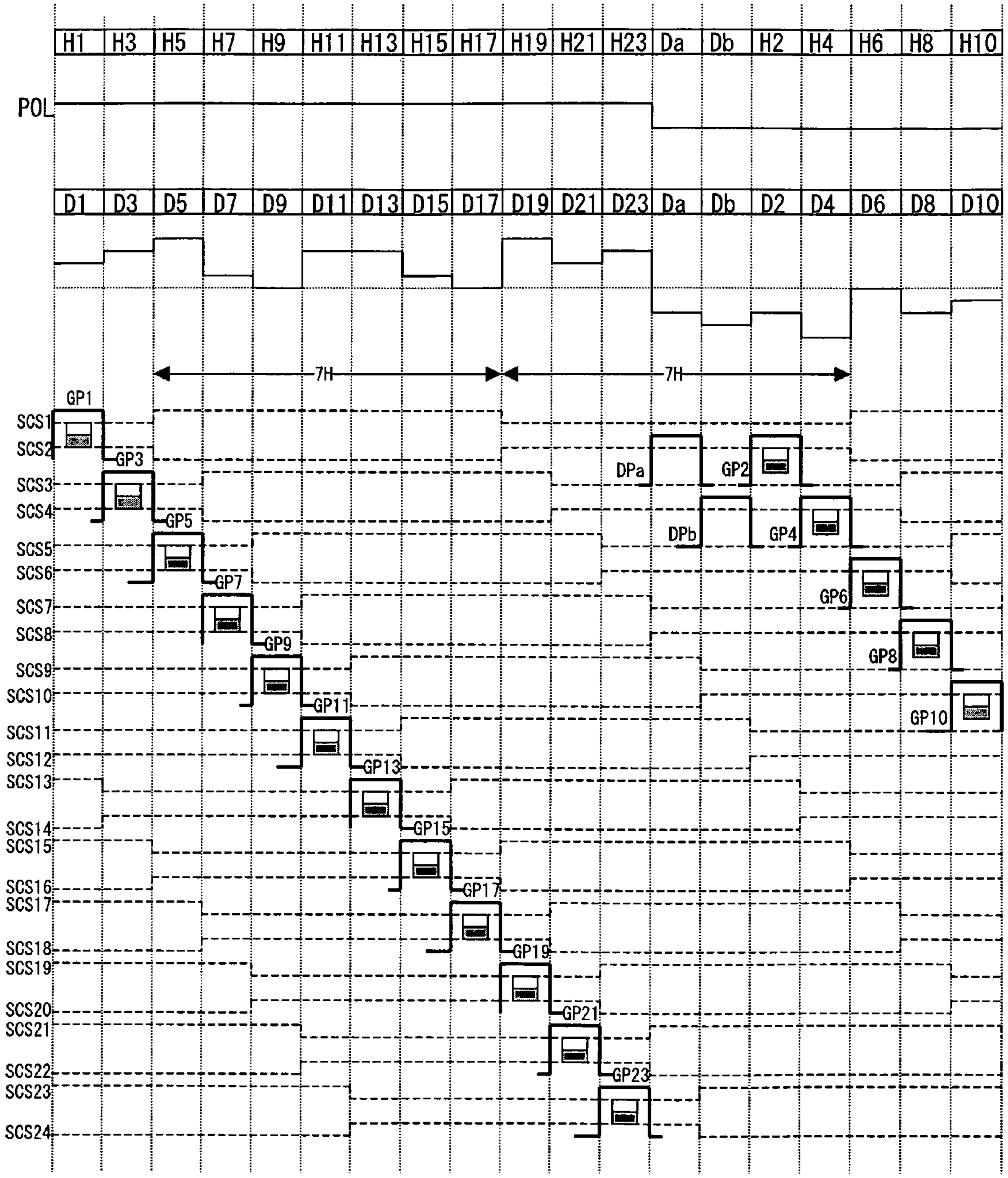
FIG. 5 is a timing chart showing in more detail the exemplary driving shown in FIGS. 1 and 2.

Next, with reference to FIGS. 1 and 2 and FIGS. 5 through 7, the following describes a storage capacitor wire signal SCSi supplied to a storage capacitor wire Csi (i is an integer in a range from 1 to 1080). As shown in FIGS. 1, 2 and 5, each of the storage capacitor wire signals SCS1 through SCS1081 has any one of waveforms of 14 phases (first phase represented by the storage capacitor wire signal SCS1, second phase represented by the storage capacitor wire signal SCS2, third phase represented by the storage capacitor wire signal SCS3, fourth phase represented by the storage capacitor wire signal SCS4, fifth phase represented by the storage capacitor wire signal SCS5, sixth phase represented by the storage capacitor wire signal SCS6, seventh phase represented by the storage capacitor wire signal SCS7, eighth phase represented by the storage capacitor wire signal SCS8, ninth phase represented by the storage capacitor wire signal SCS9, tenth phase represented by the storage capacitor wire signal SCS10, eleventh phase represented by the storage capacitor wire signal SCS11, twelfth phase represented by the storage capacitor wire signal SCS12, thirteenth phase represented by the storage capacitor wire signal SCS13, fourteenth phase represented by the storage capacitor wire signal SCS14).

Each of the phases has an identical cycle (a 14H cycle constituted by a first section in which a High level continues for 7H and a second section in which a Low level continues for 7H). The second phase represented by the storage capacitor wire signal SCS2 is behind the first phase represented by the storage capacitor wire signal SCS1 by half a cycle (7H). One of any two successive odd-numbered phases is behind the other one which is followed by the one by 1H, and one of any two successive even-numbered phases is behind the other one which is followed by the one by 1H. For example, the third phase represented by the storage capacitor wire signal SCS3 is behind the first phase represented by SCS1 by 1H, and the fourth phase represented by the storage capacitor wire signal SCS4 is behind the second phase represented by SCS2 by 1H.

A storage capacitor wire signal SCS(**28*j*+1) (j is an integer in a range from 0 to 38) and a storage capacitor wire signal SCS(28*k*+16) (k is an integer in a range from 0 to 38) have the first phase, and a storage capacitor wire signal SCS(28*j*+2) (j is an integer in a range from 0 to 38) and a storage capacitor wire signal SCS(28*k*+15) (k is an integer in a range from 0 to 38) have the second phase. Further, a storage capacitor wire signal SCS(28*j*+3) (hereinafter, j is an integer in a range from 0 to 38) and a storage capacitor wire signal SCS(28*k*+18) (hereinafter, k is an integer in a range from 0 to 37 have the third phase, a storage capacitor wire signal SCS(28*j*+4) and a storage capacitor wire signal SCS(28*k*+17) have the fourth phase, a storage capacitor wire signal SCS(28*j*+5) and a storage capacitor wire signal SCS(28*k*+20) have the fifth phase, a storage capacitor wire signal SCS(28*j*+6) and a storage capacitor wire signal SCS(28*k*+19) have the sixth phase, a storage capacitor wire signal SCS(28*j*+7) and a storage capacitor wire signal SCS(28*k*+22) have the seventh phase, a storage capacitor wire signal SCS(28*j*+8) and a storage capacitor wire signal SCS(28*k*+21) have the eighth phase, a storage capacitor wire signal SCS(28*j*+9) and a storage capacitor wire signal SCS(28*k*+24) have the ninth phase, a storage capacitor wire signal SCS(28*j*+10) and a storage capacitor wire signal SCS(28*k*+23) have the tenth phase, a storage capacitor wire signal SCS(28*j*+11) and a storage capacitor wire signal SCS(28*k*+26) have the eleventh phase, a storage capacitor wire signal SCS(28*j*+12) and a storage capacitor wire signal SCS(28*k*+25) have the twelfth phase, a storage capacitor wire signal SCS(28*j*+13) and a storage capacitor wire signal SCS(28*k*+28) have the thirteenth phase, and a storage capacitor wire signal SCS(28*j*+14) and a storage capacitor wire signal SCS(28*k***+27) have the fourteenth phase.

Figure 6:
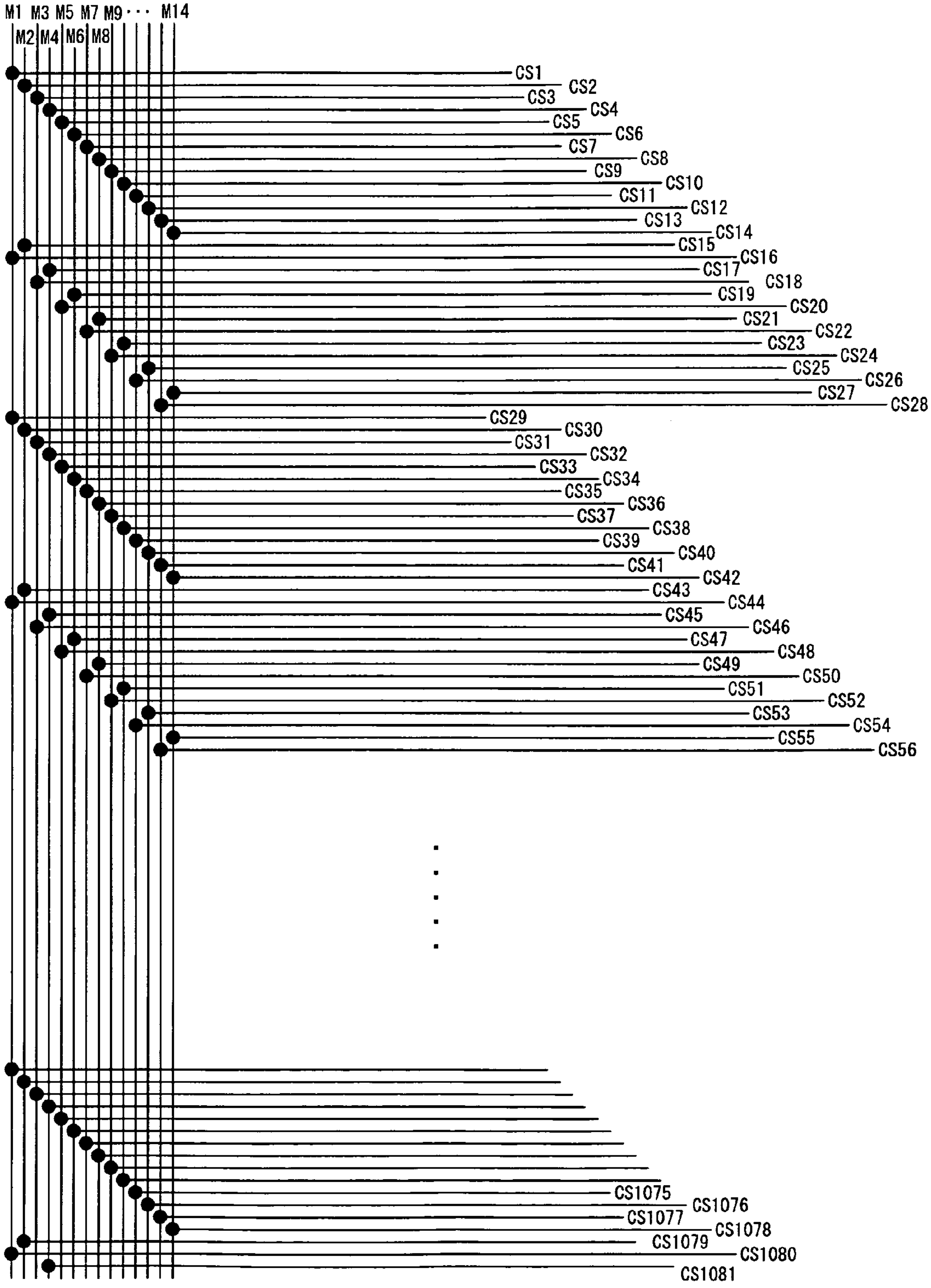
FIG. 6 is a view schematically illustrating how storage capacitor wires are connected to storage capacitor main wires.

As shown in FIG. 6, the storage capacitor wire signals of the first through fourteenth phases are supplied to storage capacitor main wires M1 through M14, respectively. A storage capacitor wire CS(**28*j*+1) (j is an integer in a range from 0 to 38) and a storage capacitor wire CS(28*k*+16) (k is an integer in a range from 0 to 38) are connected to the storage capacitor main wire M1, and a storage capacitor wire CS(28*j*+2) (j is an integer in a range from 0 to 38) and a storage capacitor wire CS(28*k*+15) (k is an integer in a range from 0 to 38) are connected to the storage capacitor main wire M2. Further, a storage capacitor wire CS(28*j*+3) (hereinafter, j is an integer in a range from 0 to 38) and a storage capacitor wire CS(28*k*+18) (hereinafter, k is an integer in a range from 0 to 37 are connected to the storage capacitor main wire M3, a storage capacitor wire CS(28*j*+4) and a storage capacitor wire CS(28*k*+17) are connected to the storage capacitor main wire M4, a storage capacitor wire CS(28*j*+5) and a storage capacitor wire CS(28*k*+20) are connected to the storage capacitor main wire M5, a storage capacitor wire CS(28*j*+6) and a storage capacitor wire CS(28*k*+19) are connected to the storage capacitor main wire M6, a storage capacitor wire CS(28*j*+7) and a storage capacitor wire CS(28*k*+22) are connected to the storage capacitor main wire M7, a storage capacitor wire CS(28*j*+8) and a storage capacitor wire CS(28*k*+21) are connected to the storage capacitor main wire M8, a storage capacitor wire CS(28*j*+9) and a storage capacitor wire CS(28*k*+24) are connected to the storage capacitor main wire M9, a storage capacitor wire CS(28*j*+10) and a storage capacitor wire CS(28*k*+23) are connected to the storage capacitor main wire M10, a storage capacitor wire CS(28*j*+11) and a storage capacitor wire CS(28*k*+26) are connected to the storage capacitor main wire M11, a storage capacitor wire CS(28*j*+12) and a storage capacitor wire CS(28*k*+25) are connected to the storage capacitor main wire M12, a storage capacitor wire CS(28*j*+13) and a storage capacitor wire CS(28*k*+28) are connected to the storage capacitor main wire M13, and a storage capacitor wire CS(28*j*+14) and a storage capacitor wire CS(28*k*+27) are connected to the storage capacitor main wire M14**.

The waveforms of the storage capacitor wire signals SCS1 through SCS1081 are as described above. In the present liquid crystal display device, as shown in FIG. 5, the storage capacitor wire signal SCS1 (first phase) has "L" level during the horizontal scanning period H1 corresponding to the scanning signal line G1, and is level-shifted from "L" level to "H" level after the end of the horizontal scanning period H1 (in FIG. 5 for example, at a timing when 1H elapses after the end of H1), and the storage capacitor wire signal SCS2 (second phase) has "H" level during the horizontal scanning period H1 corresponding to the scanning signal line G1, and is level-shifted from "H" level to "L" level after the end of the horizontal scanning period H1 (in FIG. 5 for example, at a timing when 1H elapses after the end of H1).

Figure 7:
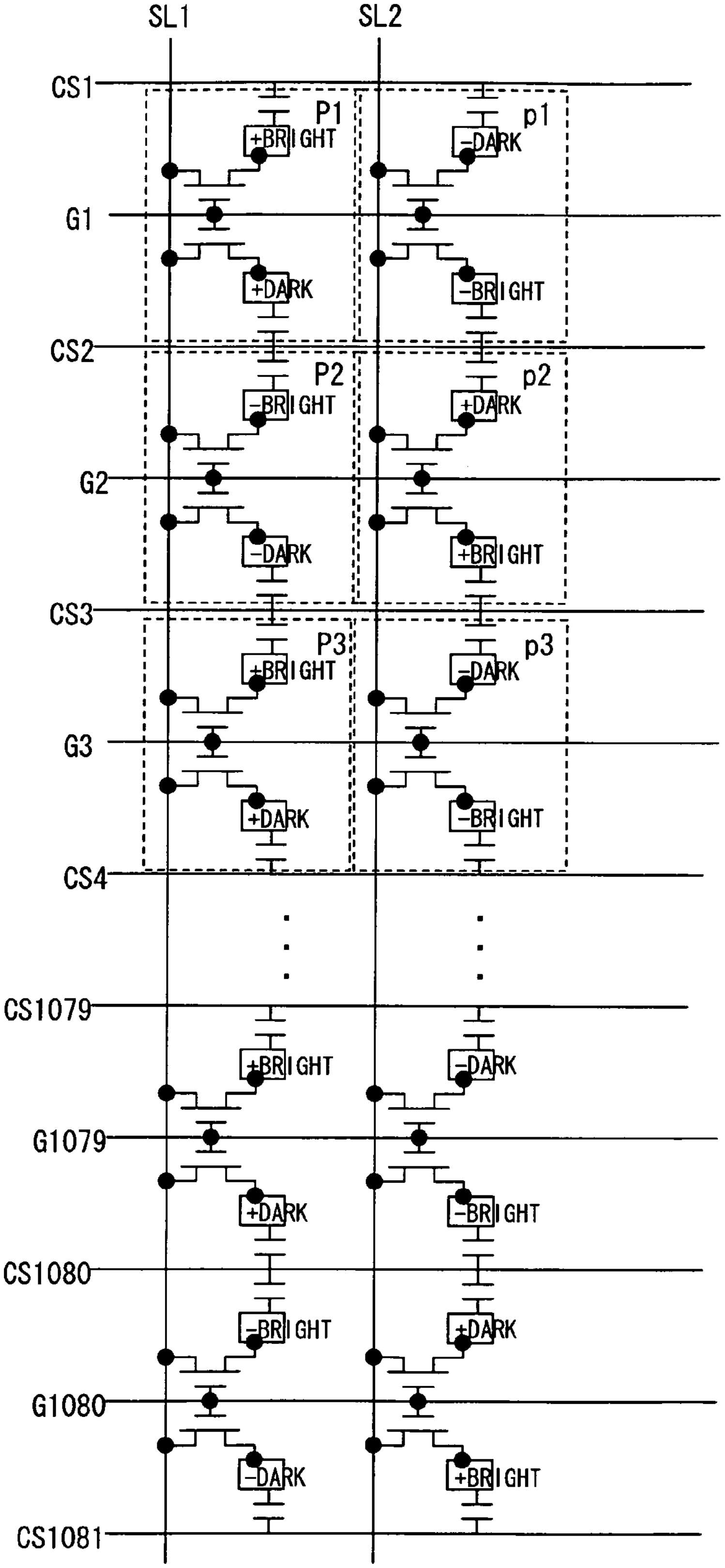
FIG. 7 is a view schematically illustrating a polarity distribution of written electric potentials in the present liquid crystal display device.

One of the two sub-pixels of the pixel P1 includes a pixel electrode that forms storage capacitance with the storage capacitor wire CS1, and the other one of the two sub-pixels includes a pixel electrode that forms storage capacitance with the storage capacitor wire CS2. A positive signal electric potential is supplied to the two pixel electrodes during the horizontal scanning period H1, but as the storage capacitor wire signal SCS1 is level-shifted from "L" level to "H" level, an electric potential of the pixel electrode that forms the storage capacitance with the storage capacitor wire CS1 increases, and as the storage capacitor wire signal SCS2 is level-shifted from "H" level to "L" level, an electric potential of the pixel electrode that forms the storage capacitance with the storage capacitor wire CS2 declines. Here, the storage capacitor wire signal SCS1 has an effective electric potential Ve 1 higher than a reference electric potential Vo (intermediate electric potential between "L" level and "H" level (e.g., common electrode electric potential Vcom)) until 1 vertical scanning period elapses from the level-shift, and the storage capacitor wire signal SCS2 has an effective electric potential Ve2 lower than the reference electric potential Vo until 1 vertical scanning period elapses from the level-shift. Thus, the sub-pixel including the pixel electrode that forms storage capacitance with the storage capacitor wire CS1 becomes a "bright sub-pixel", and the sub-pixel including the pixel electrode that forms storage capacitance with the storage capacitor wire CS2 becomes a "dark sub-pixel", as shown in FIG. 7. A halftone can be displayed by these bright and dark sub-pixels. Note that it is desirable that the following be satisfied:

$$\text{(the effective electric potential } Ve1) - \text{(the reference electric potential } Vo) = \text{(the reference electric potential } Vo) - \text{(the effective electric potential } Ve2).$$

Since the storage capacitor wire signals SCS1 and SCS2 (first and second phases) are set as above, the storage capacitor wire signal SCS2 (second phase) has "H" level during the horizontal scanning period H2 corresponding to the scanning signal line G2, and is level-shifted from "H" level to "L" level at a timing when 1H elapses after the end of the horizontal scanning period H2, and the storage capacitor wire signal SCS3 (third phase) has "L" level during the horizontal scanning period H2 corresponding to the scanning signal line G2, and is level-shifted from "L" level to "H" level at a timing when 2H elapses after the end of the horizontal scanning period H2.

One of the two sub-pixels of the pixel P2 includes a pixel electrode that forms storage capacitance with the storage capacitor wire CS2, and the other one of the two sub-pixels includes a pixel electrode that forms storage capacitance with the storage capacitor wire CS3. A negative signal electric potential is supplied to the two pixel electrodes during the horizontal scanning period H2, but as the storage capacitor wire signal SCS2 is level-shifted from "H" level to "L" level, an electric potential of the pixel electrode that forms the storage capacitance with the storage capacitor wire CS2 declines, and as the storage capacitor wire signal SCS3 is level-shifted from "L" level to "H" level, an electric potential of the pixel electrode that forms the storage capacitance with the storage capacitor wire CS3 increases. Here, the storage capacitor wire signal SCS2 has an effective electric potential lower than a reference electric potential until 1 vertical scanning period elapses from the level-shift, and the storage capacitor wire signal SCS3 has an effective electric potential higher than the reference electric potential until 1 vertical scanning period elapses from the level-shift. Thus, the sub-pixel including the pixel electrode that forms storage capacitance with the storage capacitor wire CS2 becomes a "bright sub-pixel", and the sub-pixel including the pixel electrode that forms storage capacitance with the storage capacitor wire CS3 becomes a "dark sub-pixel", as shown in FIG. 7. A halftone can be displayed by these bright and dark sub-pixels.

Since the storage capacitor wire signals SCS1 and SCS2 (first and second phases) are set as above, the storage capacitor wire signal SCS3 (third phase) has "L" level during the horizontal scanning period H3 corresponding to the scanning signal line G3, and is level-shifted from "L" level to "H" level at a timing when 1H elapses after the end of the horizontal scanning period H3, and the storage capacitor wire signal SCS4 (fourth phase) has "H" level during the horizontal scanning period H3 corresponding to the scanning signal line G3, and is level-shifted from "H" level to "L" level at a timing when 1H elapses after the end of the horizontal scanning period H3.

One of the two sub-pixels of the pixel P3 includes a pixel electrode that forms storage capacitance with the storage capacitor wire CS3, and the other one of the two sub-pixels includes a pixel electrode that forms storage capacitance with the storage capacitor wire CS4. A positive signal electric potential is supplied to the two pixel electrodes during the horizontal scanning period H3, but as the storage capacitor wire signal SCS3 is level-shifted from "L" level to "H" level, an electric potential of the pixel electrode that forms the storage capacitance with the storage capacitor wire CS3 increases, and as the storage capacitor wire signal SCS4 is level-shifted from "H" level to "L" level, an electric potential of the pixel electrode that forms the storage capacitance with the storage capacitor wire CS4 declines. Here, the storage capacitor wire signal SCS3 has an effective electric potential higher than a reference electric potential until 1 vertical scanning period elapses from the level-shift, and the storage capacitor wire signal SCS4 has an effective electric potential lower than the reference electric potential until 1 vertical scanning period elapses from the level-shift. Thus, the sub-pixel including the pixel electrode that forms storage capacitance with the storage capacitor wire CS3 becomes a "bright sub-pixel", and the sub-pixel including the pixel electrode that forms storage capacitance with the storage capacitor wire CS4 becomes a "dark sub-pixel", as shown in FIG. 7. A halftone can be displayed by these bright and dark sub-pixels.

According to the present liquid crystal display device, two sub-pixels included in a single pixel become "bright sub-pixel" and "dark sub-pixel" as shown in FIG. 7, and a halftone can be displayed by the "bright sub-pixel" and "dark sub-pixel". This allows an improvement in viewing angle characteristics. Further, in a single pixel column, bright sub-pixels and dark sub-pixels can be alternately disposed (checkered pattern). This allows smooth display with less roughness.

Further, a polarity distribution of electric potentials written into pixels exhibits dot-inversion in a column direction (direction in which the data signal lines extend), as shown in FIG. 7. This can suppress flickering. Further, it is possible to suppress power consumption and heat generation of the drivers and to increase charging rate of the pixels as compared to a case where the data signal lines are subjected to dot inversion (1H inversion) driving. Further, immediately after inversion of a polarity of signal electric potentials supplied to a data signal line, a dummy electric potential having the same polarity as that obtained after the inversion is supplied to the data signal line throughout the first and second dummy scanning periods. This makes it possible to reduce a difference in charging rate between (i) pixels respectively connected to the second scanning signal line in an odd-numbered block and the first scanning signal line in an even-numbered block and (ii) the other pixels. Consequently, it is possible to suppress horizontal-striped unevenness that can be observed in the vicinity of borders between the blocks in a case where block inversion driving is carried out.

A noteworthy point is that since a single scanning signal line is activated for a predetermined period of time during each of the first and second dummy scanning period, and is then deactivated, a status of load applied to a scanning signal line driving circuit before start of scanning, at the start of the scanning, and during the scanning of one scanning signal line can be made identical to a status of load applied to the scanning signal line driving circuit before start of scanning, at the start of the scanning, and during the scanning of another scanning signal line.

Figure 8:
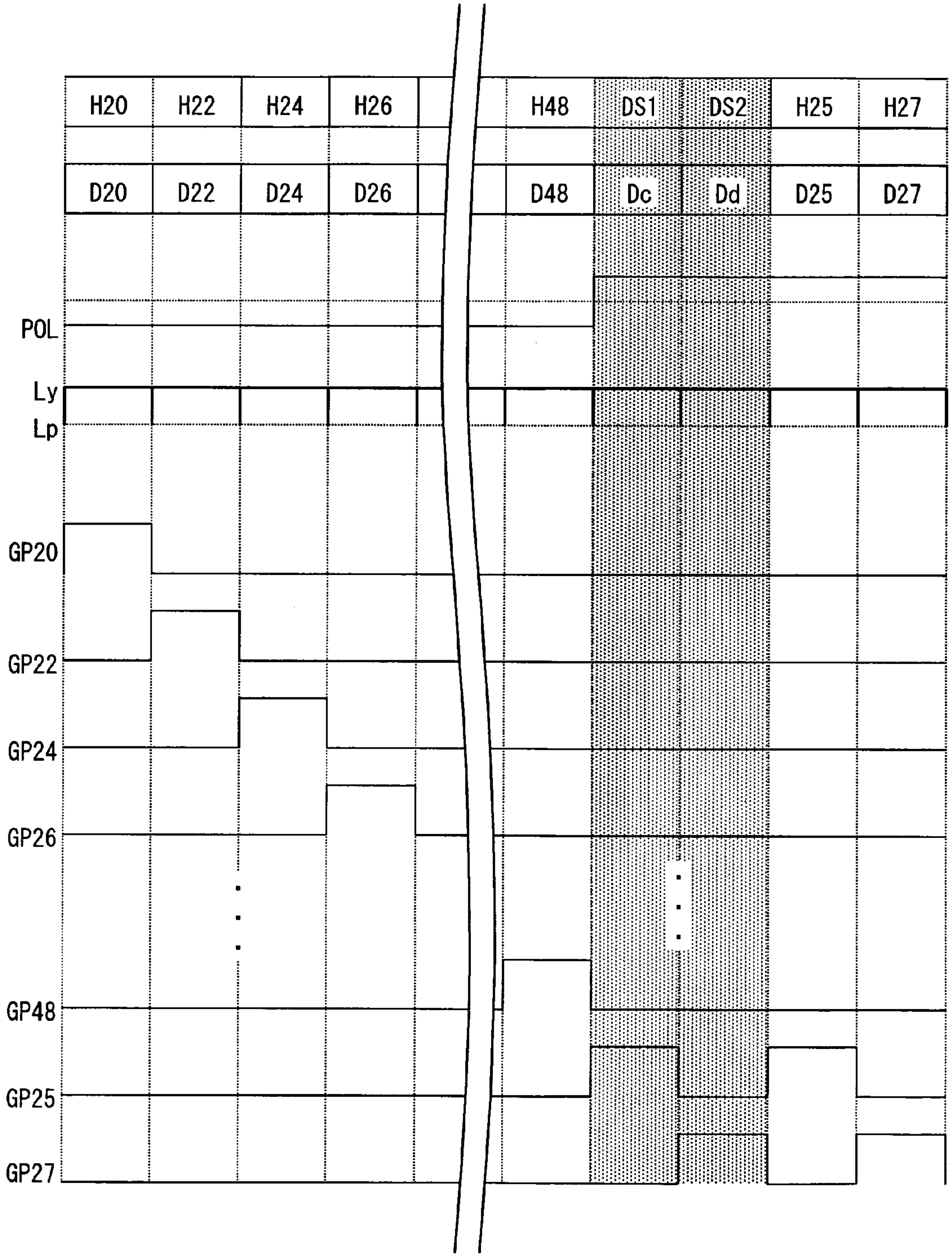
FIG. 8 is a timing chart showing a fluctuation in load applied to a scanning signal line driving circuit in the exemplary driving shown in FIGS. 1 and 2.

Next, with reference to FIG. 8, the following discusses (i) a status of load applied to the scanning signal line driving circuit before start of scanning, at the time of start of scanning, and during the scanning of the scanning signal line G24, (ii) a status of load applied to the scanning signal line driving circuit before start of scanning, at the time of start of scanning, and during the scanning of the scanning signal line G25, and (iii) a status of load applied to the scanning signal line driving circuit before start of scanning, at the time of start of scanning, and during the scanning of the scanning signal line G26, the scanning signal lines G24, G25, and G26 being located in the vicinity of a border between the blocks B1 and B2. In FIG. 8, Lp represents load applied to the scanning signal line driving circuit when a single scanning signal line is activated and another scanning signal line is deactivated at the same time, and Ly represents load applied to the scanning signal line driving circuit while a single scanning signal line is being active.

Before start of scanning of the scanning signal line G24, a single scanning signal line, more specifically, the scanning signal line G22 is active. Accordingly, load on the scanning signal line driving circuit is Ly. At the time of the start of the scanning of the scanning signal line G24, a single scanning signal line, more specifically, the scanning signal line G24 is activated, and at the same time, another scanning signal line, more specifically, the scanning signal line G22 is deactivated. Accordingly, load on the scanning signal line driving circuit is Lp. During the scanning of the scanning signal line G24, a single scanning signal line, more specifically, the scanning signal line G24 is active. Accordingly, load on the scanning signal line driving circuit is Ly.

Before start of scanning of the scanning signal line G25, a single scanning signal line, more specifically, the scanning signal line G27 is active. Accordingly, load on the scanning signal line driving circuit is Ly. At the time of the start of the scanning of the scanning signal line G25, a single scanning signal line, more specifically, the scanning signal line G25 is activated, and at the same time, another scanning signal line, more specifically, the scanning signal line G27 is deactivated. Accordingly, load on the scanning signal line driving circuit is Lp. During the scanning of the scanning signal line G25, a single scanning signal line, more specifically, the scanning signal line G25 is active. Accordingly, load on the scanning signal line driving circuit is Ly.

Before start of scanning of the scanning signal line G26, a single scanning signal line, more specifically, the scanning signal line G24 is active. Accordingly, load on the scanning signal line driving circuit is Ly. At the time of the start of the scanning of the scanning signal line G26, a single scanning signal line, more specifically, the scanning signal line G26 is activated, and at the same time, another scanning signal line, more specifically, the scanning signal line G24 is deactivated. Accordingly, load on the scanning signal line driving circuit is Lp. During the scanning of the scanning signal line G26, a single scanning signal line, more specifically, the scanning signal line G26 is active. Accordingly, load on the scanning signal line driving circuit is Ly.

As described above, in the present liquid crystal display device, in a case where dummy scanning periods are inserted immediately after inversion of a polarity of electric potentials of a data signal line, a status of load applied to the scanning signal line driving circuit during a horizontal scanning period can be made identical to a status of load applied to the scanning signal line driving circuit during a dummy scanning period. Accordingly, a status of load applied to the scanning signal line driving circuit before scanning, at the time of start of the scanning, and during the scanning of one scanning signal line can be made identical to a status of load applied to the scanning signal line driving circuit before scanning, at the time of start of the scanning, and during the scanning of another scanning signal line. This makes it possible to reduce a difference in charging rate between (i) pixels connected to scanning signal lines which are subjected to horizontal scanning before and after inversion of a polarity of electric potentials and (ii) the other pixels. As a result, it is possible to suppress horizontal-striped unevenness in the vicinity of borders between the blocks.

Figure 23:
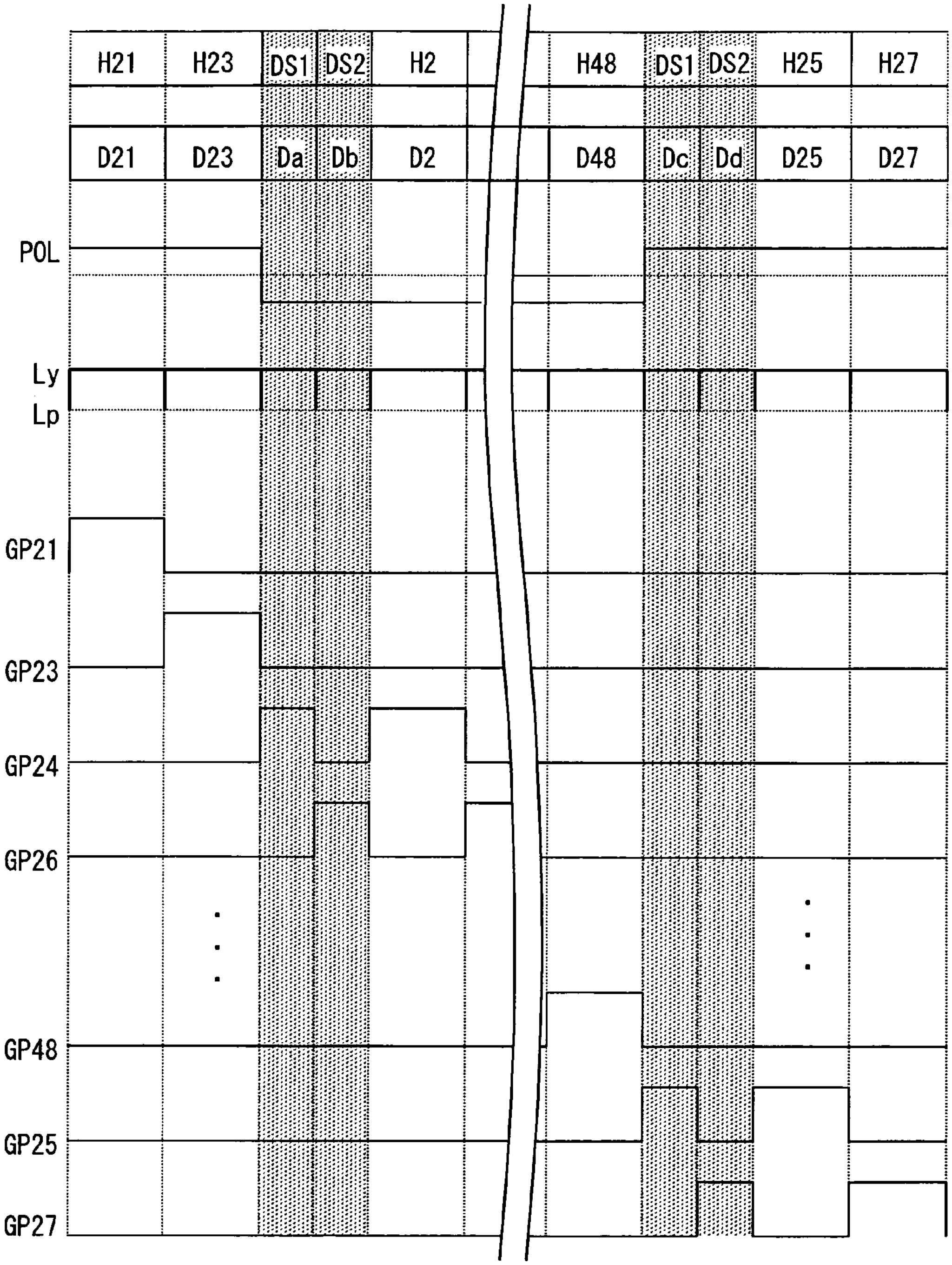
FIG. 23 is a timing chart showing a modification of FIG. 8.

Further, in the present liquid crystal display device, load on the scanning signal line driving circuit is almost always kept at Ly during a vertical scanning period. That is, there is almost no fluctuation in load on the scanning signal line. This makes the suppression of the horizontal-striped unevenness more effective. Further, as shown in FIG. 8, timings at which the load becomes Lp are periodical. This makes the suppression of the horizontal-striped unevenness further more effective. Another arrangement is possible in which timings at which (periods in which) the load becomes Ly and timings at which the load becomes Lp are not periodical as shown in FIG. 23.

In the present liquid crystal display device, it is preferable that signal electric potentials respectively supplied to adjacent two data signal lines during an identical horizontal scanning period or identical dummy scanning period have different polarities. For example, as shown in FIG. 4, signal electric potentials of a negative polarity are supplied to the data signal line SL2 during a period in which signal electric potentials of a positive polarity are supplied to the data signal line SL1, whereas signal electric potentials of a positive polarity are supplied to the data signal line SL2 during a period in which signal electric potentials of a negative polarity are supplied to the data signal line SL1. With the arrangement, a polarity distribution of electric potentials written into the pixels exhibits dot inversion in a row direction (direction in which the scanning signal lines extend) as shown in FIG. 7. This makes it possible to further suppress flickering.

Further, in the arrangement shown in FIGS. 1 and 4, the first dummy data Da is identical to the video data D2 (video data of a next frame) corresponding to horizontal scanning that is carried out immediately after dummy scanning of the scanning signal line G2, and the second dummy data Db is identical to the video data D4 (video data of a next frame) corresponding to horizontal scanning that is carried out immediately after dummy scanning of the scanning signal line G4. However, the present embodiment is not limited to this. For example, the first dummy data Da may be identical to the video data (video data of a current frame) corresponding to horizontal scanning that is carried out immediately before dummy scanning of the scanning signal line G2, and the second dummy data Db may be identical to the video data (video data of a current frame) corresponding to horizontal scanning that is carried out immediately before dummy scanning of the scanning signal line G4. Further, the first dummy data Da may be determined based on video data (video data of a current frame) corresponding to horizontal scanning that is carried out immediately before the dummy scanning of the scanning signal line G2 and on the video data D2 (video data of a next frame) corresponding to horizontal scanning that is carried out immediately after the dummy scanning of the scanning signal line G2, and the second dummy data Db may be determined based on video data (video data of a current frame) corresponding to horizontal scanning that is carried out immediately before the dummy scanning of the scanning signal line G4 and on the video data D4 (video data of a next frame) corresponding to horizontal scanning that is carried out immediately after the dummy scanning of the scanning signal line G4. Alternatively, the first and second dummy data Da and Db may be predetermined (identical) video data.

In the arrangement of FIGS. 1, 2, and 4, each dummy scanning period is equal in length to 1 horizontal scanning period. However, the present embodiment is not limited to this. Each dummy scanning period may be shorter or longer than 1 horizontal scanning period. For example, in FIG. 23, each dummy scanning period is shorter than 1 horizontal scanning period. Also in FIG. 23, timing of horizontal scanning in each horizontal scanning period is identical to timing of dummy scanning in each dummy scanning period.

Figure 9:
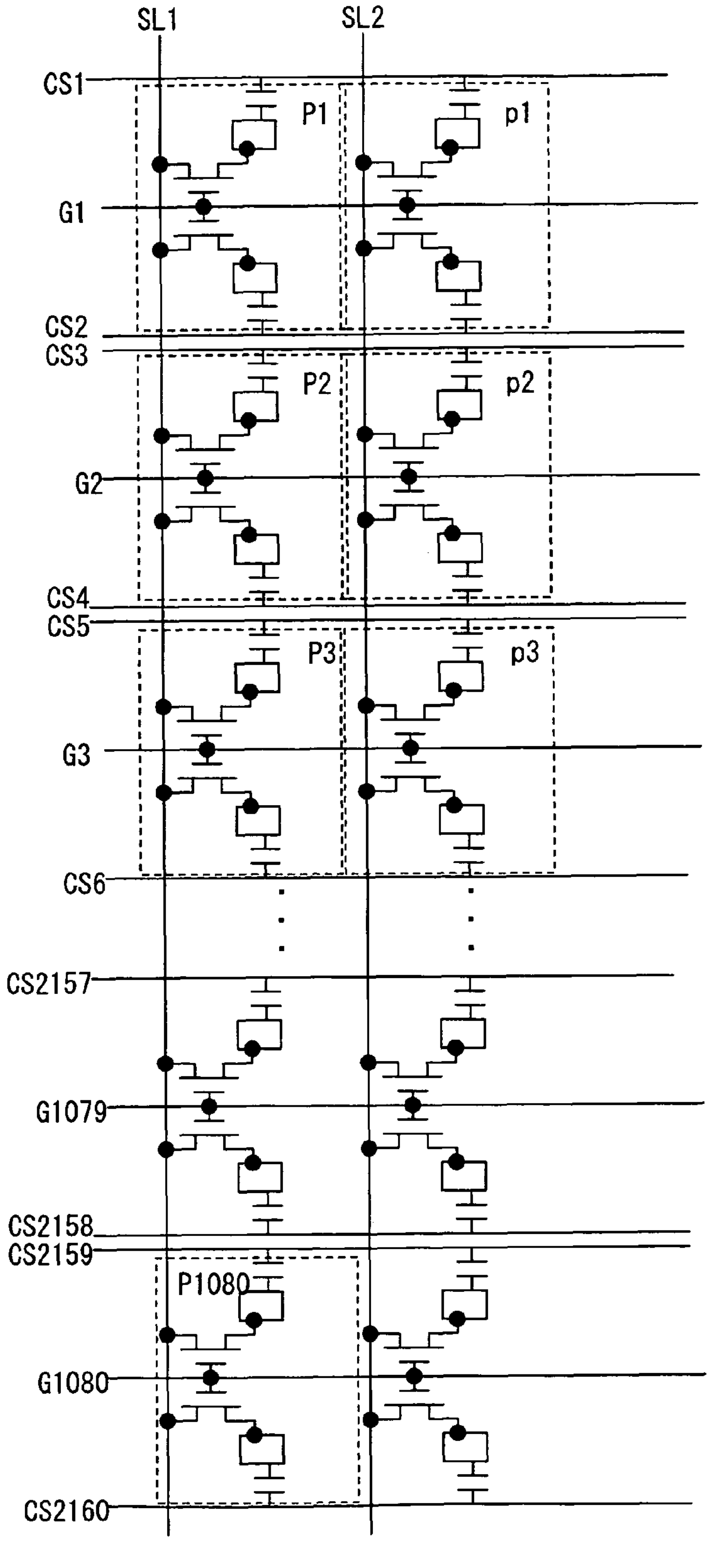
FIG. 9 is a view schematically illustrating another configuration of the present liquid crystal display device.

In the present embodiment, it is also possible that (i) two storage capacitor wires are provided corresponding to a single pixel as shown in FIG. 9, and (ii) a storage capacitor wire signal which is level-shifted once in a single vertical scanning period (see FIG. 10) is supplied to a storage capacitor wire CSi (i is an integer in a range from 1 to 2160). For example, the storage capacitor wire signal SCS1 has "L" level during the horizontal scanning period H1 (polarity of signal electric potentials is positive) corresponding to the scanning signal line G1, is level-shifted from "L" level to "H" level at a timing when 1H elapses from end of the horizontal scanning period H1, and then keeps "H" level for 1 vertical scanning period. Meanwhile, the storage capacitor wire signal SCS2 has "H" level during the horizontal scanning period H1 corresponding to the scanning signal line G1, is level-shifted from "H" level to "L" level at a timing when 1H elapses from end of the horizontal scanning period H1, and then keeps "L" level for 1 vertical scanning period.

The storage capacitor wire signal SCS3 has "H" level during the horizontal scanning period H2 (polarity of signal electric potentials is negative) corresponding to the scanning signal line G2, is level-shifted from "H" level to "L" level at a timing when 1H elapses from end of the horizontal scanning period H2, and then keeps "L" level for 1 vertical scanning period. Meanwhile, the storage capacitor wire signal SCS4 has "L" level during the horizontal scanning period H2 corresponding to the scanning signal line G2, is level-shifted from "L" level to "H" level at a timing when 1H elapses from end of the horizontal scanning period H2, and then keeps "H" level for 1 vertical scanning period.

The storage capacitor wire signal SCS5 has "L" level during the horizontal scanning period H3 (polarity of signal electric potentials is positive) corresponding to the scanning signal line G3, is level-shifted from "L" level to "H" level at a timing when 1H elapses from end of the horizontal scanning period H3, and then keeps "H" level for 1 vertical scanning period. Meanwhile, the storage capacitor wire signal SCS6 has "H" level during the horizontal scanning period H3 corresponding to the scanning signal line G3, is level-shifted from "H" level to "L" level at a timing when 1H elapses from end of the horizontal scanning period H3, and then keeps "L" level for 1 vertical scanning period.

Figure 10:
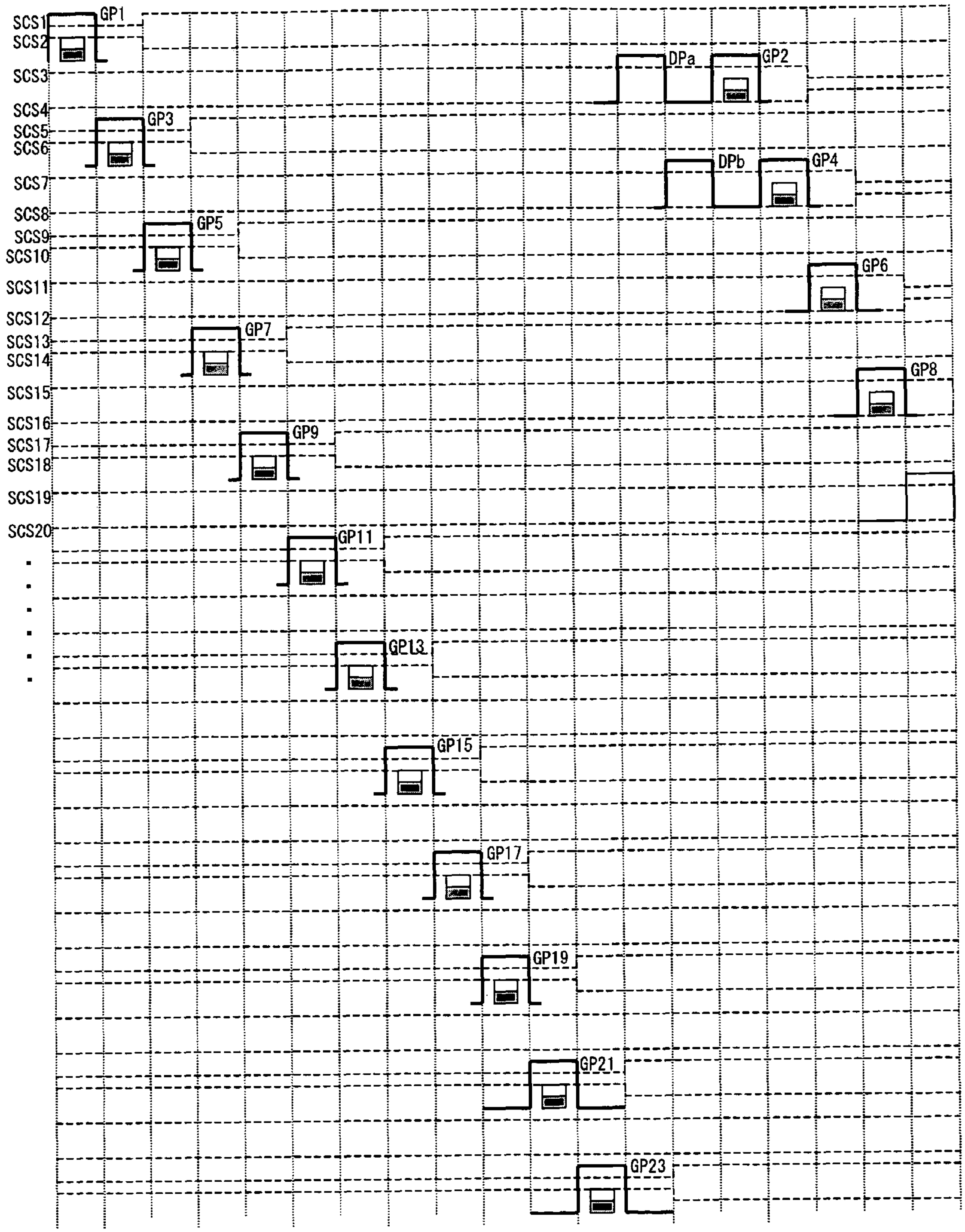
FIG. 10 is a timing chart showing an exemplary driving of the liquid crystal display device of FIG. 9.

Also according to this arrangement, two sub-pixels in a single pixel becomes "bright sub-pixel" and "dark sub-pixel" as shown in FIG. 10, and a halftone can be displayed by the "bright sub-pixel" and "dark sub-pixel". This allows an improvement in viewing angle characteristics. Further, in a single pixel column, bright sub-pixels and dark sub-pixels can be alternately disposed (checkered pattern). This allows smooth display with less roughness.

Figure 11:
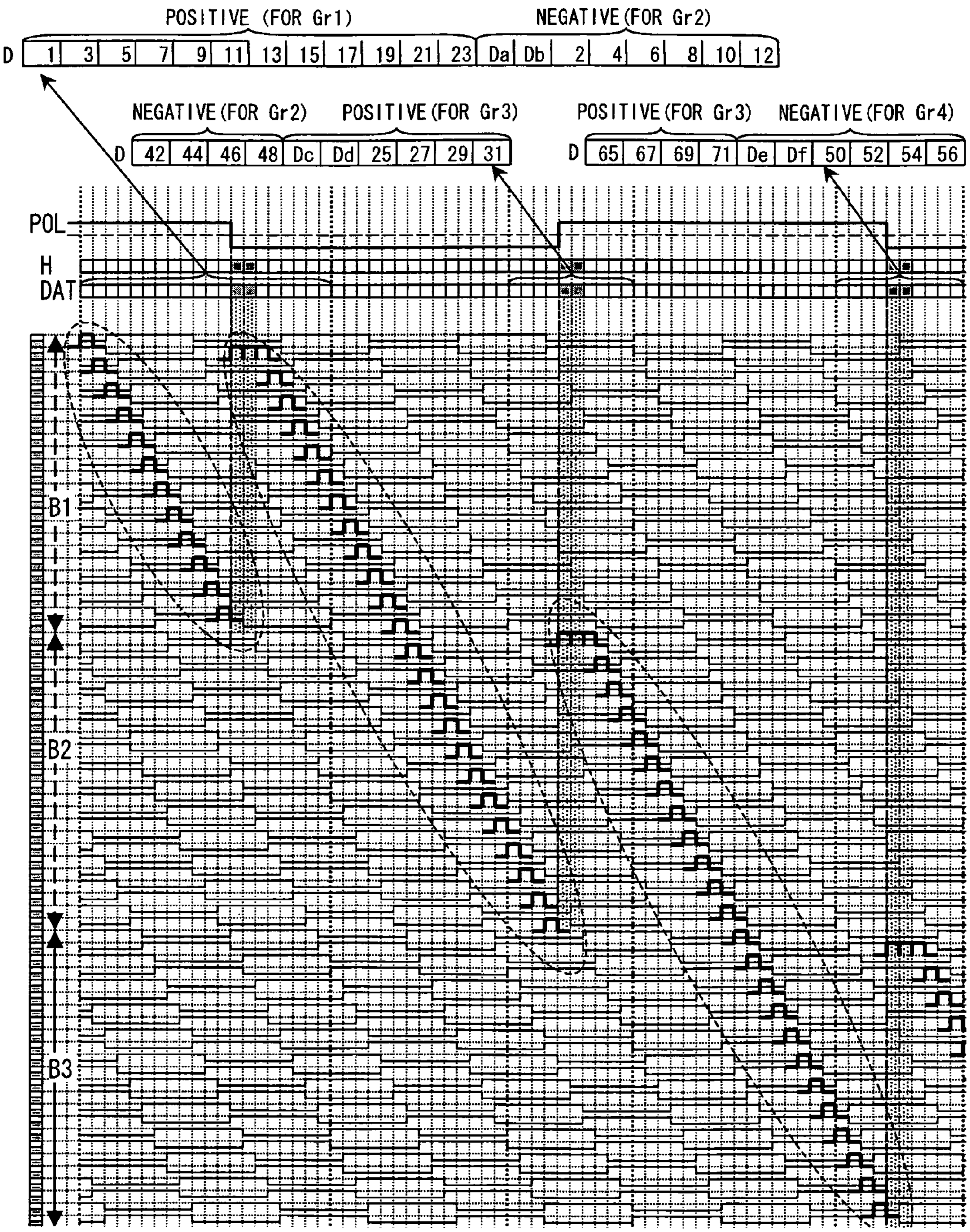
FIG. 11 is a timing chart showing another exemplary driving of the present liquid crystal display device.

In the arrangement of FIGS. 1, 2, and 4, a scanning signal line which is the first one to be subjected to horizontal scanning in the succeeding group is subjected to dummy scanning during the first dummy scanning period, and a scanning signal line which is the second one to be subjected to horizontal scanning in the succeeding group is subjected to dummy scanning during the second dummy scanning period. However, the present embodiment is not limited to this. For example, it is also possible that (i) the scanning signal line which is the first one to be subjected to horizontal scanning in the succeeding group is subjected to dummy scanning during the first dummy scanning period so as to be made active for a predetermined period of time, and is then deactivated, and (ii) the scanning signal line which is the first one to be subjected to horizontal scanning in the succeeding group is subjected to dummy scanning again during the second dummy scanning period so as to be made active for a predetermined period of time, and is then deactivated, as shown in FIG. 11. Note that a storage capacitor wire signal SCSi (i is an integer in a range from 1 to 1080) supplied to a storage capacitor wire CSi is identical to that shown in FIGS. 1, 2 and 5.

Figure 12:
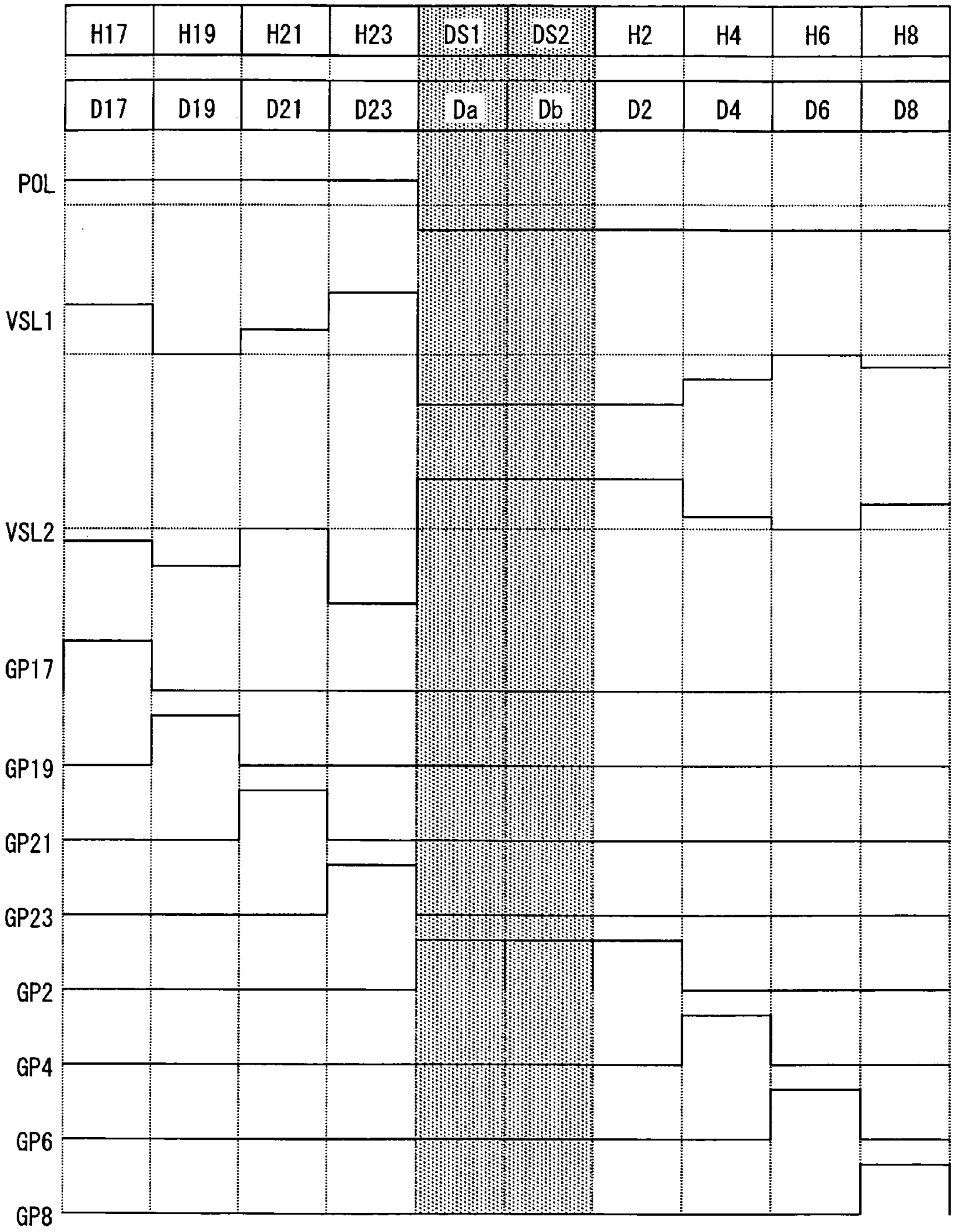
FIG. 12 is a timing chart showing in more detail the exemplary driving shown in FIG. 11.

For example, as shown in FIGS. 11 and 12, first dummy data Da and second dummy data Db are inserted between video data D23 corresponding to the last horizontal scanning (horizontal scanning of G23) in the group Gr1 and video data D2 corresponding to first horizontal scanning (horizontal scanning of G2) in the group Gr2, and first dummy scanning period DS1 and second dummy scanning period DS2 are inserted between a horizontal scanning period H23 corresponding to the last horizontal scanning in the group Gr1 and a horizontal scanning period H2 corresponding to the first horizontal scanning in the group Gr2.

The gate pulse GP2 supplied to the scanning signal line G2, which is the first one to be subjected to horizontal scanning in the group Gr2, is activated at the same time as start of the first dummy scanning period DS1, and the gate pulse GP2 is deactivated at the same time as end of the first dummy scanning period DS1. During the first dummy scanning period DS1, a dummy electric potential which corresponds to the first dummy data Da and which has the same polarity (negative polarity) as signal electric potentials in the group Gr2 is supplied to the data signal line SL1. The first dummy data Da is identical to the video data D2 (data of a next frame) corresponding to horizontal scanning that is carried out immediately after the dummy scanning of the scanning signal line G2. Accordingly, as indicated by the electric potential VSL1 (see FIG. 12) supplied to the data signal line SL1, the dummy electric potential supplied during the first dummy scanning period DS1 is identical to the signal electric potential supplied during the horizontal scanning period H2.

Next, the gate pulse GP2 supplied to the scanning signal line G2, which is the first one to be subjected to horizontal scanning in the group Gr2, is activated again at the same time as start of the second dummy scanning period DS2, and the gate pulse GP2 is deactivated at the same time as end of the second dummy scanning period DS2. During the second dummy scanning period DS2, a dummy electric potential which corresponds to the second dummy data Db and which has the same polarity (negative polarity) as the signal electric potentials in the group Gr2 is supplied to the data signal line SL1. The second dummy data Db is identical to the video data D2 (data of a next frame) corresponding to the horizontal scanning that is carried out immediately after the dummy scanning of the scanning signal line G2. Accordingly, as indicated by the electric potential VSL1 (see FIG. 12) supplied to the data signal line SL1, the dummy electric potential supplied during the second dummy scanning period DS2 is identical to the signal electric potential supplied during the horizontal scanning period H2.

Figure 13:
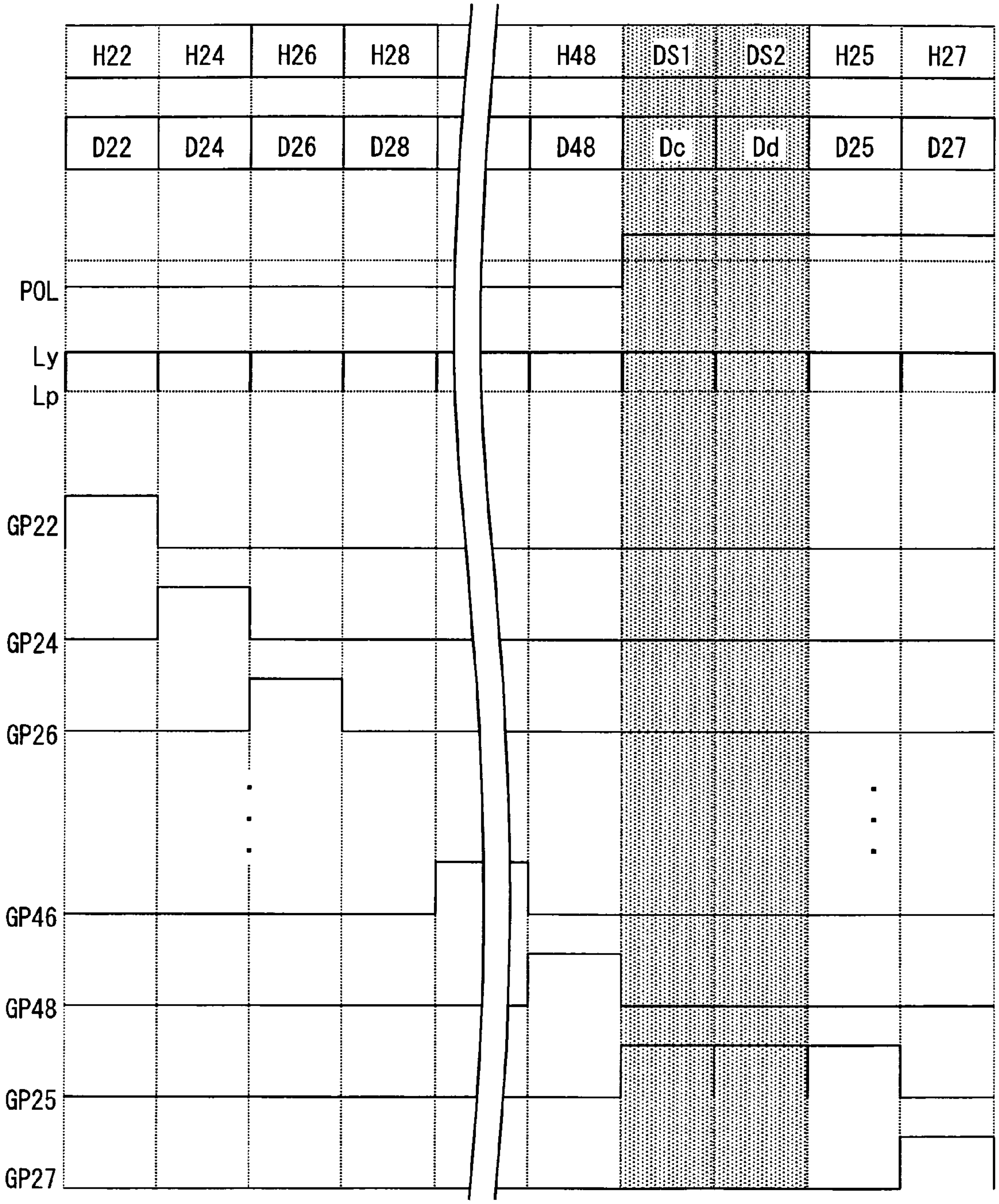
FIG. 13 is a timing chart showing a fluctuation in load applied to the scanning signal line driving circuit in the exemplary driving shown in FIG. 11.

Also in the arrangement shown in FIGS. 11 and 12, a status of load applied to the scanning signal line driving circuit during a horizontal scanning period can be made identical to a status of load applied to the scanning signal line driving circuit during a dummy scanning period, and therefore a status of load applied to the scanning signal line driving circuit before start of scanning, at the time of start of scanning, and during the scanning of one scanning signal line can be made identical to a status of load applied to the scanning signal line driving circuit before start of scanning, at the time of start of scanning, and during the scanning of another scanning signal line, as shown in FIG. 13. In FIG. 13, Lp represents load applied to the scanning signal line driving circuit when a single scanning signal line is activated and another scanning signal line is deactivated at the same time, and Ly represents load applied to the scanning signal line driving circuit while a single scanning signal line is being active. This can further reduce a difference in charging rate between (i) pixels connected to scanning signal lines that are subjected to horizontal scanning before and after polarity inversion of electric potentials and (ii) the other pixels, thereby suppressing horizontal-striped unevenness occurring in the vicinity of borders of the blocks.

Further, also in this arrangement, load on the scanning signal line driving circuit is almost always kept at Ly during a vertical scanning period. That is, there is almost no fluctuation in load on the scanning signal line. This makes the suppression of the horizontal-striped unevenness more effective. Further, as shown in FIG. 13, timings at which the load becomes Lp are periodical. This makes the suppression of the horizontal-striped unevenness further more effective. In the arrangement of FIGS. 11 and 12, each dummy scanning period is equal in length to 1 horizontal scanning period. However, the present embodiment is not limited to this. Each dummy scanning period may be shorter or longer than 1 horizontal scanning period.

Figure 14:
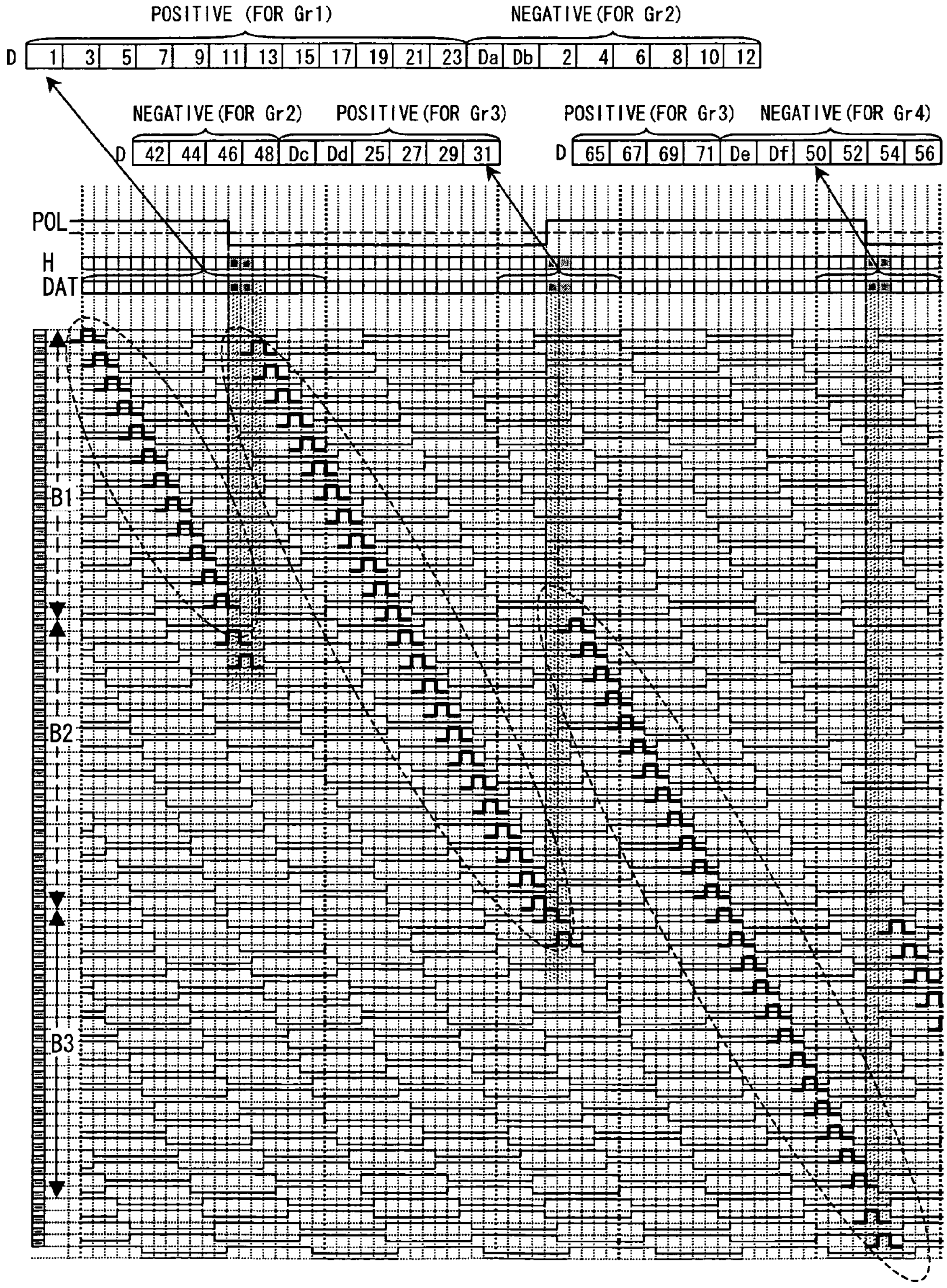
FIG. 14 is a timing chart showing still another exemplary driving of the present liquid crystal display device.

In the present embodiment, it is also possible that during the first dummy scanning period, a scanning signal line (thirteenth scanning signal line in the succeeding group) which is three lines below the last scanning signal line of the preceding group is subjected to dummy scanning so as to be made active for a predetermined period of time, and is then deactivated, and during the second dummy scanning period, a scanning signal line (fourteenth scanning signal line in the succeeding group) which is two lines below the scanning signal line subjected to dummy scanning during the first dummy scanning period is subjected to dummy scanning so as to be made active for a predetermined period of time, and is then deactivated, as shown in FIG. 14. Note that a storage capacitor wire signal SCSi (i is an integer in a range from 1 to 1080) supplied to a storage capacitor wire CSi is identical to that shown in FIGS. 1, 2 and 5.

Figure 15:
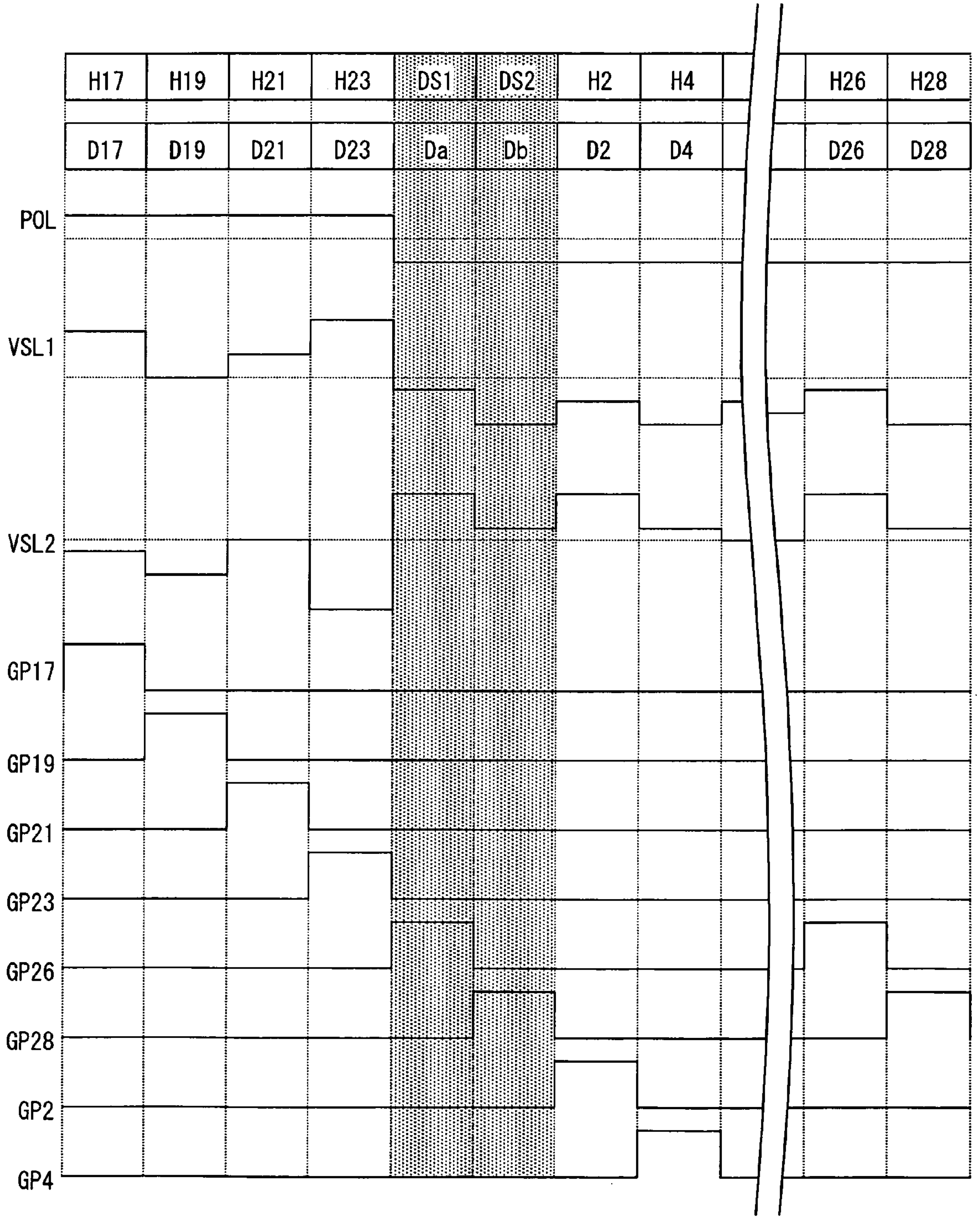
FIG. 15 is a timing chart showing in more detail the exemplary driving shown in FIG. 14.

For example, as shown in FIGS. 14 and 15, first dummy data Da and second dummy data Db are inserted between video data D23 corresponding to the last horizontal scanning (horizontal scanning of G23) in the group Gr1 and video data D2 corresponding to first horizontal scanning (horizontal scanning of G2) in the group Gr2, and first dummy scanning period DS1 and second dummy scanning period DS2 are inserted between a horizontal scanning period H23 corresponding to the last horizontal scanning in the group Gr1 and a horizontal scanning period H2 corresponding to the first horizontal scanning in the group Gr2.

The gate pulse GP26 supplied to the scanning signal line G26 (thirteenth scanning signal line in the group Gr2), which is three lines below the scanning signal line G23, is activated at the same time as start of the first dummy scanning period DS1, and the gate pulse GP26 is deactivated at the same time as end of the first dummy scanning period DS1. During the first dummy scanning period DS1, a dummy electric potential which corresponds to the first dummy data Da and which has the same polarity (negative polarity) as signal electric potentials in the group Gr2 is supplied to the data signal line SL1. The first dummy data Da is identical to the video data D26 (data of a next frame) corresponding to horizontal scanning that is carried out immediately after the dummy scanning of the scanning signal line G26. Accordingly, as indicated by the electric potential VSL1 (see FIG. 15) supplied to the data signal line SL1, the dummy electric potential supplied during the first dummy scanning period DS1 is identical to the signal electric potential supplied during the horizontal scanning period H26.

Next, the gate pulse GP28 supplied to the scanning signal line G28, which is two lines below the scanning signal line G26, is activated at the same time as start of the second dummy scanning period DS2, and the gate pulse GP28 is deactivated at the same time as end of the second dummy scanning period DS2. During the second dummy scanning period DS2, a dummy electric potential which corresponds to the second dummy data Db and which has the same polarity (negative polarity) as the signal electric potentials in the group Gr2 is supplied to the data signal line SL1. The second dummy data Db is identical to the video data D28 (data of a next frame) corresponding to the horizontal scanning that is carried out immediately after the dummy scanning of the scanning signal line G28. Accordingly, as indicated by the electric potential VSL1 (see FIG. 15) supplied to the data signal line SL1, the dummy electric potential supplied during the second dummy scanning period DS2 is identical to the signal electric potential supplied during the horizontal scanning period H28.

Figure 16:
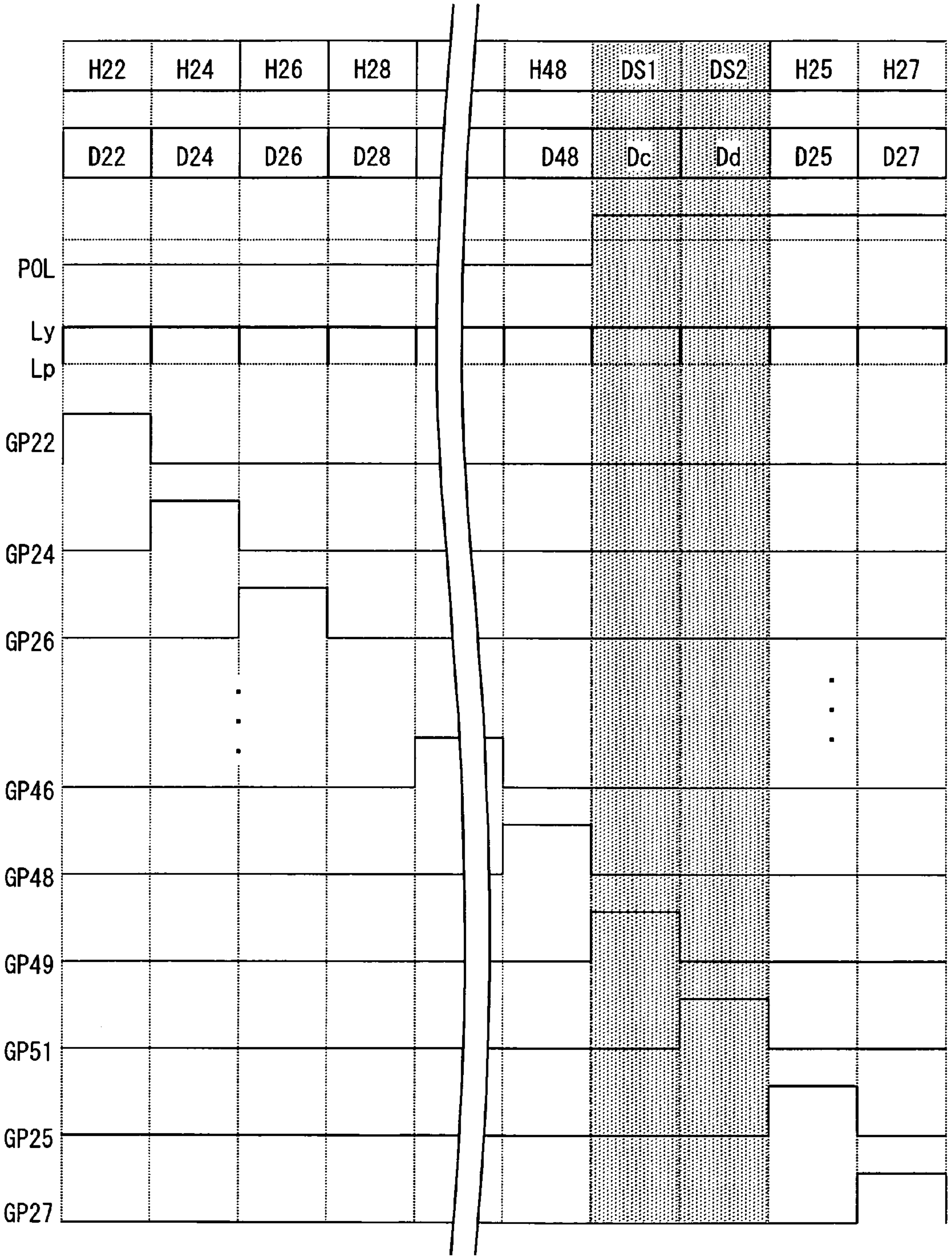
FIG. 16 is a timing chart showing a fluctuation in load applied to the scanning signal line driving circuit in the exemplary driving shown in FIG. 14.

Also in the arrangement shown in FIGS. 14 and 15, a status of load applied to the scanning signal line driving circuit during a horizontal scanning period can be made identical to a status of load applied to the scanning signal line driving circuit during a dummy scanning period, and therefore a status of load applied to the scanning signal line driving circuit before start of scanning, at the time of start of scanning, and during the scanning of one scanning signal line can be made identical to a status of load applied to the scanning signal line driving circuit before start of scanning, at the time of start of scanning, and during the scanning of another scanning signal line, as shown in FIG. 16. In FIG. 16, Lp represents load applied to the scanning signal line driving circuit when a single scanning signal line is activated and another scanning signal line is deactivated at the same time, and Ly represents load applied to the scanning signal line driving circuit while a single scanning signal line is being active. This can further reduce a difference in charging rate between (i) pixels connected to scanning signal lines that are subjected to horizontal scanning before and after polarity inversion of electric potentials and (ii) the other pixels, thereby suppressing horizontal-striped unevenness occurring in the vicinity of borders of the blocks.

Further, also in this arrangement, load on the scanning signal line driving circuit is almost always kept at Ly during a vertical scanning period. That is, there is almost no fluctuation in load on the scanning signal line. This makes the suppression of the horizontal-striped unevenness more effective. Further, as shown in FIG. 16, timings at which the load becomes Lp are periodical. This makes the suppression of the horizontal-striped unevenness further more effective. In the arrangement of FIGS. 14 and 15, each dummy scanning period is equal in length to 1 horizontal scanning period. However, the present embodiment is not limited to this. Each dummy scanning period may be shorter or longer than 1 horizontal scanning period.

In the arrangement of FIGS. 14 and 15, the first dummy data Da is identical to the video data D26 (data of a next frame) corresponding to horizontal scanning that is carried out immediately after the dummy scanning of the scanning signal line G26, and the second dummy data Db is identical to the video data D26 (data of a next frame) corresponding to the horizontal scanning that is carried out immediately after the dummy scanning of the scanning signal line G28. In this case, in a case where a time interval between the first dummy scanning period DS1 and the horizontal scanning period H25 corresponding to the scanning signal line G25 followed by the scanning signal line G26 is not more than 0.8 ms, it is possible to reduce possibility that tearing (torn look in a moving image) may be observed. Note that the first dummy data Da may be identical to video data (video data of a current frame) corresponding to horizontal scanning carried out immediately before dummy scanning of the scanning signal line G26, and the second dummy data Db may be identical to video data (video data of a current frame) corresponding to horizontal scanning carried out immediately before dummy scanning of the scanning signal line G28. This produces an advantageous effect that there is no possibility that tearing may be observed.

Figure 17:
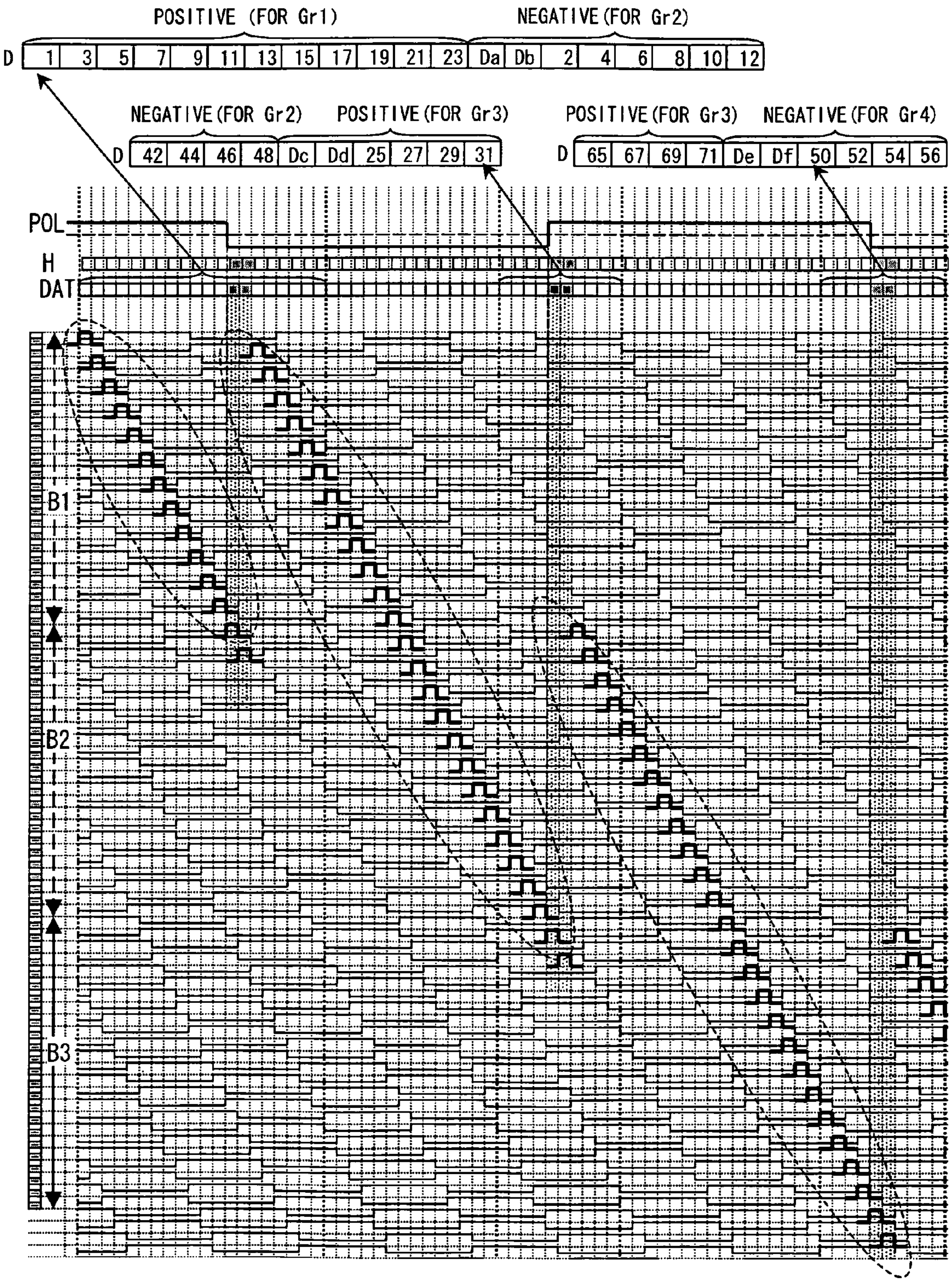
FIG. 17 is a timing chart showing still another exemplary driving of the present liquid crystal display device.

In the present embodiment, it is also possible that during the first dummy scanning period, a scanning signal line (first one to be subjected to horizontal scanning in a group which comes next after the succeeding group) which is two lines below the last scanning signal line of the preceding group is subjected to dummy scanning so as to be made active for a predetermined period of time, and is then deactivated, and during the second dummy scanning period, a scanning signal line (second one to be subjected to horizontal scanning in the group which comes next after the succeeding group) which is two lines below the scanning signal line subjected to dummy scanning during the first dummy scanning period is subjected to dummy scanning so as to be made active for a predetermined period of time, and is then deactivated, as shown in FIG. 17 for example. Note that a storage capacitor wire signal SCSi (i is an integer in a range from 1 to 1080) supplied to a storage capacitor wire CSi is identical to that shown in FIGS. 1, 2 and 5.

Figure 18:
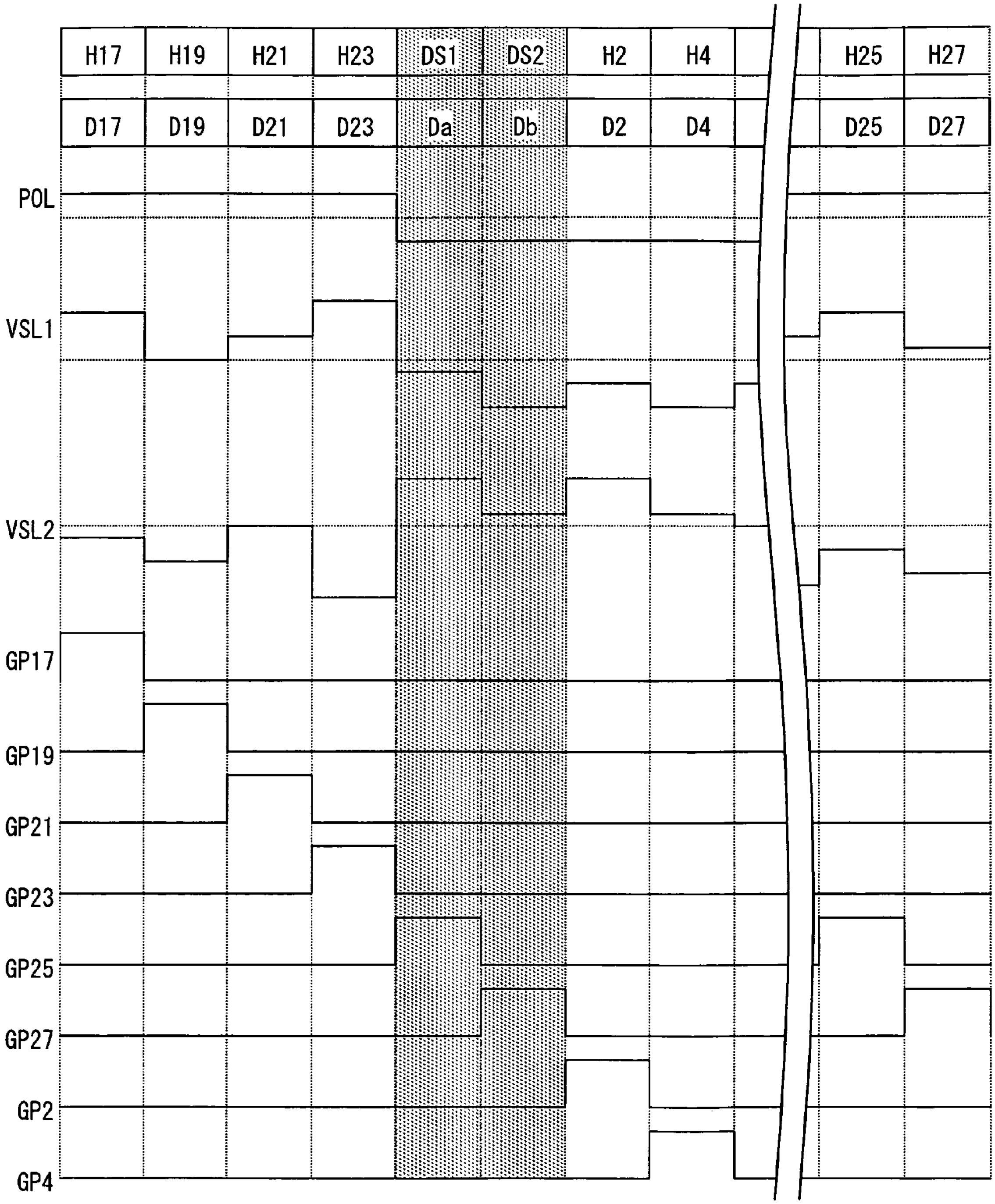
FIG. 18 is a timing chart showing in more detail the exemplary driving shown in FIG. 17.

For example, as shown in FIGS. 17 and 18, first dummy data Da and second dummy data Db are inserted between video data D23 corresponding to the last horizontal scanning (horizontal scanning of G23) in the group Gr1 and video data D2 corresponding to first horizontal scanning (horizontal scanning of G2) in the group Gr2, and first dummy scanning period DS1 and second dummy scanning period DS2 are inserted between a horizontal scanning period H23 corresponding to the last horizontal scanning in the group Gr1 and a horizontal scanning period H2 corresponding to the first horizontal scanning in the group Gr2.

The gate pulse GP25 supplied to the scanning signal line G25 (first scanning signal line in the Gr3 which follows the group Gr2), which is two lines below the scanning signal line G23, is activated at the same time as start of the first dummy scanning period DS1, and the gate pulse GP25 is deactivated at the same time as end of the first dummy scanning period DS1. During the first dummy scanning period DS1, a dummy electric potential which corresponds to the first dummy data Da and which has the same polarity (negative polarity) as signal electric potentials in the group Gr2 is supplied to the data signal line SL1. The first dummy data Da is identical to the video data (data of a current frame) corresponding to horizontal scanning that is carried out immediately before the dummy scanning of the scanning signal line G25.

Next, the gate pulse GP27 supplied to the scanning signal line G27 (second scanning signal line in the Gr3), which is two lines below the scanning signal line G25, is activated at the same time as start of the second dummy scanning period DS2, and the gate pulse GP27 is deactivated at the same time as end of the second dummy scanning period DS2. During the second dummy scanning period DS2, a dummy electric potential which corresponds to the second dummy data Db and which has the same polarity (negative polarity) as the signal electric potentials in the group Gr2 is supplied to the data signal line SL1. The second dummy data Db is identical to video data (data of a current frame) corresponding to the horizontal scanning that is carried out immediately before the dummy scanning of the scanning signal line G27.

Figure 19:
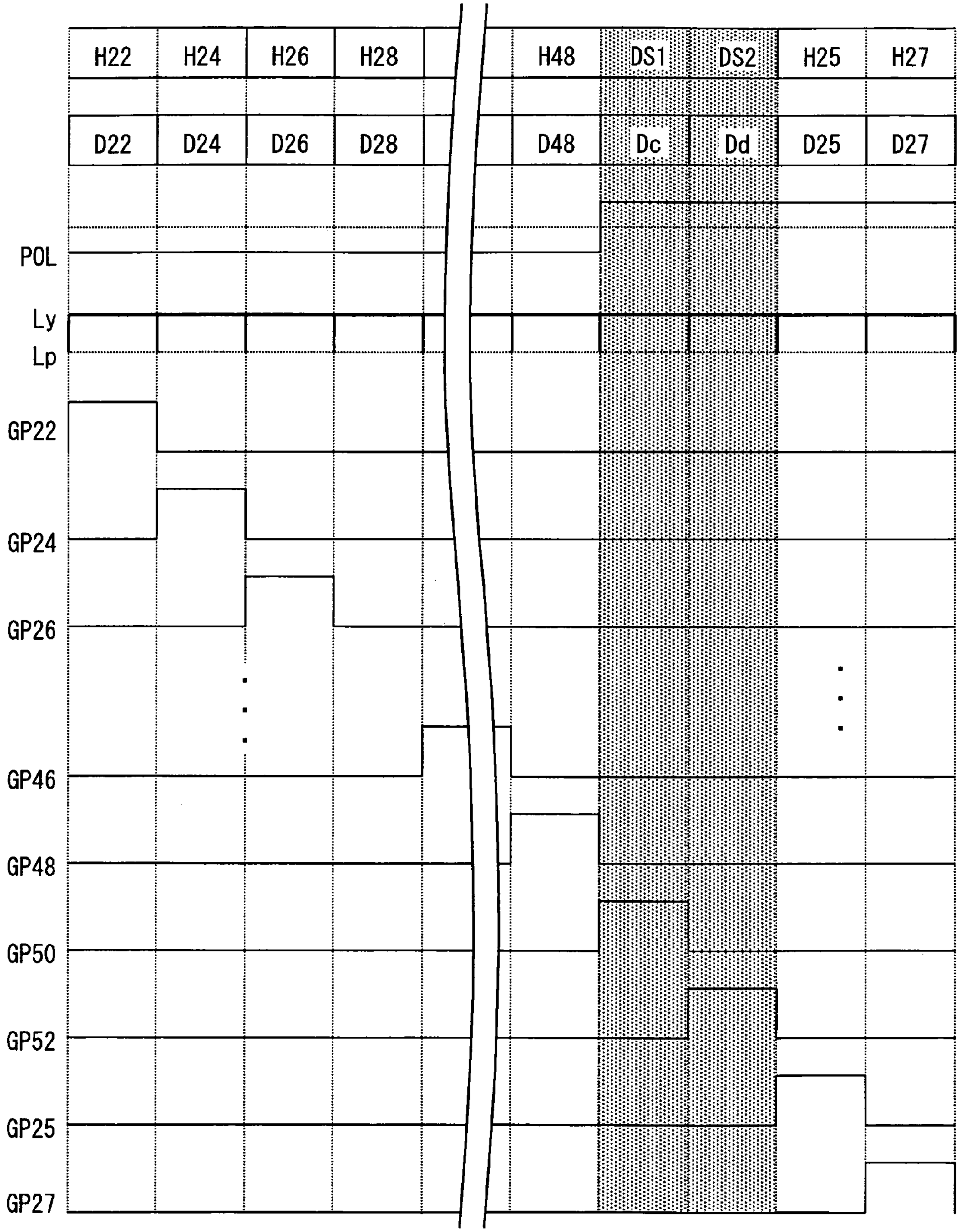
FIG. 19 is a timing chart showing a fluctuation in load applied to the scanning signal line driving circuit in the exemplary driving shown in FIG. 17.

Also in the arrangement shown in FIGS. 17 and 18, a status of load applied to the scanning signal line driving circuit during a horizontal scanning period can be made identical to a status of load applied to the scanning signal line driving circuit during a dummy scanning period, and therefore a status of load applied to the scanning signal line driving circuit before start of scanning, at the time of start of scanning, and during the scanning of one scanning signal line can be made identical to a status of load applied to the scanning signal line driving circuit before start of scanning, at the time of start of scanning, and during the scanning of another scanning signal line, as shown in FIG. 19. In FIG. 19, Lp represents load applied to the scanning signal line driving circuit when a single scanning signal line is activated and another scanning signal line is deactivated at the same time, and Ly represents load applied to the scanning signal line driving circuit while a single scanning signal line is being active. This can further reduce a difference in charging rate between (i) pixels connected to scanning signal lines that are subjected to horizontal scanning before and after polarity inversion of electric potentials and (ii) the other pixels, thereby further suppressing horizontal-striped unevenness occurring in the vicinity of borders of the blocks.

Further, also in this arrangement, load on the scanning signal line driving circuit is almost always kept at Ly during a vertical scanning period. That is, there is almost no fluctuation in load on the scanning signal line. This makes the suppression of the horizontal-striped unevenness more effective. Further, as shown in FIG. 19, timings at which the load becomes Lp are periodical. This makes the suppression of the horizontal-striped unevenness further more effective. In the arrangement of FIGS. 17 and 18, each dummy scanning period is equal in length to 1 horizontal scanning period. However, the present embodiment is not limited to this. Each dummy scanning period may be shorter or longer than 1 horizontal scanning period.

Figure 20:
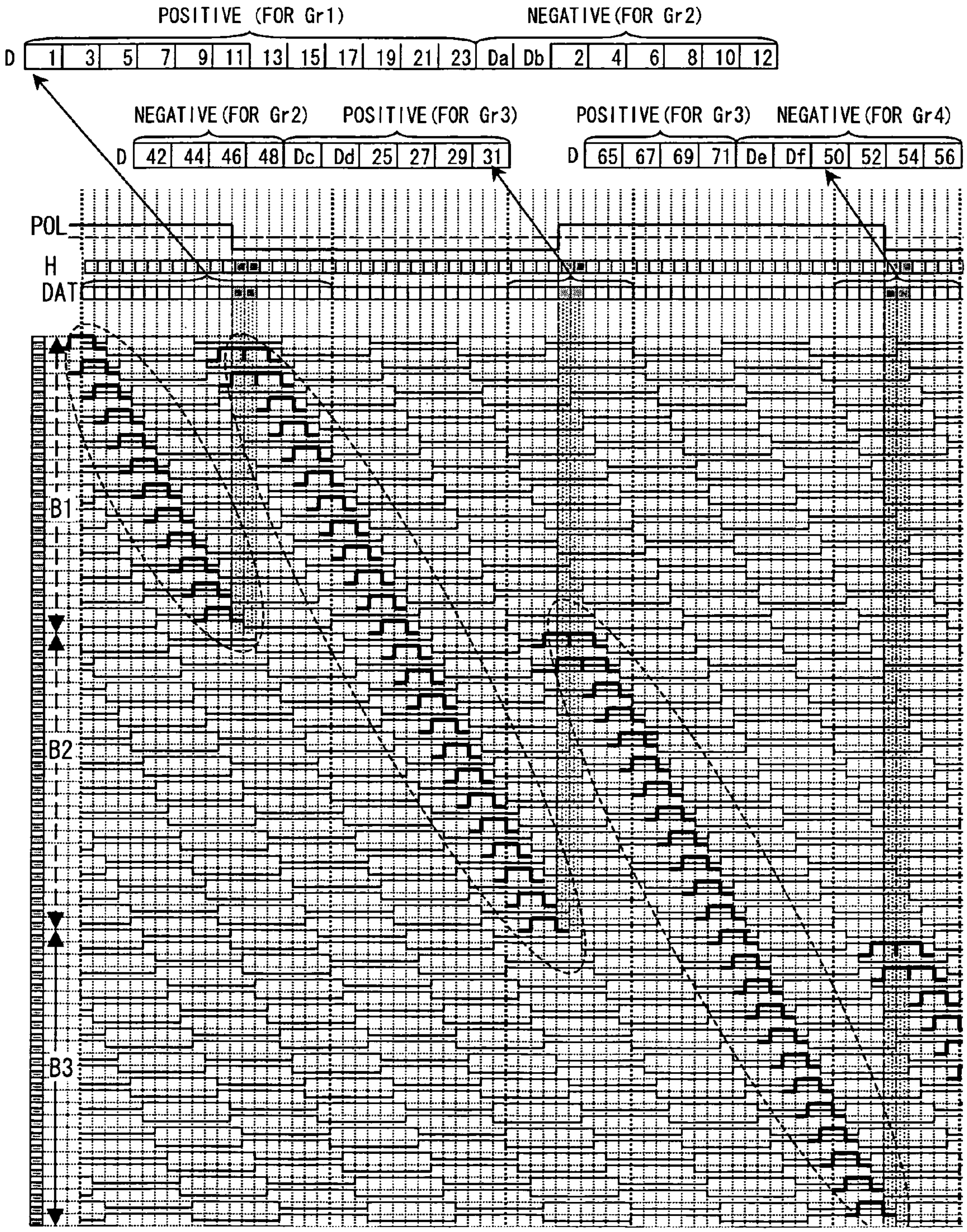
FIG. 20 is a timing chart showing still another exemplary driving of the present liquid crystal display device.
Figure 21:
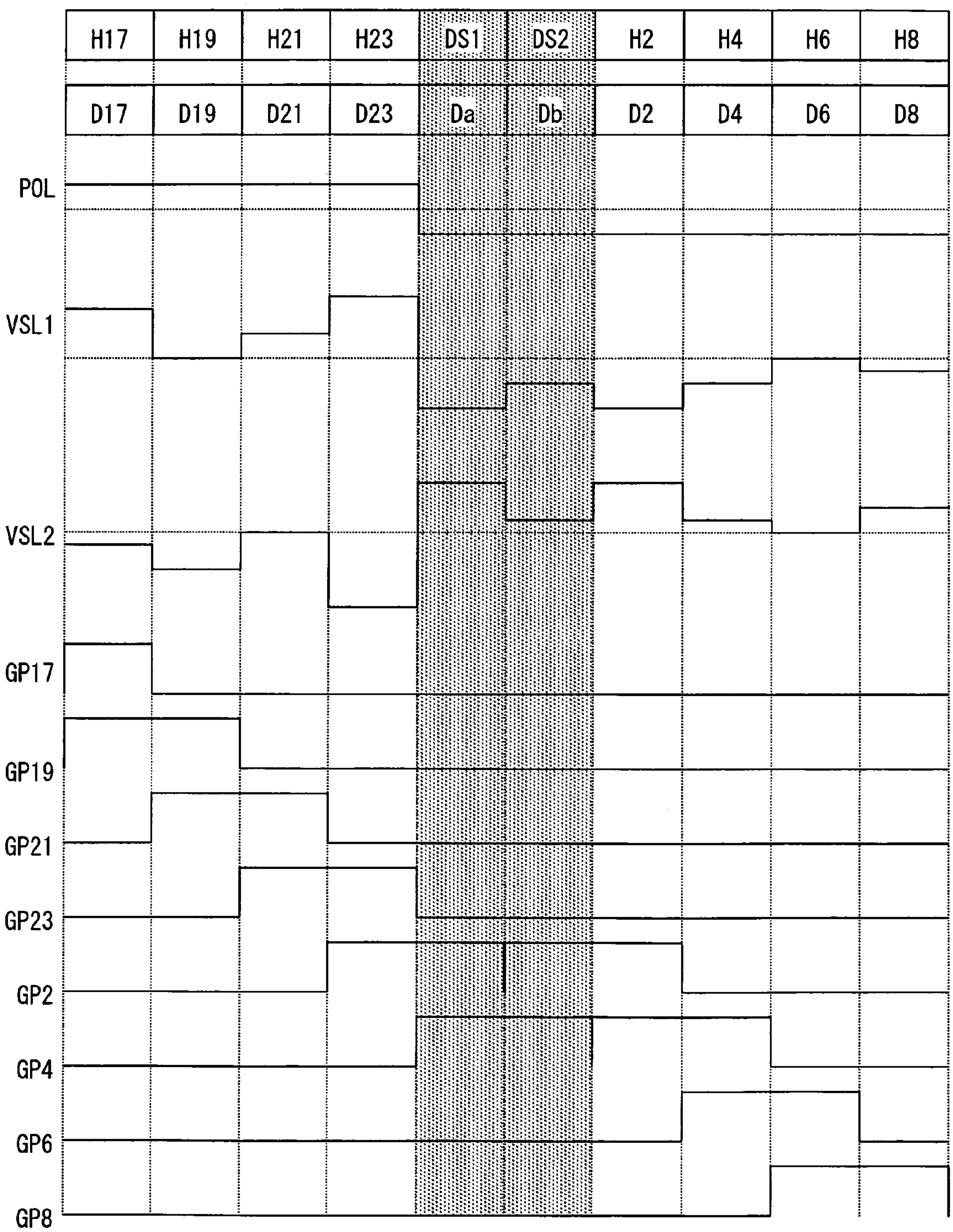
FIG. 21 is a timing chart showing in more detail the exemplary driving shown in FIG. 20.

In the arrangement of FIGS. 1, 2 and 4, the present liquid crystal display device may be arranged such that (i) the gate pulses GP0 through GP1081 are pulses each having a width that is two times as wide as a single horizontal scanning period (width equal to 2H), (ii) each scanning signal line is activated in synchronization with start of horizontal scanning or dummy scanning carried out immediately before horizontal scanning corresponding to the scanning signal line, and is deactivated in synchronization with end of the horizontal scanning corresponding to the scanning signal line, and (iii) each scanning signal line subjected to dummy scanning is activated in synchronization with start of horizontal scanning or dummy horizontal scanning carried out immediately before dummy horizontal scanning corresponding to the scanning signal line, and is deactivated in synchronization with end of the dummy scanning corresponding to the scanning signal line, as shown in FIGS. 20 and 21. Note that a storage capacitor wire signal SCSi (i is an integer in a range from 1 to 1080) supplied to a storage capacitor wire CSi is identical to that shown in FIGS. 1, 2 and 5.

Also in the arrangement shown in FIGS. 20 and 21, timing of horizontal scanning in each horizontal scanning period is identical to timing of dummy scanning in each dummy scanning period. Specifically, start (start of output of a signal electric potential) and end (end of output of the signal electric potential) of a horizontal scanning period coincide with start (start of writing of the signal electric potential) and end (end of writing of the signal electric potential) of corresponding horizontal scanning, respectively. Further, start (start of output of a dummy electric potential) and end (end of output of the dummy electric potential) of a dummy scanning period coincide with start (start of writing of the dummy electric potential) and end (end of writing of the dummy electric potential) of corresponding dummy scanning, respectively.

Here, the gate pulse GP23 supplied to the scanning signal line G23 is activated at the same time as start of horizontal scanning carried out immediately before horizontal scanning corresponding to the scanning signal line G23, i.e., at the same time as start of the horizontal scanning period H21. The gate pulse GP23 is active during two horizontal scanning periods, i.e., the horizontal scanning period H21 and the horizontal scanning period H23. Then, the gate pulse GP23 is deactivated at the same time as end of the horizontal scanning period H23. During the horizontal scanning period H21, a signal electric potential which corresponds to the video data D21 (video data corresponding to a pixel connected to the scanning signal line G21) and which has the same polarity (positive polarity) as signal electric potentials in the group Gr1 is supplied to the data signal line SL1. During the horizontal scanning period H23, a signal electric potential which corresponds to the video data D23 (video data corresponding to a pixel connected to the scanning signal line G23) and which has the same polarity (positive polarity) as the signal electric potentials in the group Gr1 is supplied to the data signal line SL1. That is, pre-charging is carried out during the horizontal scanning period H21, and main charging (writing of positive signal electric potentials corresponding to the video data D23) is carried out in horizontal scanning of the horizontal scanning period H23.

The gate pulse GP2 supplied to the scanning signal line G2 is activated at the same time as start of horizontal scanning carried out immediately before dummy scanning of the scanning signal line G2, i.e., at the same time as start of the horizontal scanning period H23. The gate pulse GP2 is active during two horizontal scanning periods, i.e., the horizontal scanning period H23 and the first dummy scanning period DS1. Then, the gate pulse GP2 is deactivated at the same time as end of the first dummy scanning period DS1.

The gate pulse GP4 supplied to the scanning signal line G4 is activated at the same time as start of dummy scanning carried out immediately before dummy scanning of the scanning signal line G4, i.e., at the same time as start of the first dummy scanning period DS1. The gate pulse GP4 is active during two horizontal scanning periods, i.e., the first dummy scanning period DS1 and the second dummy scanning period DS2. Then, the gate pulse GP4 is deactivated at the same time as end of the second dummy scanning period DS2.

The gate pulse GP2 supplied to the scanning signal line G2 is activated at the same time as start of dummy scanning carried out immediately before horizontal scanning corresponding to the scanning signal line G2, i.e., at the same time as start of the second dummy scanning period DS2. The gate pulse GP2 is active during two horizontal scanning periods, i.e., the second dummy scanning period DS2 and the horizontal scanning period H2. Then, the gate pulse GP2 is deactivated at the same time as end of the horizontal scanning period H2.

During the second dummy scanning period DS2, a signal electric potential which corresponds to the second dummy data Db and which has the same polarity (negative polarity) as the signal electric potentials in the group Gr2 is supplied to the data signal line SL1. During the horizontal scanning period H2, a signal electric potential which corresponds to the video data D2 (video data corresponding to a pixel connected to the scanning signal line G2) and which has the same polarity (positive polarity) as the signal electric potentials in the group Gr2 is supplied to the data signal line SL1. That is, pre-charging is carried out during the dummy scanning period DS2, and main charging (writing of a positive signal electric potential corresponding to the video data D2) is carried out in horizontal scanning of the horizontal scanning period H2.

Figure 22:
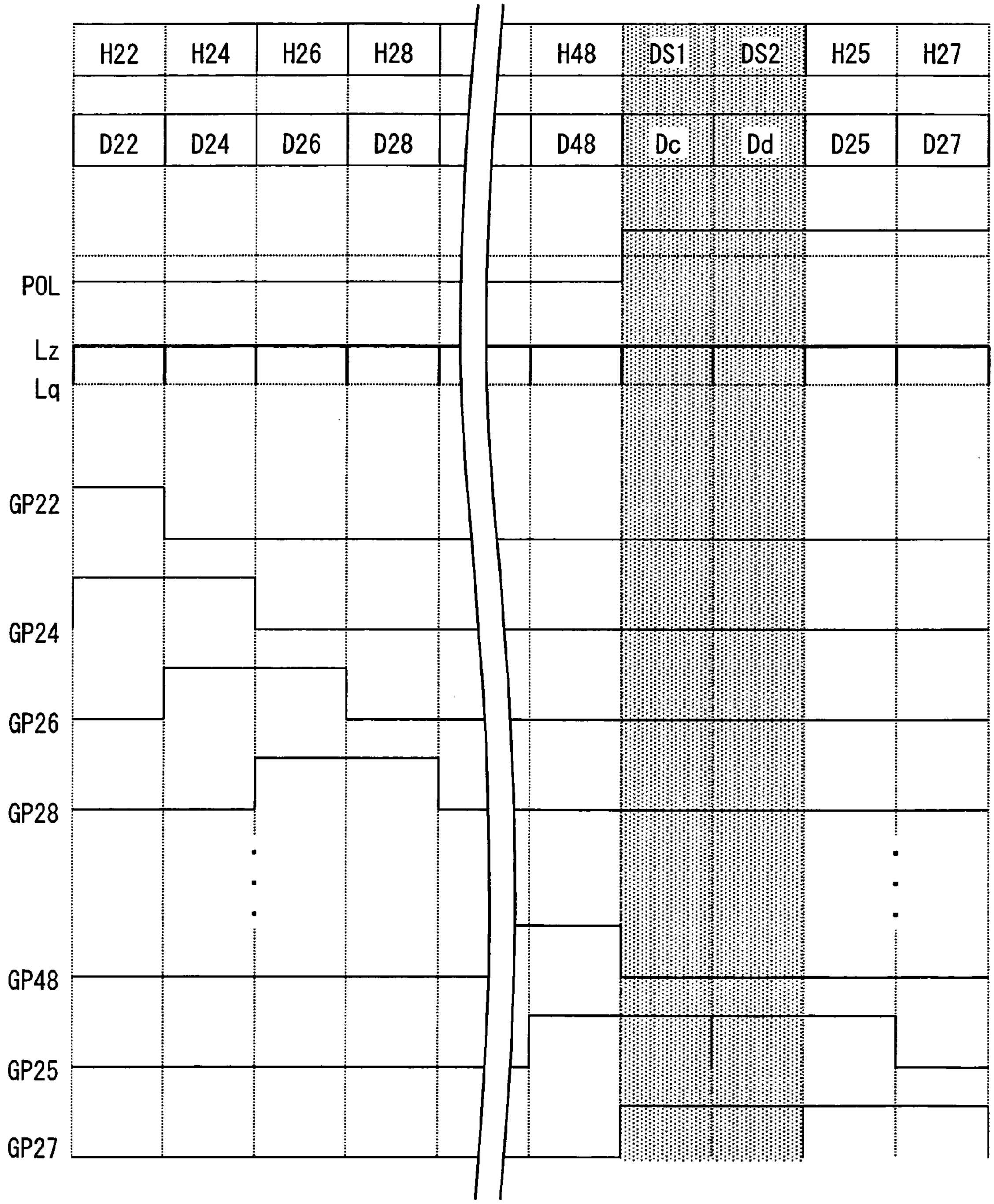
FIG. 22 is a timing chart showing a fluctuation in load applied to the scanning signal line driving circuit in the exemplary driving shown in FIG. 20.

Next, with reference to FIG. 22, the following discusses (i) a status of load applied to the scanning signal line driving circuit before start of scanning, at the time of start of scanning, and during the scanning of the scanning signal line G24, (ii) a status of load applied to the scanning signal line driving circuit before start of scanning, at the time of start of scanning, and during the scanning of the scanning signal line G25, and (iii) a status of load applied to the scanning signal line driving circuit before start of scanning, at the time of start of scanning, and during the scanning of the scanning signal line G26, the scanning signal lines G24, G25, and G26 being located in the vicinity of a border between the blocks B1 and B2. In FIG. 22, Lq represents load applied to the scanning signal line driving circuit when (i) a single scanning signal line is active, (ii) another scanning signal line is activated, and (iii) at the same time, still another scanning signal line is deactivated, and Lz represents load applied to the scanning signal line driving circuit while a single scanning signal line and another scanning signal line are being active.

Before start of scanning of the scanning signal line G24, a single scanning signal line, more specifically, the scanning signal line G22 and another scanning signal line, more specifically, the scanning signal line G24 are active. Accordingly, load applied to the scanning signal line driving circuit is Lz. At the time of start of scanning of the scanning signal line G24, a single scanning signal line, more specifically, the scanning signal line G24 is active, another scanning signal line, more specifically, the scanning signal line G26 is activated, and at the same time, still another scanning signal line, more specifically, the scanning signal line G22 is deactivated. Accordingly, load applied to the scanning signal line driving circuit is Lq. During the scanning of the scanning signal line G24, a single scanning signal line, more specifically, the scanning signal line G24 and another scanning signal line, more specifically, the scanning signal line G26 are active. Accordingly, load applied to the scanning signal line driving circuit is Lz.

Before start of scanning of the scanning signal line G25, a single scanning signal line, more specifically, the scanning signal line G25 and another scanning signal line, more specifically, the scanning signal line G27 are active. Accordingly, load applied to the scanning signal line driving circuit is Lz. At the time of start of scanning of the scanning signal line G25, a single scanning signal line, more specifically, the scanning signal line G25 is active, another scanning signal line, more specifically, the scanning signal line G27 is deactivated and activated. Accordingly, load applied to the scanning signal line driving circuit is Lq. During the scanning of the scanning signal line G25, a single scanning signal line, more specifically, the scanning signal line G25 and another scanning signal line, more specifically, the scanning signal line G27 are active. Accordingly, load applied to the scanning signal line driving circuit is Lz.

Before start of scanning of the scanning signal line G26, a single scanning signal line, more specifically, the scanning signal line G24 and another scanning signal line, more specifically, the scanning signal line G26 are active. Accordingly, load applied to the scanning signal line driving circuit is Lz.

At the time of start of scanning of the scanning signal line G26, a single scanning signal line, more specifically, the scanning signal line G26 is active, another scanning signal line, more specifically, the scanning signal line G28 is activated, and at the same time, still another scanning signal line, more specifically, the scanning signal line G24 is deactivated. Accordingly, load applied to the scanning signal line driving circuit is Lq. During the scanning of the scanning signal line G26, a single scanning signal line, more specifically, the scanning signal line G26 and another scanning signal line, more specifically, the scanning signal line G28 are active. Accordingly, load applied to the scanning signal line driving circuit is Lz.

As described above, also in the arrangement of FIGS. 20 and 21, a status of load applied to the scanning signal line driving circuit during a horizontal scanning period can be made identical to a status of load applied to the scanning signal line driving circuit during a dummy scanning period, and therefore a status of load applied to the scanning signal line driving circuit before and during scanning of one scanning signal line can be made identical to a status of load applied to the scanning signal line driving circuit before and during scanning of another scanning signal line. This can further reduce a difference in charging rate between (i) pixels connected to scanning signal lines that are subjected to horizontal scanning before and after polarity inversion of electric potentials and (ii) the other pixels, thereby further suppressing horizontal-striped unevenness occurring in the vicinity of borders of the blocks.

Further, according to this arrangement, load on the scanning signal line driving circuit is almost always kept at Lz during a vertical scanning period. That is, there is almost no fluctuation in load on the scanning signal line driving circuit. This makes the suppression of the horizontal-striped unevenness more effective. Further, as shown in FIG. 22, timings at which the load becomes Lq are periodical. This makes the suppression of the horizontal-striped unevenness further more effective.

Further, according to this arrangement, each pixel is precharged for a single horizontal scanning period. This can increase a charging rate of each pixel. In the arrangement of FIGS. 20 and 21, each dummy scanning period has a length equal to that of 1 horizontal scanning period. However, the present embodiment is not limited to this. Each dummy scanning period may be shorter or longer than 1 horizontal scanning period.

Embodiment 2

Figure 24:
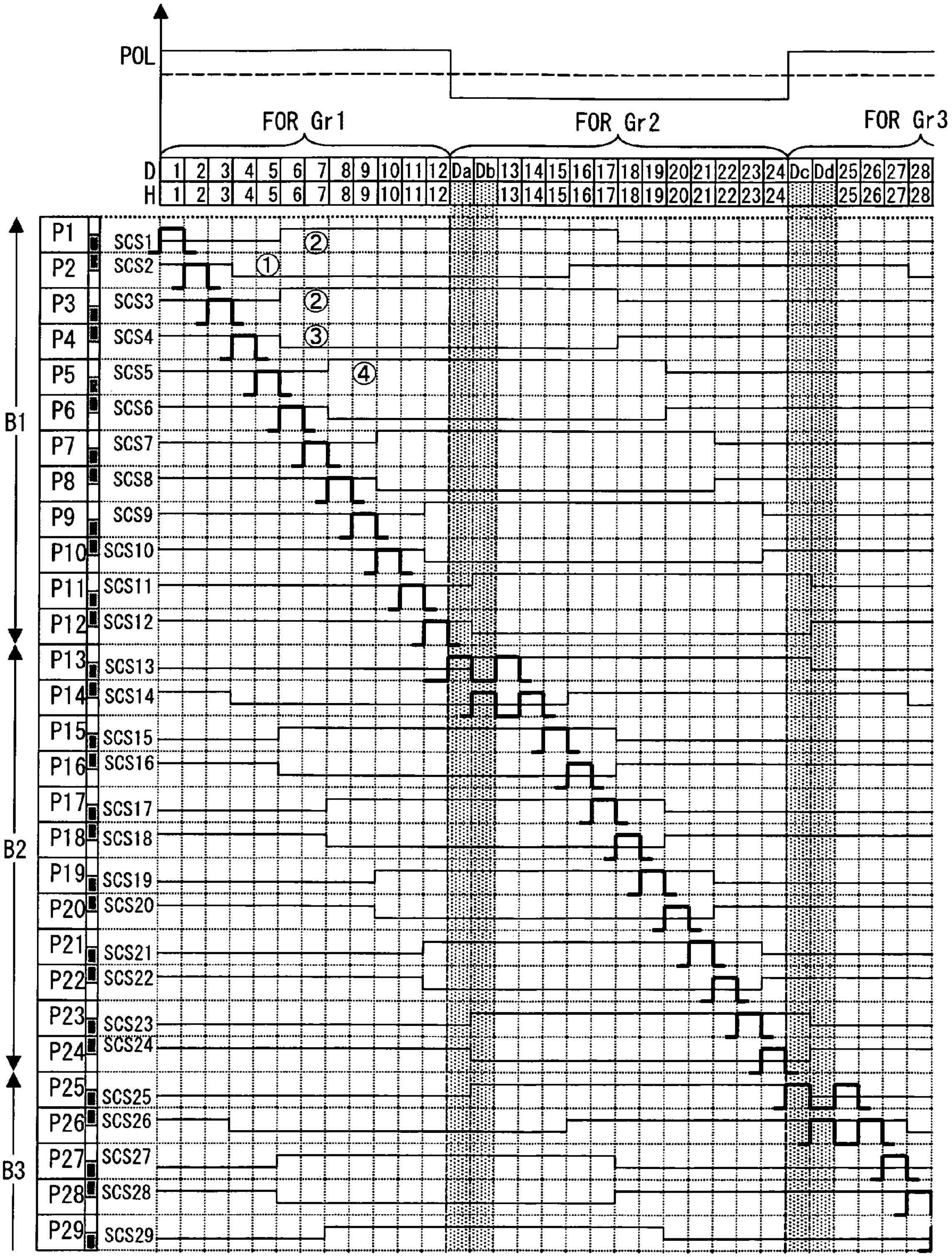
FIG. 24 is a timing chart showing an exemplary driving of a liquid crystal display device of Embodiment 2.
Figure 25:
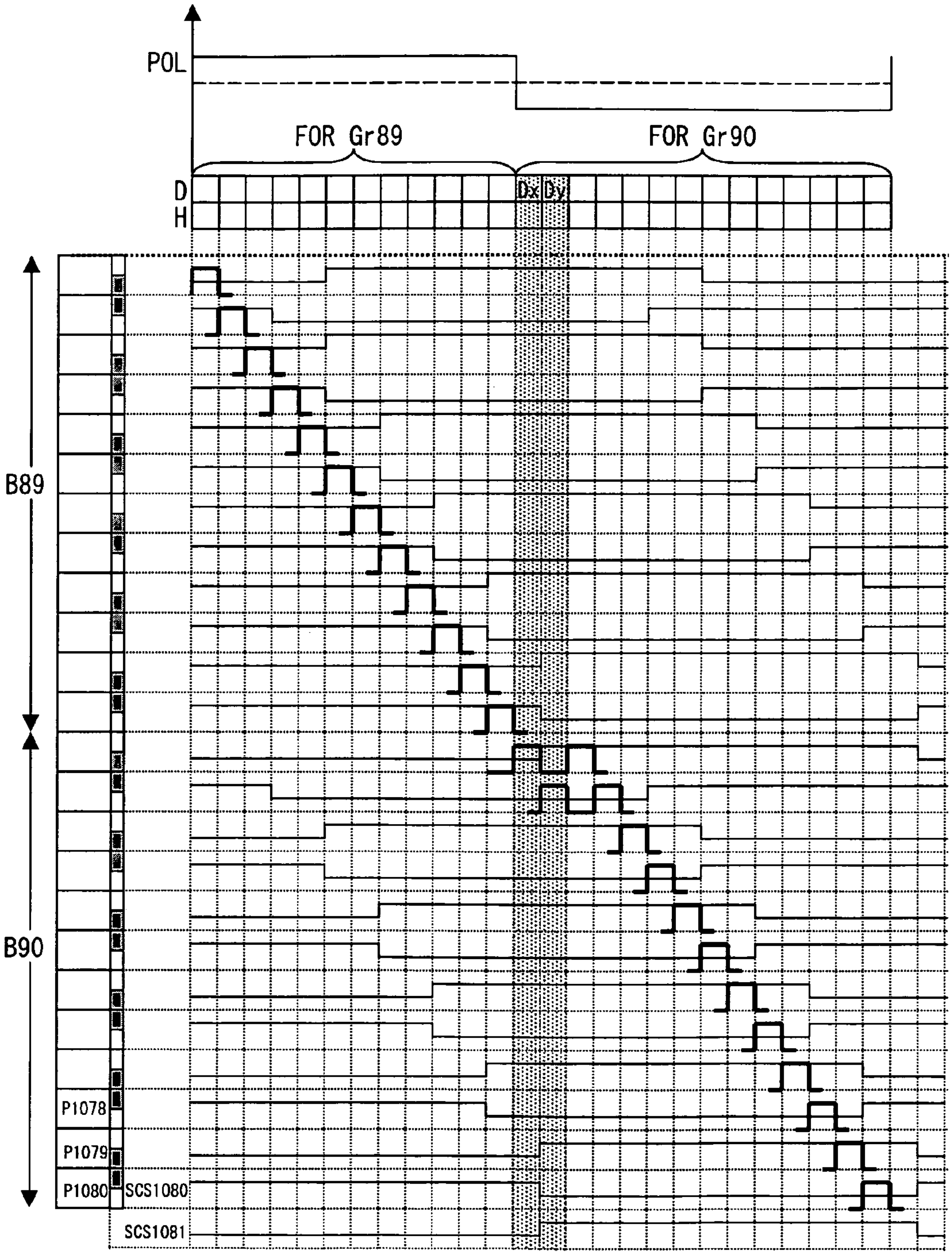
FIG. 25 is a continuation of the timing chart of FIG. 24.

In the present embodiment, the scanning signal lines are sequentially scanned while the data signal lines are subjected to block inversion driving, as shown in FIGS. 24 and 25. First, the scanning signal line G1 and the subsequent scanning signal lines in the display area are divided into 90 blocks (B1 through B90) by 89 borders parallel to the scanning signal lines. Each of the blocks includes 12 successive scanning signal lines. For example, the block B1, which is a most upstream side block, includes the scanning signal lines G1 through G12, the block B2 includes the scanning signal lines G13 through G24, the block B3 includes the scanning signal lines G25 through G36, and the block B90, which is a most downstream side block, includes the scanning signal lines G1069 through G1080.

Then, the scanning signal lines are divided into groups as follows. Specifically, a top group Gr1 is formed which includes the 12 scanning signal lines (G1, G2, . . . G12) included in the block B1 which is the most upstream side block, and a group Gr2 is formed which includes the 12 scanning signal lines (G13, G14, . . . G24) included in the block B2 which follows the block B1. Similarly, groups Gr3 through Gr90 are formed each of which includes 12 scanning signal lines included in a corresponding block. The groups Gr1 through Gr90 are sequentially selected in an order from the group Gr1 to the group Gr90. While scanning signal lines included in a selected group are sequentially scanned horizontally, signal electric potentials of the same polarity are sequentially supplied to a data signal line. Further, a polarity (positive or negative) of signal electric potentials supplied to a data signal line is inverted when a selected group is changed from a preceding group to a succeeding group that is selected immediately after the preceding group, as indicated by the polarity inverting signal POL of FIGS. 24 and 25.

Specifically, the group Gr1 is first selected. While the scanning signal lines (G1, G2, . . . G12) belonging to the group Gr1 are sequentially scanned horizontally, positive signal electric potentials corresponding to the video data (D1, D2, . . . D12) are sequentially supplied to the data signal line SL1. Next, the group Gr2 is selected. While the scanning signal lines (G13, G14, . . . G24) belonging to the group Gr2 are sequentially scanned horizontally, negative signal electric potentials corresponding to the video data (D13, D14, . . . D24) are sequentially supplied to the data signal line SL1. Next, the group Gr3 is selected. While the scanning signal lines (G25, G26, . . . G48) belonging to the group Gr3 are sequentially scanned horizontally, positive signal electric potentials corresponding to the video data (D25, D26, . . . D48) are sequentially supplied to the data signal line SL1. Here, it is assumed that a period in which a signal electric potential corresponding to single video data is supplied (outputted) to a data signal line is a horizontal scanning period (H).

During the first dummy scanning period, a scanning signal line which is the first one to be subjected to horizontal scanning in the succeeding group is subjected to dummy scanning so as to be made active for a predetermined period of time. Then, the scanning signal line is deactivated. During the first dummy scanning period, a dummy electric potential which corresponds to the first dummy data and which has the same polarity as signal electric potentials in the succeeding group is supplied to a data signal line. The first dummy data is identical to video data corresponding to horizontal scanning carried out immediately after dummy scanning of the scanning signal line (the first one to be subjected to horizontal scanning in the succeeding group). Further, during the second dummy scanning period, a scanning signal line which is the second one to be subjected to horizontal scanning in the succeeding group is subjected to dummy scanning so as to be made active for a predetermined period of time. Then, the scanning signal line is deactivated. During the second dummy scanning period, a dummy electric potential which corresponds to the second dummy data and which has the same polarity as the signal electric potentials in the succeeding group is supplied to the data signal line. The second dummy data is identical to video data corresponding to horizontal scanning carried out immediately after dummy scanning of the scanning signal line (the second one to be subjected to horizontal scanning in the succeeding group).

Here, timing of horizontal scanning in each horizontal scanning period is identical to timing of dummy scanning in each dummy scanning period. Specifically, start (start of output of a signal electric potential) and end (end of output of the signal electric potential) of a horizontal scanning period coincide with start (start of writing of the signal electric potential) and end (end of writing of the signal electric potential) of corresponding horizontal scanning, respectively. Further, start (start of output of a dummy electric potential) and end (end of output of the dummy electric potential) of a dummy scanning period coincide with start (start of writing of the dummy electric potential) and end (end of writing of the dummy electric potential) of corresponding dummy scanning, respectively.

Further, each of gate pulses GP1 through GP1080 respectively supplied to the scanning signal lines G1 through G1080 has width equal to 1 horizontal scanning period (1H). Each scanning signal line is activated at the same time as start of corresponding horizontal scanning, and each scanning signal line (the first one and the second one to be subjected to horizontal scanning in the succeeding group) subjected to dummy scanning also is activated at the same time as start of corresponding dummy scanning.

Figure 26:
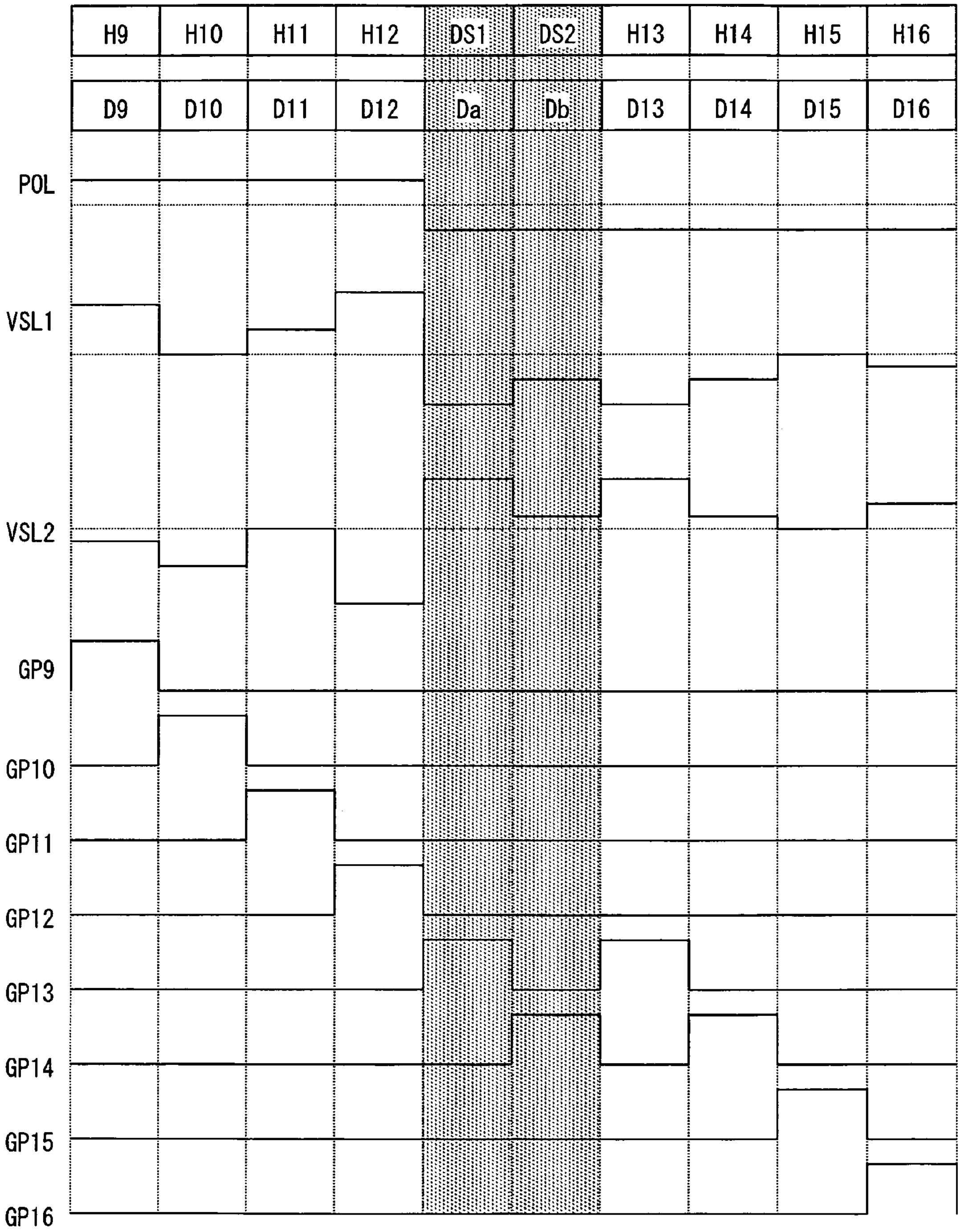
FIG. 26 is a timing chart showing in more detail the exemplary driving shown in FIGS. 24 and 25.

For example, as shown in FIGS. 24 and 26, first dummy data Da and second dummy data Db are inserted between video data D12 corresponding to the last horizontal scanning (horizontal scanning of G12) in the group Gr1 and video data D13 corresponding to the first horizontal scanning (horizontal scanning of G13) in the group Gr2, and first dummy scanning period DS1 and second dummy scanning period DS2 are inserted between a horizontal scanning period H12 corresponding to the last horizontal scanning in the group Gr1 and a horizontal scanning period H13 corresponding to the first horizontal scanning in the group Gr2.

Here, the gate pulse GP12 supplied to the scanning signal line G12 is activated at the same time as start of the horizontal scanning period H12, and the gate pulse GP12 is deactivated at the same time as end of the horizontal scanning period H12. During the horizontal scanning period H12, a signal electric potential which corresponds to the video data D12 (video data corresponding to a pixel connected to the scanning signal line G12) and which has the same polarity (positive polarity) as the signal electric potentials in the group Gr1 is supplied to the data signal line SL1.

Next, the gate pulse GP13 supplied to the scanning signal line G13 which is the first one to be subjected to horizontal scanning in the group Gr2 is activated at the same time as start of the first dummy scanning period DS1, and the gate pulse GP13 is deactivated at the same time as end of the first dummy scanning period DS1. During the first dummy scanning period DS1, a dummy electric potential which corresponds to the first dummy data Da and which has the same polarity (negative polarity) as the signal electric potentials in the group Gr2 is supplied to the data signal line SL1. The first dummy data Da is identical to the video data D13 (data of a next frame) corresponding to horizontal scanning that is carried out immediately after the dummy scanning of the scanning signal line G13. Accordingly, as indicated by the electric potential VSL1 (see FIG. 26) supplied to the data signal line SL1, the dummy electric potential supplied during the first dummy scanning period DS1 is identical to the signal electric potential supplied during the horizontal scanning period H13.

Next, the gate pulse GP14 supplied to the scanning signal line G14 which is the second one to be subjected to horizontal scanning in the group Gr2 is activated at the same time as start of the second dummy scanning period DS2, and the gate pulse GP14 is deactivated at the same time as end of the second dummy scanning period DS2. During the second dummy scanning period DS2, a dummy electric potential which corresponds to the second dummy data Db and which has the same polarity (negative polarity) as the signal electric potentials in the group Gr2 is supplied to the data signal line SL1. The second dummy data Db is identical to the video data D14 (data of a next frame) corresponding to horizontal scanning that is carried out immediately after the dummy scanning of the scanning signal line G14. Accordingly, as indicated by the electric potential VSL1 (see FIG. 26) supplied to the data signal line SL1, the dummy electric potential supplied during the second dummy scanning period DS2 is identical to the signal electric potential supplied during the horizontal scanning period H14.

Next, the gate pulse GP13 supplied to the scanning signal line G13 is activated at the same time as start of the horizontal scanning period H13, and the gate pulse GP13 is deactivated at the same time as end of the horizontal scanning period H13. During the horizontal scanning period H13, a signal electric potential which corresponds to the video data D13 (video data corresponding to a pixel connected to the scanning signal line G13) and which has the same polarity (negative polarity) as the signal electric potentials in the group Gr2 is supplied to the data signal line SL1.

Figure 27:
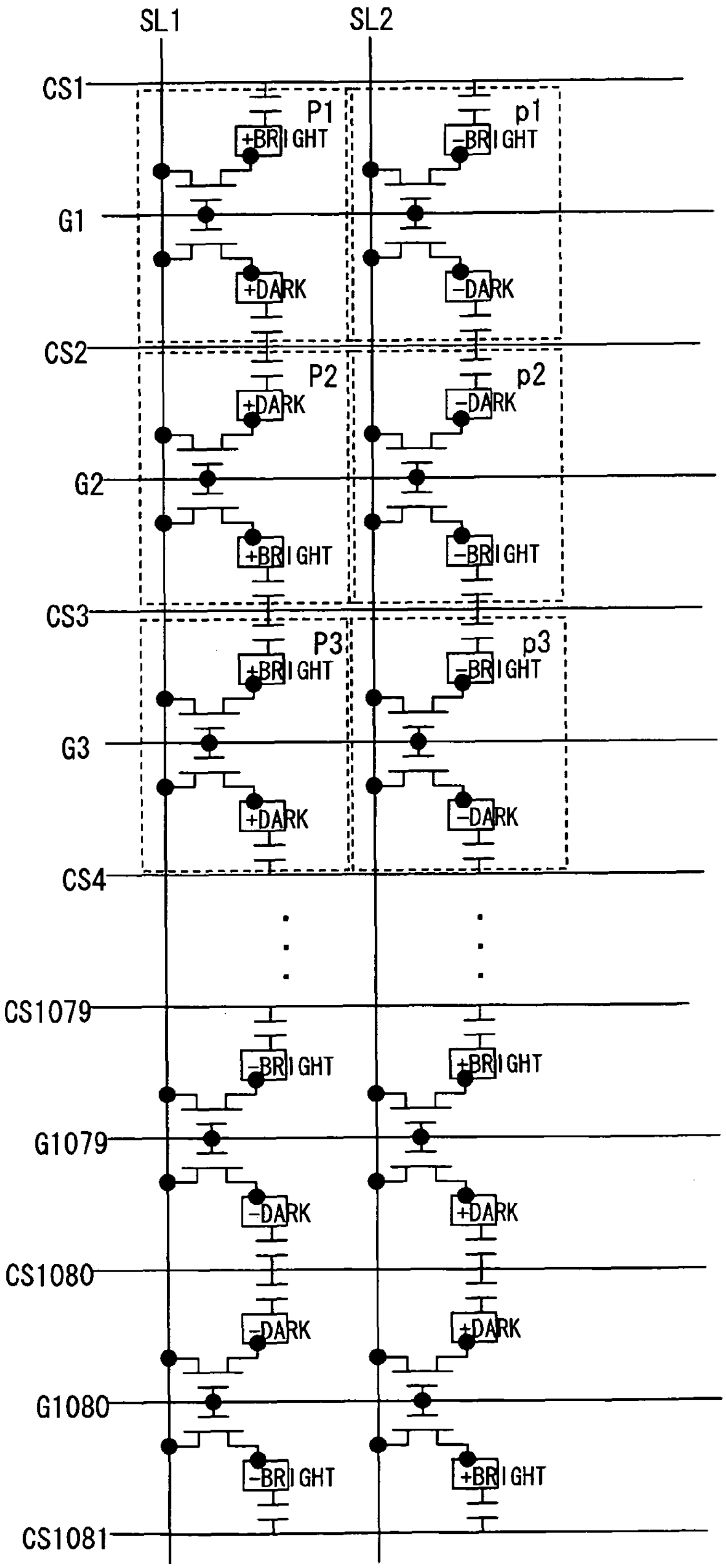
FIG. 27 is a view schematically illustrating a polarity distribution of written electric potentials in the present liquid crystal display device.

In the present embodiment in which the scanning signal lines are sequentially scanned while the data signal lines are subjected to block inversion driving, a polarity distribution of electric potentials written into the pixels is as shown in FIG. 27.

Figure 28:
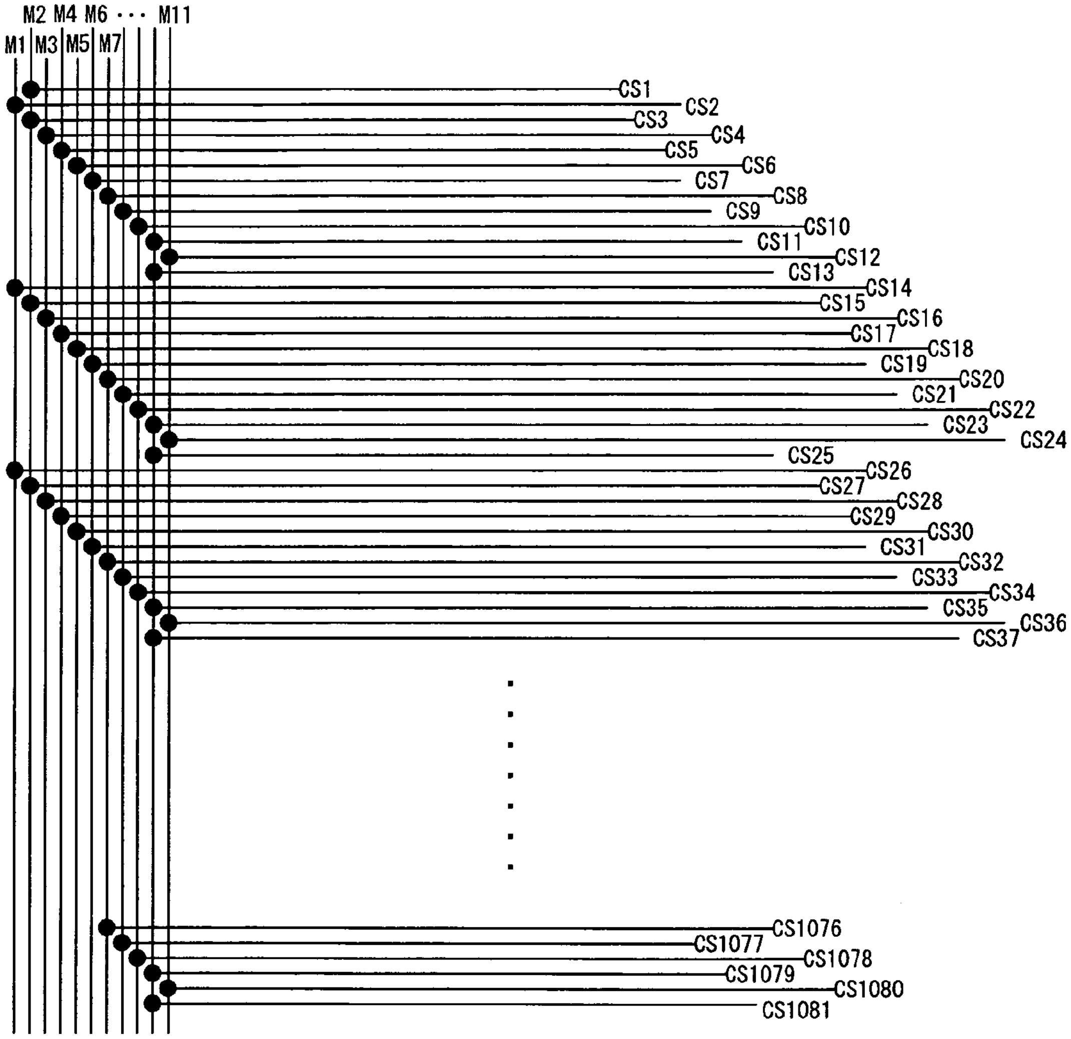
FIG. 28 is a view schematically illustrating how storage capacitor wires are connected to storage capacitor main wires.

Next, with reference to FIGS. 24, 25 and 28, the following describes a storage capacitor wire signal SCSi supplied to a storage capacitor wire CSi (i is an integer in a range from 1 to 1080). As shown in FIGS. 24 and 25, each of the storage capacitor wire signals SCS1 through SCS1081 has any one of waveforms of 11 phases (first phase represented by the storage capacitor wire signal SCS2, second phase represented by the storage capacitor wire signals SCS1 and SCS3, third phase represented by the storage capacitor wire signal SCS4, fourth phase represented by the storage capacitor wire signal SCS5, fifth phase represented by the storage capacitor wire signal SCS6, sixth phase represented by the storage capacitor wire signal SCS7, seventh phase represented by the storage capacitor wire signal SCS8, eighth phase represented by the storage capacitor wire signal SCS9, ninth phase represented by the storage capacitor wire signal SCS10, tenth phase represented by the storage capacitor wire signal SCS11, eleventh phase represented by the storage capacitor wire signal SCS12).

These phases have an identical cycle (28H cycle constituted by a first section in which a High level continues for 14H and a second section in which a Low level continues for 1.4H). The second phase represented by the storage capacitor wire signal SCS1 is behind the first phase represented by the storage capacitor wire signal SCS2 by 16H. One of any two successive odd-numbered phases is behind the other one which is followed by the one by 2H, and one of any two successive even-numbered phases is behind the other one which is followed by the one by 2H. For example, the third phase represented by the storage capacitor wire signal SCS4 is behind the first phase represented by the storage capacitor wire signal SCS2 by 2H, and the fourth phase represented by the storage capacitor wire signal SCS5 is behind the second phase represented by the storage capacitor wire signal SCS3 by 2H.

A storage capacitor wire signal SCS(12*j*+2) (j is an integer in a range from 0 to 89) has the first phase, the storage capacitor wire signal SCS1 and a storage capacitor wire signal SCS(12*j*+3) have the second phase, a storage capacitor wire signal SCS(12*j*+4) has the third phase, a storage capacitor wire signal SCS(12*j*+5) has the fourth phase, a storage capacitor wire signal SCS(12*j*+6) has the fifth phase, a storage capacitor wire signal SCS(12*j*+7) has the sixth phase, a storage capacitor wire signal SCS(12*j*+8) has the seventh phase, a storage capacitor wire signal SCS(12*j*+9) has the eighth phase, and a storage capacitor wire signal SCS(12*j*+

10) has the ninth phase. Further, a storage capacitor wire signal SCS(12*j*+11) (j is an integer in a range from 0 to 89) and a storage capacitor wire signal SCS(12*k*+13) (k is an integer in a range from 0 to 89) have the tenth phase. Further, a storage capacitor wire signal SCS(12*j*+12) (j is an integer in a range from 0 to 89) has the eleventh phase.

As shown in FIG. 28, the storage capacitor wire signals of the first through eleventh phases are supplied to storage capacitor main wires M1 through M11, respectively. A storage capacitor wire CS(12*j*+2) (j is an integer in a range from 0 to 89) is connected to the storage capacitor main wire M1, the storage capacitor wire CS1 and a storage capacitor wire CS(12*j*+3) are connected to the storage capacitor main wire M2, a storage capacitor wire CS(12*j*+4) is connected to the storage capacitor main wire M3, a storage capacitor wire CS(12*j*+5) is connected to the storage capacitor main wire M4, a storage capacitor wire CS(12*j*+6) is connected to the storage capacitor main wire M5, a storage capacitor wire CS(12*j*+7) is connected to the storage capacitor main wire M6, a storage capacitor wire CS(12*j*+8) is connected to the storage capacitor main wire M7, a storage capacitor wire CS(12*j*+9) is connected to the storage capacitor main wire M8, and a storage capacitor wire CS(12*j*+10) is connected to the storage capacitor main wire M9. Further, a storage capacitor wire CS(12*j*+11) (j is an integer in a range from 0 to 89) and a storage capacitor wire CS(12*k*+13) (k is an integer in a range from 0 to 89) are connected to the storage capacitor main wire M10. Further, a storage capacitor wire CS(12*j*+12) (j is an integer in a range from 0 to 89) is connected to the storage capacitor main wire M11.

The waveforms of the storage capacitor wire signals SCS1 through SCS1081 are as described above. In the present liquid crystal display device, as shown in FIG. 24, the storage capacitor wire signal SCS1 (second phase) has “L” level during the horizontal scanning period H1 corresponding to the scanning signal line G1, and is level-shifted from “L” level to “H” level at a timing when 4H elapses after the end of the horizontal scanning period H1, and the storage capacitor wire signal SCS2 (first phase) has “H” level during the horizontal scanning period H1 corresponding to the scanning signal line G1, and is level-shifted from “H” level to “L” level at a timing when 2H elapses after the end of the horizontal scanning period H1.

One of the two sub-pixels of the pixel P1 includes a pixel electrode that forms storage capacitance with the storage capacitor wire CS1, and the other one of the two sub-pixels includes a pixel electrode that forms storage capacitance with the storage capacitor wire CS2. A positive signal electric potential is supplied to the two pixel electrodes during the horizontal scanning period H1, but as the storage capacitor wire signal SCS1 is level-shifted from “L” level to “H” level, an electric potential of the pixel electrode that forms the storage capacitance with the storage capacitor wire CS1 increases, and as the storage capacitor wire signal SCS2 is level-shifted from “H” level to “L” level, an electric potential of the pixel electrode that forms the storage capacitance with the storage capacitor wire CS2 declines. Here, the storage capacitor wire signal SCS1 has an effective electric potential higher than a reference electric potential until 1 vertical scanning period elapses from the level-shift, and the storage capacitor wire signal SCS2 has an effective electric potential lower than the reference electric potential until 1 vertical scanning period elapses from the level-shift. Thus, the sub-pixel including the pixel electrode that forms storage capacitance with the storage capacitor wire CS1 becomes a “bright sub-pixel”, and the sub-pixel including the pixel electrode that forms storage capacitance with the storage capacitor wire CS2 becomes a “dark sub-pixel”, as shown in FIG. 27. A halftone can be displayed by these bright and dark sub-pixels.

Since the storage capacitor wire signals SCS1 and SCS2 (first and second phases) are set as above, the storage capacitor wire signal SCS2 (first phase) has “H” level during the horizontal scanning period H2 corresponding to the scanning signal line G2, and is level-shifted from “H” level to “L” level at a timing when 1H elapses after the end of the horizontal scanning period H2, and the storage capacitor wire signal SCS3 (second phase) has “L” level during the horizontal scanning period H2 corresponding to the scanning signal line G2, and is level-shifted from “L” level to “H” level at a timing when 3H elapses after the end of the horizontal scanning period H2.

One of the two sub-pixels of the pixel P2 includes a pixel electrode that forms storage capacitance with the storage capacitor wire CS2, and the other one of the two sub-pixels includes a pixel electrode that forms storage capacitance with the storage capacitor wire CS3. A positive signal electric potential is supplied to the two pixel electrodes during the horizontal scanning period H1, but as the storage capacitor wire signal SCS2 is level-shifted from “H” level to “L” level, an electric potential of the pixel electrode that forms the storage capacitance with the storage capacitor wire CS2 declines, and as the storage capacitor wire signal SCS3 is level-shifted from “L” level to “H” level, an electric potential of the pixel electrode that forms the storage capacitance with the storage capacitor wire CS3 increases. Here, the storage capacitor wire signal SCS2 has an effective electric potential lower than a reference electric potential until 1 vertical scanning period elapses from the level-shift, and the storage capacitor wire signal SCS3 has an effective electric potential higher than the reference electric potential until 1 vertical scanning period elapses from the level-shift. Thus, the sub-pixel including the pixel electrode that forms storage capacitance with the storage capacitor wire CS2 becomes a “dark sub-pixel”, and the sub-pixel including the pixel electrode that forms storage capacitance with the storage capacitor wire CS3 becomes a “bright sub-pixel”, as shown in FIG. 27. A halftone can be displayed by these bright and dark sub-pixels.

Since the storage capacitor wire signals SCS1 and SCS2 (first and second phases) are set as above, the storage capacitor wire signal SCS13 (tenth phase) has “H” level during the horizontal scanning period H13 corresponding to the scanning signal line G13, and is level-shifted from “H” level to “L” level at a timing when 12H elapses after the end of the horizontal scanning period H13, and the storage capacitor wire signal SCS14 (first phase) has “L” level during the horizontal scanning period H13 corresponding to the scanning signal line G13, and is level-shifted from “L” level to “H” level at a timing when 2H elapses after the end of the horizontal scanning period H13.

One of two sub-pixels of the pixel P13 includes a pixel electrode that forms storage capacitance with the storage capacitor wire CS13, and the other one of the two sub-pixels includes a pixel electrode that forms storage capacitance with the storage capacitor wire CS14. A negative signal electric potential is supplied to the two pixel electrodes during the horizontal scanning period H13, but as the storage capacitor wire signal SCS13 is level-shifted from “H” level to “L” level, an electric potential of the pixel electrode that forms the storage capacitance with the storage capacitor wire CS13 declines, and as the storage capacitor wire signal SCS14 is level-shifted from “L” level to “H” level, an electric potential of the pixel electrode that forms the storage capacitance with the storage capacitor wire CS14 increases. Here, the storage capacitor wire signal SCS13 has an effective electric potential lower than a reference electric potential until 1 vertical scanning period elapses from the level-shift, and the storage capacitor wire signal SCS14 has an effective electric potential higher than the reference electric potential until 1 vertical scanning period elapses from the level-shift. Thus, the sub-pixel including the pixel electrode that forms storage capacitance with the storage capacitor wire CS13 becomes a "bright sub-pixel", and the sub-pixel including the pixel electrode that forms storage capacitance with the storage capacitor wire CS14 becomes a "dark sub-pixel". A halftone can be displayed by these bright and dark sub-pixels.

According to the present liquid crystal display device, two sub-pixels included in a single pixel are "bright sub-pixel" and "dark sub-pixel" as shown in FIG. 27, and a halftone can be displayed by the "bright sub-pixel" and "dark sub-pixel". This allows an improvement in viewing angle characteristics. Further, in a single pixel column, a set of bright sub-pixel, dark sub-pixel, dark sub-pixel, and bright sub-pixel is repeatedly disposed as shown in FIGS. 24 and 25. This can reduce horizontal-shaped unevenness.

According to the present liquid crystal display device, it is possible to suppress power consumption and heat generation of the drivers and to increase charging rate of the pixels as compared to a case where the data signal lines are subjected to dot inversion (1H inversion) driving. Further, immediately after inversion of a polarity of signal electric potentials supplied to a data signal line, a dummy electric potential having the same polarity as that obtained after the inversion is supplied to the data signal line throughout the first and second dummy scanning periods. This makes it possible to reduce a difference in charging rate between (i) a pixel connected to the first scanning signal line in each block and (ii) the other pixels. Consequently, it is possible to suppress horizontal-striped unevenness that can be observed in the vicinity of borders between the blocks in a case where block inversion driving is carried out.

A noteworthy point is that since a single scanning signal line is activated for a predetermined period of time during each of the first and second dummy scanning period, and is then deactivated, a status of load applied to a scanning signal line driving circuit before start of scanning, at the start of the scanning, and during the scanning of one scanning signal line can be made identical to a status of load applied to the scanning signal line driving circuit before start of scanning, at the start of the scanning, and during the scanning of another scanning signal line.

Figure 29:
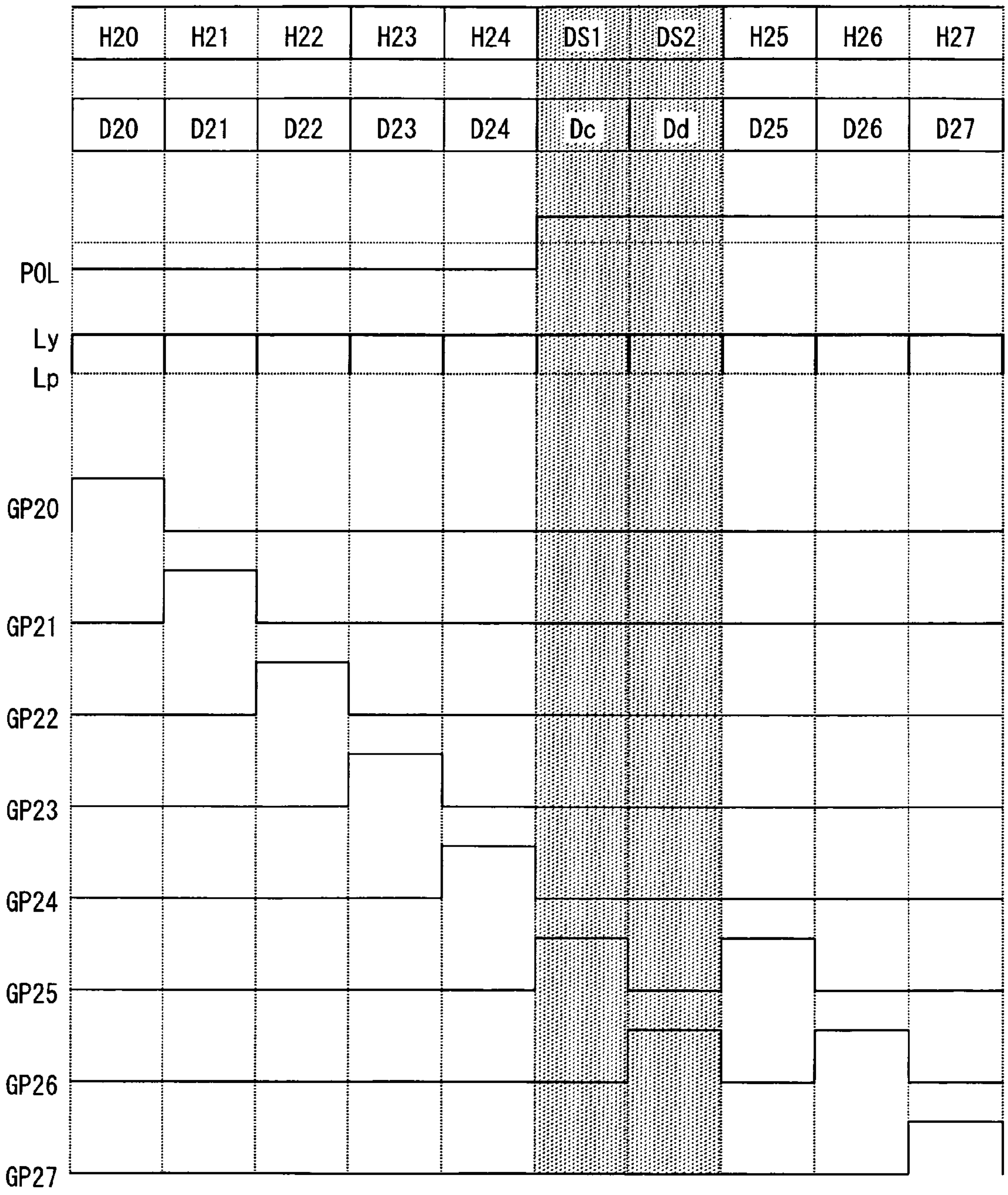
FIG. 29 is a timing chart showing a fluctuation in load applied to a scanning signal line driving circuit in the exemplary driving shown in FIGS. 24 and 25.

Next, with reference to FIG. 29, the following discusses (i) a status of load applied to the scanning signal line driving circuit before start of scanning, at the time of start of scanning, and during the scanning of the scanning signal line G24, (ii) a status of load applied to the scanning signal line driving circuit before start of scanning, at the time of start of scanning, and during the scanning of the scanning signal line G25, and (iii) a status of load applied to the scanning signal line driving circuit before start of scanning, at the time of start of scanning, and during the scanning of the scanning signal line G26, the scanning signal lines G24, G25, and G26 being located in the vicinity of a border between the blocks B1 and B2. In FIG. 29, Lp represents load applied to the scanning signal line driving circuit when a single scanning signal line is activated and another scanning signal line is deactivated at the same time, and Ly represents load applied to the scanning signal line driving circuit while a single scanning signal line is being active.

Before start of scanning of the scanning signal line G24, a single scanning signal line, more specifically, the scanning signal line G23 is active. Accordingly, load on the scanning signal line driving circuit is Ly. At the time of the start of the scanning of the scanning signal line G24, a single scanning signal line, more specifically, the scanning signal line G24 is activated, and at the same time, another scanning signal line, more specifically, the scanning signal line G23 is deactivated. Accordingly, load on the scanning signal line driving circuit is Lp. During the scanning of the scanning signal line G24, a single scanning signal line, more specifically, the scanning signal line G24 is active. Accordingly, load on the scanning signal line driving circuit is Ly.

Before start of scanning of the scanning signal line G25, a single scanning signal line, more specifically, the scanning signal line G26 is active. Accordingly, load on the scanning signal line driving circuit is Ly. At the time of the start of the scanning of the scanning signal line G25, a single scanning signal line, more specifically, the scanning signal line G25 is activated, and at the same time, another scanning signal line, more specifically, the scanning signal line G26 is deactivated. Accordingly, load on the scanning signal line driving circuit is Lp. During the scanning of the scanning signal line G25, a single scanning signal line, more specifically, the scanning signal line G25 is active. Accordingly, load on the scanning signal line driving circuit is Ly.

Before start of scanning of the scanning signal line G26, a single scanning signal line, more specifically, the scanning signal line G25 is active. Accordingly, load on the scanning signal line driving circuit is Ly. At the time of the start of the scanning of the scanning signal line G26, a single scanning signal line, more specifically, the scanning signal line G26 is activated, and at the same time, another scanning signal line, more specifically, the scanning signal line G25 is deactivated. Accordingly, load on the scanning signal line driving circuit is Lp. During the scanning of the scanning signal line G26, a single scanning signal line, more specifically, the scanning signal line G26 is active. Accordingly, load on the scanning signal line driving circuit is Ly.

As described above, in the present liquid crystal display device, in a case where dummy scanning periods are inserted immediately after inversion of a polarity of electric potentials of a data signal line, a status of load applied to the scanning signal line driving circuit during a horizontal scanning period can be made identical to a status of load applied to the scanning signal line driving circuit during a dummy scanning period. Accordingly, a status of load applied to the scanning signal line driving circuit before scanning, at the time of start of the scanning, and during the scanning of one scanning signal line can be made identical to a status of load applied to the scanning signal line driving circuit before scanning, at the time of start of the scanning, and during the scanning of another scanning signal line. This makes it possible to reduce a difference in charging rate between (i) pixels connected to scanning signal lines which are subjected to horizontal scanning before and after inversion of a polarity of electric potentials and (ii) the other pixels. As a result, it is possible to suppress horizontal-striped unevenness in the vicinity of borders between the blocks.

Further, in the present liquid crystal display device, load on the scanning signal line driving circuit is almost always kept at Ly during a vertical scanning period. That is, there is almost no fluctuation in load on the scanning signal line. This makes the suppression of the horizontal-striped unevenness more effective. Further, as shown in FIG. 29, timings at which the load becomes Lp are periodical. This makes the suppression of the horizontal-striped unevenness further more effective.

In the arrangement of FIGS. 24 through 26, each dummy scanning period has a length equal to that of 1 horizontal scanning period. However, the present embodiment is not limited to this. Each dummy scanning period may be shorter or longer than 1 horizontal scanning period.

Figure 30:
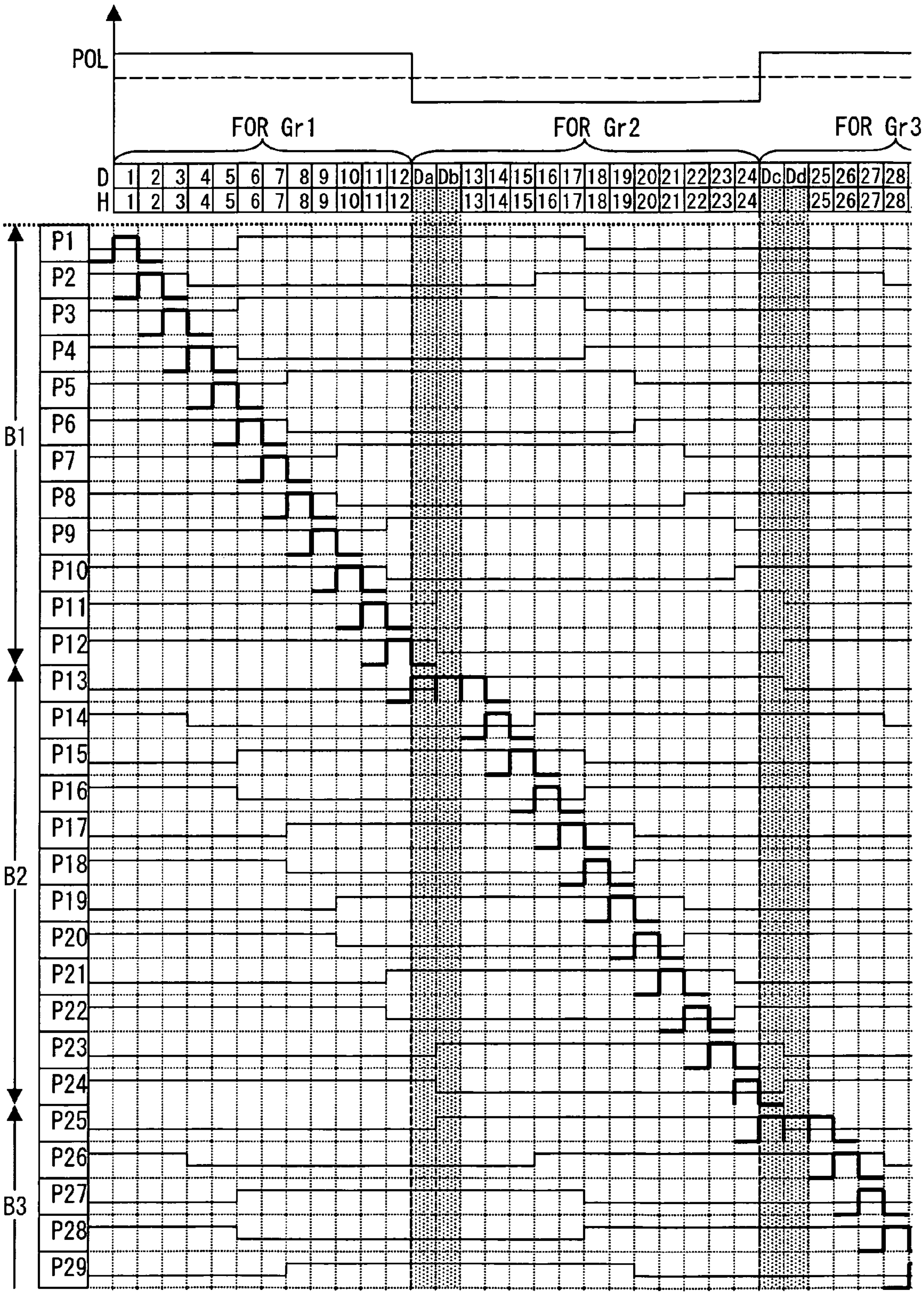
FIG. 30 is a timing chart showing another exemplary driving of the present liquid crystal display device.

In the arrangement of FIGS. 24 through 26, a scanning signal line which is the first one to be subjected to horizontal scanning in the succeeding group is subjected to dummy scanning during the first dummy scanning period, and a scanning signal line which is the second one to be subjected to horizontal scanning in the succeeding group is subjected to dummy scanning during the second dummy scanning period. However, the present embodiment is not limited to this. For example, it is also possible that (i) the scanning signal line which is the first one to be subjected to horizontal scanning in the succeeding group is subjected to dummy scanning during the first dummy scanning period so as to be made active for a predetermined period of time, and is then deactivated, and (ii) the scanning signal line which is the first one to be subjected to horizontal scanning in the succeeding group is subjected to dummy scanning again during the second dummy scanning period so as to be made active for a predetermined period of time, and is then deactivated, as shown in FIG. 30.

In the arrangement of FIGS. 24 through 26, the present liquid crystal display device may be arranged such that (i) the gate pulses GP0 through GP1081 are pulses each having a width that is two times as wide as a single horizontal scanning period (width equal to 2H), (ii) each scanning signal line is activated in synchronization with start of horizontal scanning or dummy scanning carried out immediately before horizontal scanning corresponding to the scanning signal line, and is deactivated in synchronization with end of the horizontal scanning corresponding to the scanning signal line, and (iii) each scanning signal line subjected to dummy scanning is activated in synchronization with start of horizontal scanning or dummy horizontal scanning carried out immediately before dummy horizontal scanning corresponding to the scanning signal line, and is deactivated in synchronization with end of the dummy scanning corresponding to the scanning signal line. Also in this arrangement, timing of horizontal scanning in each horizontal scanning period is identical to timing of dummy scanning in each dummy scanning period.

Figure 31:
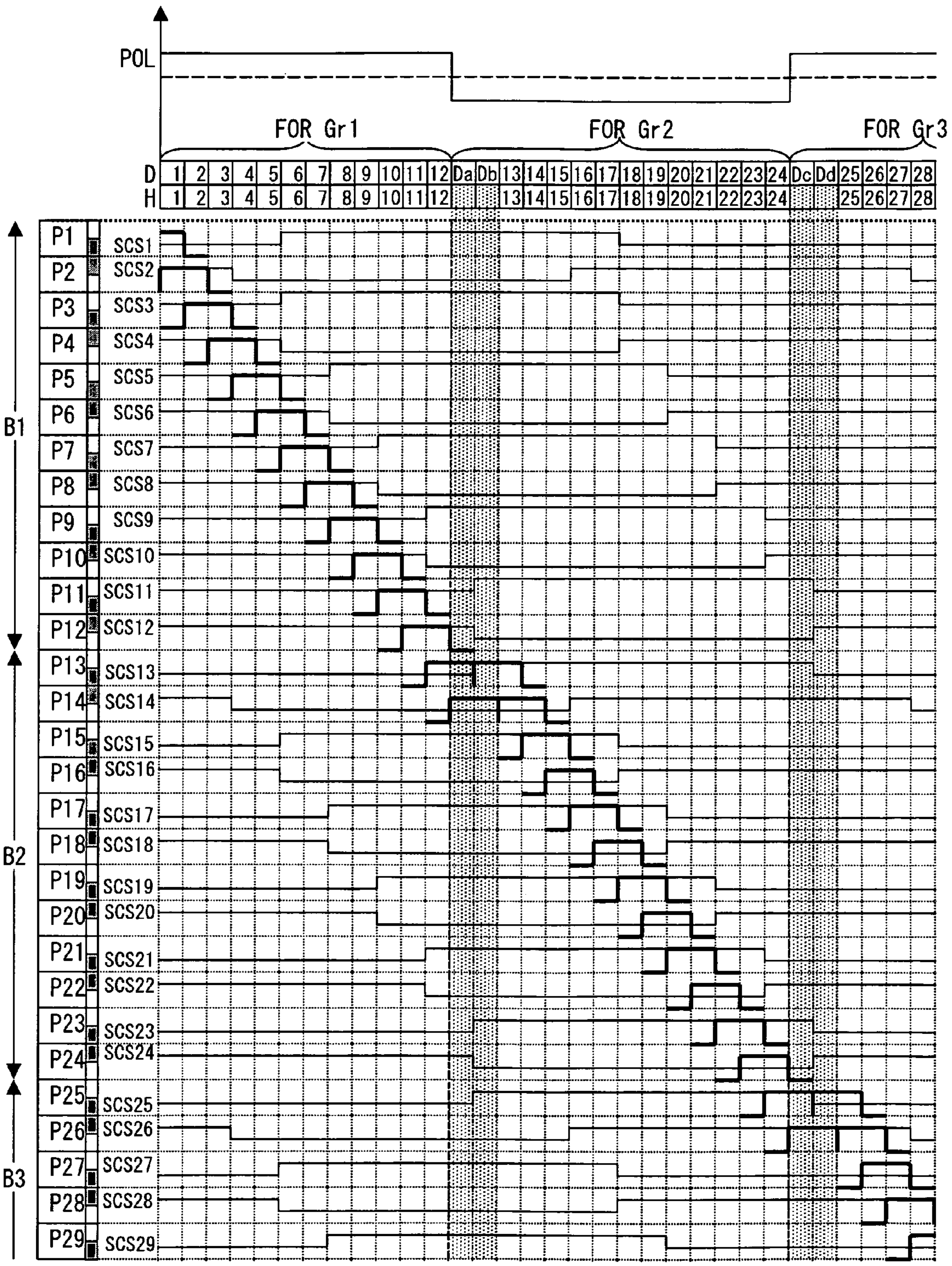
FIG. 31 is a timing chart showing still another exemplary driving of the present liquid crystal display device.
Figure 32:
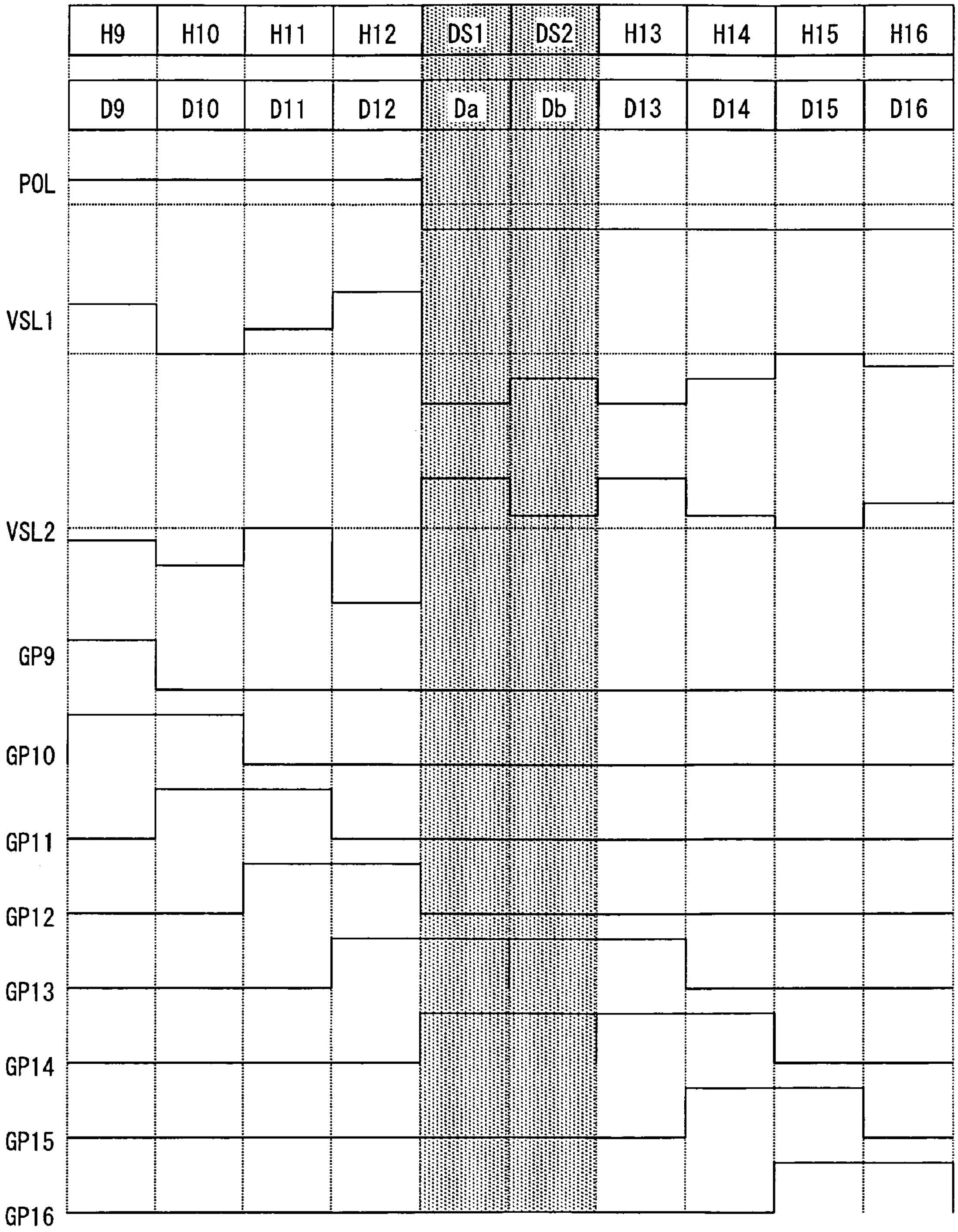
FIG. 32 is a timing chart showing in more detail the exemplary driving shown in FIG. 31.

In this case, as shown in FIGS. 31 and 32, the gate pulse GP12 supplied to the scanning signal line G12 is activated at the same time as start of horizontal scanning carried out immediately before horizontal scanning corresponding to the scanning signal line G12, i.e., at the same time as start of the horizontal scanning period H11. The gate pulse GP12 is active during two horizontal scanning periods, i.e., the horizontal scanning period H11 and the horizontal scanning period H12. Then, the gate pulse GP12 is deactivated at the same time as end of the horizontal scanning period H12. During the horizontal scanning period H11, a signal electric potential which corresponds to the video data D11 (video data corresponding to a pixel connected to the scanning signal line G11) and which has the same polarity (positive polarity) as signal electric potentials in the group Gr1 is supplied to the data signal line SL1. During the horizontal scanning period H12, a signal electric potential which corresponds to the video data D12 (video data corresponding to a pixel connected to the scanning signal line G12) and which has the same polarity (positive polarity) as the signal electric potentials in the group Gr1 is supplied to the data signal line SL1. That is, pre-charging is carried out during the horizontal scanning period H11, and main charging (writing of positive signal electric potentials corresponding to the video data D12) is carried out in horizontal scanning of the horizontal scanning period H12.

The gate pulse GP13 supplied to the scanning signal line G13 is activated at the same time as start of horizontal scanning carried out immediately before dummy scanning of the scanning signal line G13, i.e., at the same time as start of the horizontal scanning period H12. The gate pulse GP13 is active during two horizontal scanning periods, i.e., the horizontal scanning period H12 and the first dummy scanning period DS1. Then, the gate pulse GP13 is deactivated at the same time as end of the first dummy scanning period DS1.

The gate pulse GP14 supplied to the scanning signal line G14 is activated at the same time as start of dummy scanning carried out immediately before dummy scanning of the scanning signal line G14, i.e., at the same time as start of the first dummy scanning period DS1. The gate pulse GP14 is active during two horizontal scanning periods, i.e., the first dummy scanning period DS1 and the second dummy scanning period DS2. Then, the gate pulse GP14 is deactivated at the same time as end of the second dummy scanning period DS2.

The gate pulse GP13 supplied to the scanning signal line G13 is activated at the same time as start of dummy scanning carried out immediately before horizontal scanning corresponding to the scanning signal line G13, i.e., at the same time as start of the second dummy scanning period DS2. The gate pulse GP13 is active during two horizontal scanning periods, i.e., the second dummy scanning period DS2 and the horizontal scanning period H13. Then, the gate pulse GP13 is deactivated at the same time as end of the horizontal scanning period H2.

During the second dummy scanning period DS2, a signal electric potential which corresponds to the second dummy data Db and which has the same polarity (negative polarity) as the signal electric potentials in the group Gr2 is supplied to the data signal line SL1. During the horizontal scanning period H13, a signal electric potential which corresponds to the video data D13 (video data corresponding to a pixel connected to the scanning signal line G13) and which has the same polarity (positive polarity) as the signal electric potentials in the group Gr2 is supplied to the data signal line SL1. That is, pre-charging is carried out during the dummy scanning period DS2, and main charging (writing of a positive signal electric potential corresponding to the video data D2) is carried out in horizontal scanning of the horizontal scanning period H13.

Figure 33:
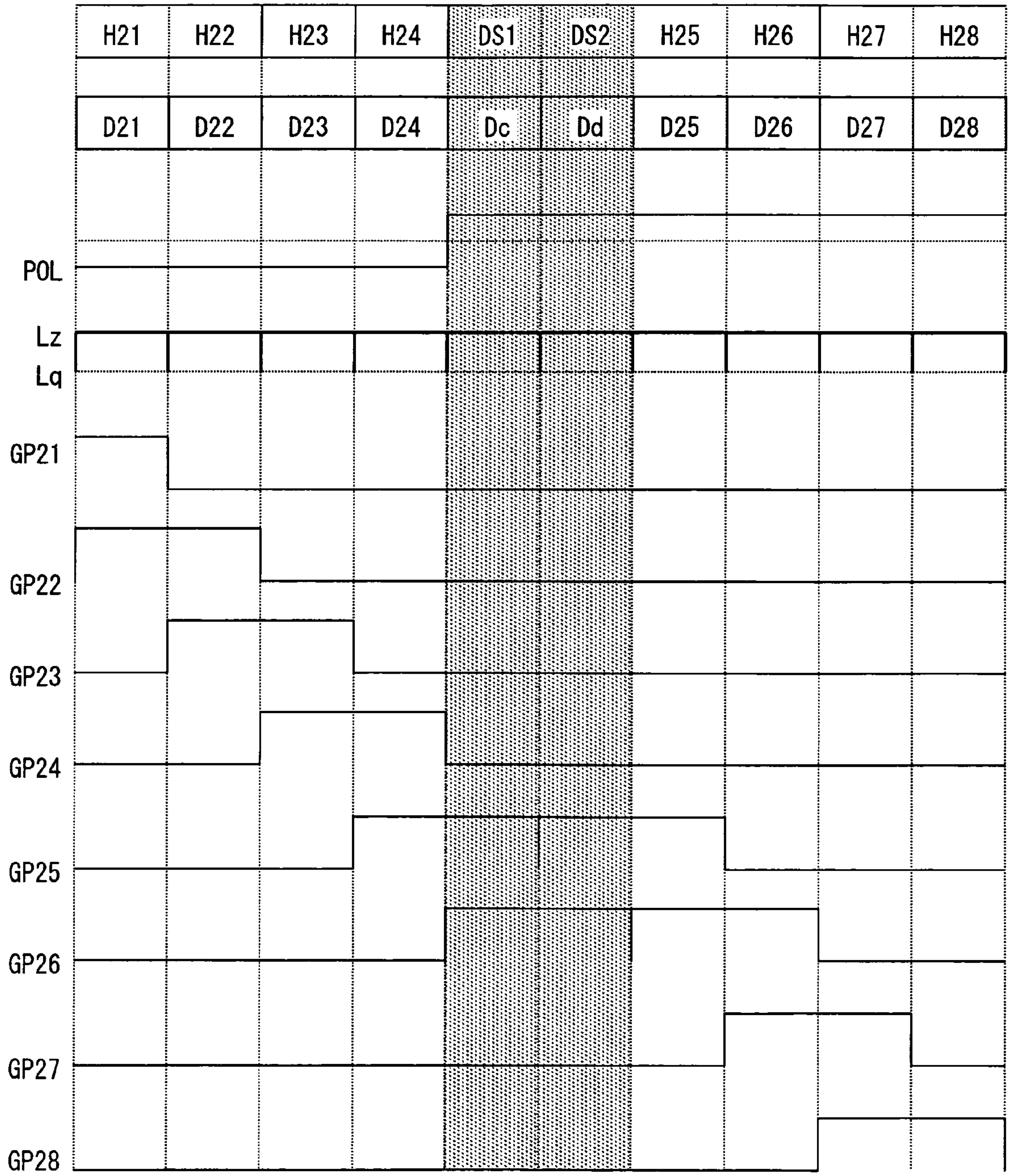
FIG. 33 is a timing chart showing a fluctuation in load applied to a scanning signal line driving circuit in the exemplary driving shown in FIG. 31.

Also in the arrangement shown in FIGS. 31 and 32, a status of load applied to the scanning signal line driving circuit during a horizontal scanning period can be made identical to a status of load applied to the scanning signal line driving circuit during a dummy scanning period, and therefore a status of load applied to the scanning signal line driving circuit before and during scanning of one scanning signal line can be made identical to a status of load applied to the scanning signal line driving circuit before and during scanning of another scanning signal line, as shown in FIG. 33. In FIG. 33, Lq represents load applied to the scanning signal line driving circuit when (i) a single scanning signal line is active, (ii) another scanning signal line is activated, and (iii) at the same time, still another scanning signal line is deactivated, and Lz represents load applied to the scanning signal line driving circuit while a single scanning signal line and another scanning signal line are being active. This can further reduce a difference in charging rate between (i) pixels connected to scanning signal lines that are subjected to horizontal scanning before and after polarity inversion of electric potentials and (ii) the other pixels, thereby suppressing horizontal-striped unevenness occurring in the vicinity of borders of the blocks.

Further, according to this arrangement, load on the scanning signal line driving circuit is almost always kept at Ly during a vertical scanning period. That is, there is almost no fluctuation in load on the scanning signal line driving circuit.

This makes the suppression of the horizontal-striped unevenness more effective. Further, as shown in FIG. 33, timings at which the load becomes Lq are periodical. This makes the suppression of the horizontal-striped unevenness further more effective. Further, according to this arrangement, each pixel is pre-charged for a single horizontal scanning period. This can increase a charging rate of each pixel. In the arrangement of FIGS. 31 and 32, each dummy scanning period has a length equal to that of 1 horizontal scanning period. However, the present embodiment is not limited to this. Each dummy scanning period may be shorter or longer than 1 horizontal scanning period.

Embodiment 3

Figure 34:
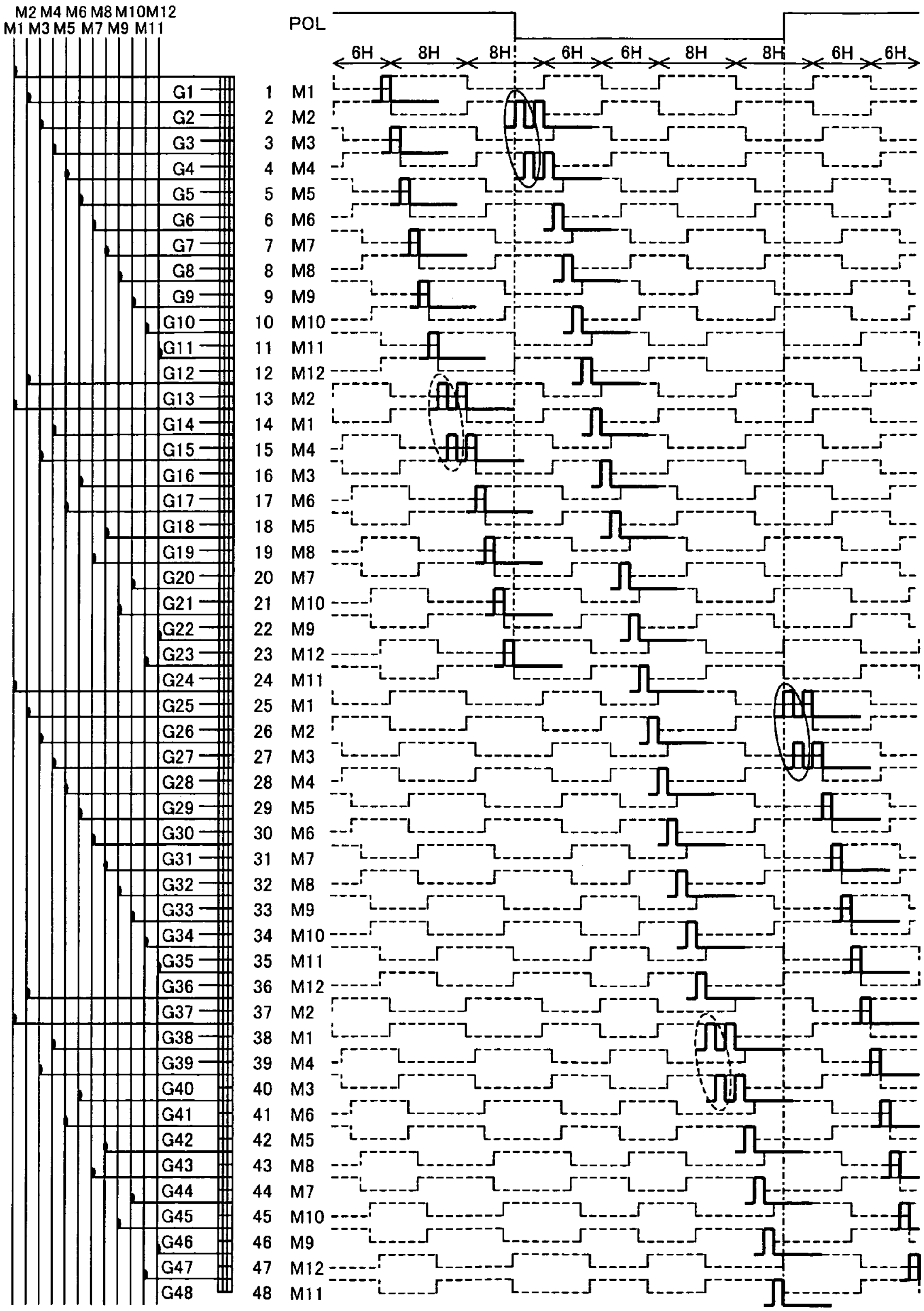
FIG. 34 is a timing chart showing an exemplary driving of a liquid crystal display device of Embodiment 3.

The liquid crystal display device shown in FIG. 3 may be driven as shown in FIG. 34. Specifically, each of storage capacitor wire signals SCS1 through SCS1081 supplied to storage capacitor wires CS1 through CS1080 has any one of waveforms of 12 phases (first through twelfth phases represented by the storage capacitor wire signals SCS1 through SCS12, respectively).

An odd-numbered phase has a basic waveform that is repeated and that is constituted by a first section in which a Low level continues for 6H, a second section in which a High level continues for 8H, a third section in which a Low level continues for 8H, and a fourth section in which a High level continues for 6H. An even-numbered phase has a basic waveform that is repeated and that is constituted by a first section in which a High level continues for 6H, a second section in which a Low level continues for 8H, a third section in which a High level continues for 8H, and a fourth section in which a Low level continues for 6H. Note that the second phase represented by the storage capacitor wire signal SCS2 is identical to one obtained by inverting the first phase represented by the storage capacitor wire signal SCS1. Note also that one of any two successive odd-numbered phases is behind the other one which is followed by the one by 1H, and one of any two successive even-numbered phases is behind the other one which is followed by the one by 1H. For example, the third phase represented by the storage capacitor wire signal SCS3 is behind the first phase represented by the storage capacitor wire signal SCS1 by 1H, and the fourth phase represented by the storage capacitor wire signal SCS4 is behind the second phase represented by the storage capacitor wire signal SCS2 by 1H.

A storage capacitor wire signal SCS(24*j*+1) (j is an integer in a range from 0 to 45) and a storage capacitor wire signal SCS(24*k*+14) (k is an integer in a range from 0 to 44) have the first phase. A storage capacitor wire signal SCS(24*j*+2) (j is an integer in a range from 0 to 45) and a storage capacitor wire signal SCS(24*k*+13) (k is an integer in a range from 0 to 44) have the second phase, a storage capacitor wire signal SCS (24*j*+3) and a storage capacitor wire signal SCS(24*k*+16) have the third phase, a storage capacitor wire signal SCS(24*j*+4) and a storage capacitor wire signal SCS(24*k*+15) have the fourth phase, a storage capacitor wire signal SCS(24*j*+5) and a storage capacitor wire signal SCS(24*k*+18) have the fifth phase, a storage capacitor wire signal SCS(24*j*+6) and a storage capacitor wire signal SCS(24*k*+17) have the sixth phase, a storage capacitor wire signal SCS(24*j*+7) and a storage capacitor wire signal SCS(24*k*+20) have the seventh phase, a storage capacitor wire signal SCS(24*j*+8) and a storage capacitor wire signal SCS(24*k*+19) have the eighth phase, a storage capacitor wire signal SCS(24*j*+9) and a storage capacitor wire signal SCS(24*k*+22) have the ninth phase, a storage capacitor wire signal SCS(24*j*+10) and a storage capacitor wire signal SCS(24*k*+21) have the tenth phase, a storage capacitor wire signal SCS(24*j*+11) and a storage capacitor wire signal SCS(24*k*+24) have the eleventh phase, and a storage capacitor wire signal SCS(24*j*+12) and a storage capacitor wire signal SCS(24*k*+23) have the twelfth phase. Note that the storage capacitor wire signals of the first through twelfth phases are supplied to storage capacitor main wires M1 through M12, respectively as shown in FIG. 34.

Further, in the present embodiment, timing adjustment scanning periods are inserted in addition to dummy scanning periods. Specifically, two dummy scanning periods are inserted between a horizontal scanning period corresponding to the last horizontal scanning in the preceding group and a horizontal scanning period corresponding to the first horizontal scanning in the succeeding group, and two timing adjustment scanning periods (first and second timing adjustment scanning periods) are inserted between a horizontal scanning period corresponding to horizontal scanning of a scanning signal line G(25*m*+11) (m is an integer in a range from 0 to 42) and a horizontal scanning period corresponding to horizontal scanning of a scanning signal line G(25*m*+13). During the first timing adjustment scanning period, the scanning signal line G(25*m*+13) is subjected to timing adjustment scanning so as to be made active for a predetermined period of time. Then, the scanning signal line G(25*m*+13) is deactivated. During the second timing adjustment scanning period, a scanning signal line G(25*m*+15) is subjected to timing adjustment scanning so as to be made active for a predetermined period of time. Then, the scanning signal line G(25*m*+15) is deactivated.

As shown in FIG. 34, the storage capacitor wire signal SCS1 (first phase) has "L" level (the first section) during the horizontal scanning period H1 corresponding to the scanning signal line G1, and is level-shifted from "L" level to "H" level (start of the second section) in synchronization with end of the horizontal scanning period H1, and the storage capacitor wire signal SCS2 (second phase) has "H" level (the first section) during the horizontal scanning period H1 corresponding to the scanning signal line G1, and is level-shifted from "H" level to "L" level (start of the second section) in synchronization with end of the horizontal scanning period H1.

Note that each of the timing adjustment periods is equal in length to a horizontal scanning period and that timing of horizontal scanning in each horizontal scanning period is identical to timing of timing adjustment scanning in each timing adjustment scanning period. Specifically, a time interval between start of a horizontal scanning period and start of horizontal scanning is zero (horizontal scanning is carried out at the same time as start of a horizontal scanning period) and a time interval between start of a timing adjustment scanning period and start of timing adjustment scanning is zero (timing adjustment scanning is carried out at the same time as start of a timing adjustment scanning period). Further, a time interval between end of horizontal scanning and end of a horizontal scanning period is zero (horizontal scanning ends at the same time as end of a horizontal scanning period) and a time interval between end of timing adjustment scanning and end of a timing adjustment scanning period is zero (timing adjustment scanning ends at the same time as end of a timing adjustment scanning period).

Further, first and second timing adjustment data are inserted between video data corresponding to horizontal scanning of the scanning signal line G(25*m*+11) and video data corresponding to horizontal scanning of the scanning signal line G(25*m*+13). Note that the first timing adjustment data is, for example, identical to the video data corresponding to horizontal scanning of the scanning signal line G(25*m*+13), and the second timing adjustment data is, for example, identical to video data corresponding to horizontal scanning of the scanning signal line G(25*m*+15).

According to the driving of FIG. 34, similar effects to those of the driving of FIGS. 1 and 2 can be obtained although the number of phases of the storage capacitor wire signals (the number of storage capacitor main wires) is smaller (12 phases (12 storage capacitor main wires)) as compared to the driving of FIGS. 1 and 2.

Figure 35:
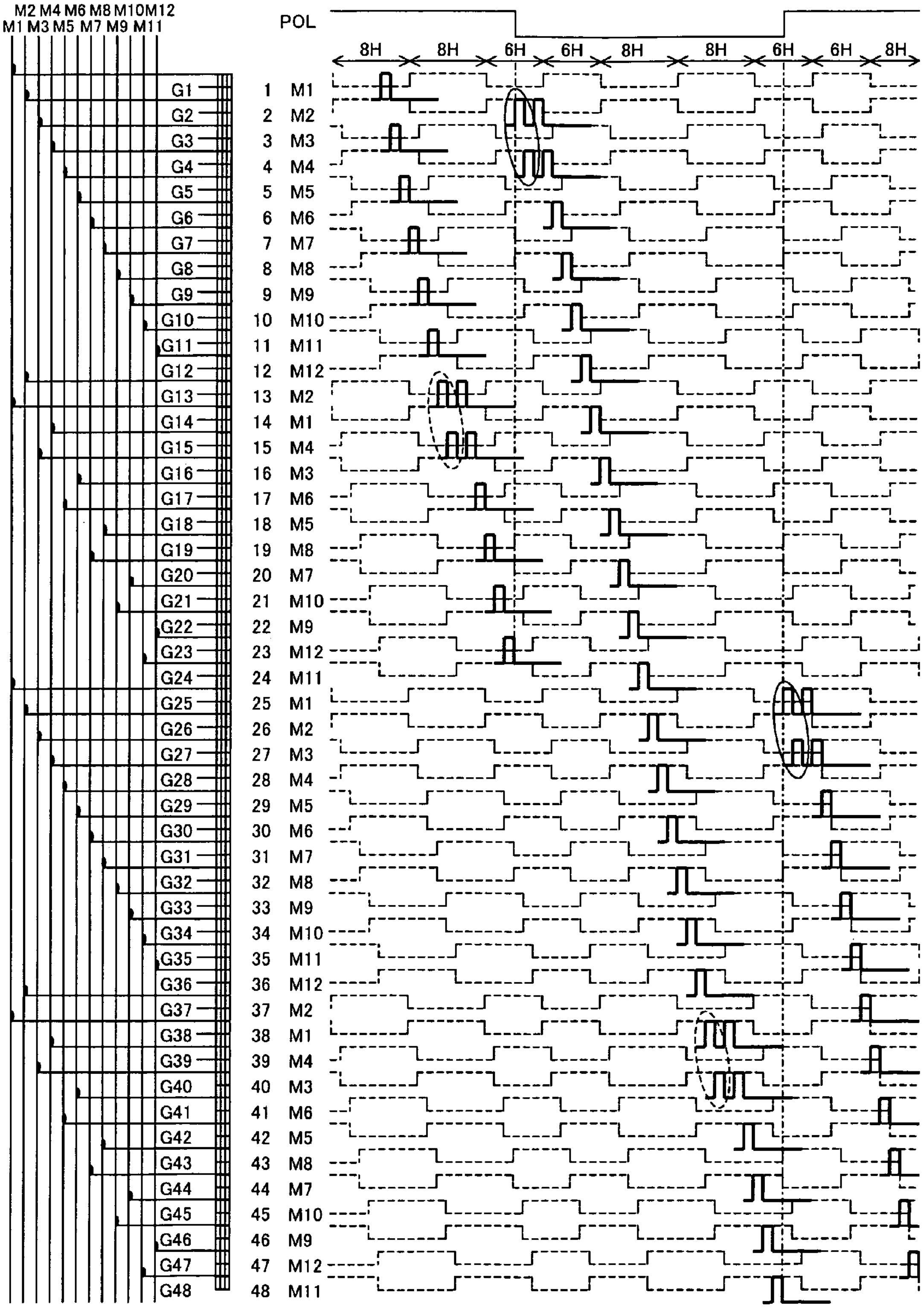
FIG. 35 is a timing chart showing another exemplary driving of the liquid crystal display device of Embodiment 3.

Note that modification of the driving of FIG. 34 is also possible, as shown in FIG. 35. According to the modification of FIG. 35, an odd-numbered phase has a basic waveform that is repeated and that is constituted by a first section in which a Low level continues for 8H, a second section in which a High level continues for 8H, a third section in which a Low level continues for 6H, and a fourth section in which a High level continues for 6H, and an even-numbered phase has a basic waveform that is repeated and that is constituted by a first section in which a High level continues for 8H, a second section in which a Low level continues for 8H, a third section in which a High level continues for 6H, and a fourth section in which a Low level continues for 6H.

In this case, as shown in FIG. 35, the storage capacitor wire signal SCS1 (first phase) has "L" level (the first section) during the horizontal scanning period H1 corresponding to the scanning signal line G1, and is level-shifted from "L" level to "H" level (start of the second section) at a timing when 2H elapses from end of the horizontal scanning period H1, and the storage capacitor wire signal SCS2 (second phase) has "H" level (the first section) during the horizontal scanning period H1 corresponding to the scanning signal line G1, and is level-shifted from "H" level to "L" level (start of the second section) at a timing when 2H elapses from end of the horizontal scanning period H1.

Figure 36:
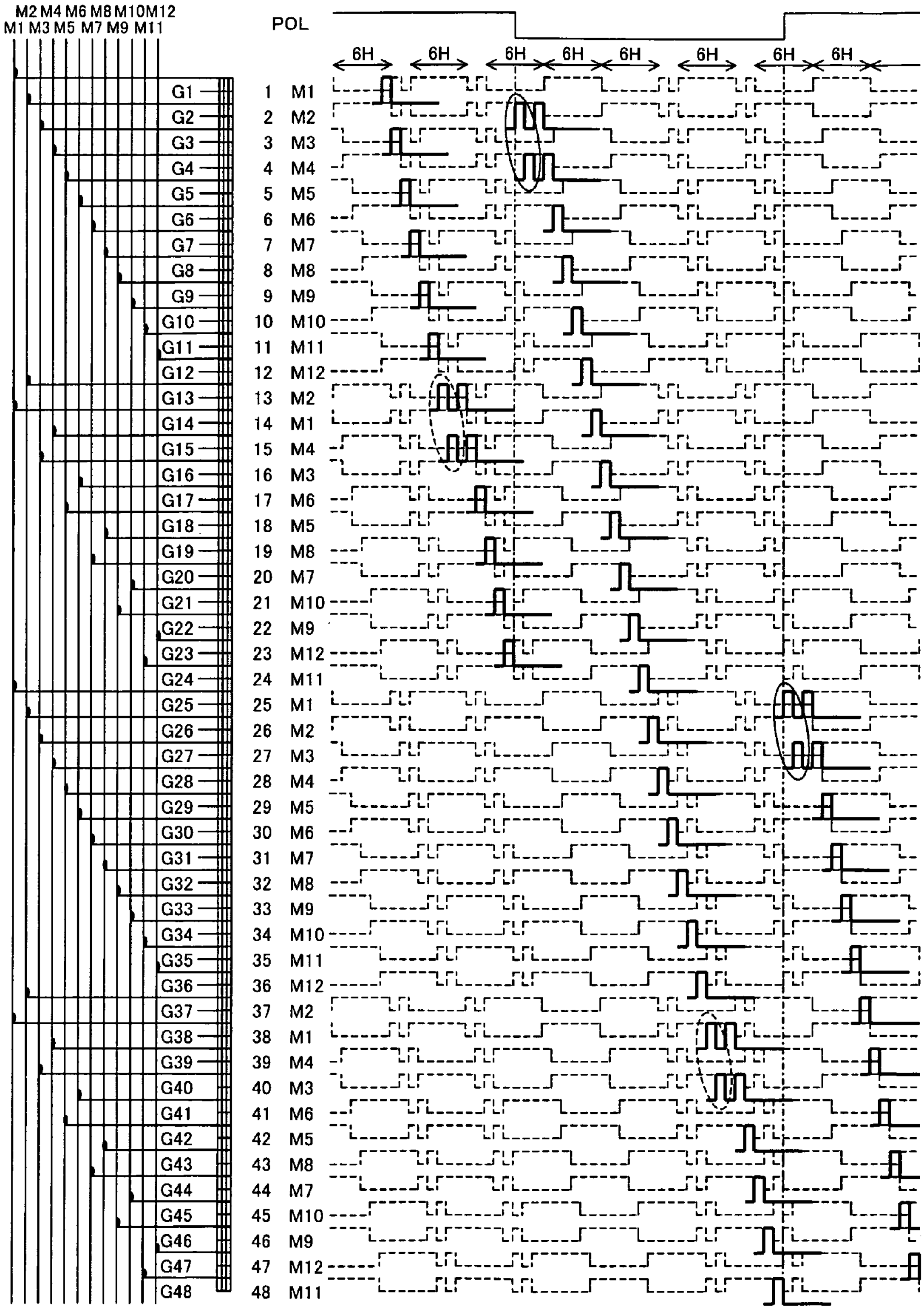
FIG. 36 is a timing chart showing still another exemplary driving of the liquid crystal display device of Embodiment 3.

Alternatively, modification of the driving of FIG. 34 is also possible, as shown in FIG. 36. According to the modification of FIG. 36, an odd-numbered phase has a basic waveform that is repeated and that is constituted by a first section in which a Low level continues for 6H, a second section in which a High level continues for 1H, a third section in which a Low level continues for 1H, a fourth section in which a High level continues for 6H, a fifth section in which a Low level continues for 1H, a sixth section in which a High level continues for 1H, a seventh section in which a Low level continues for 6H, and a eighth section in which a High level continues for 6H, and an even-numbered phase has a basic waveform that is repeated and that is constituted by a first section in which a High level continues for 6H, a second section in which a Low level continues for 1H, a third section in which a High level continues for 1H, a fourth section in which a Low level continues for 6H, a fifth section in which a High level continues for 1H, a sixth section in which a Low level continues for 1H, a seventh section in which a High level continues for 6H, and a eighth section in which a Low level continues for 6H.

In this case, as shown in FIG. 36, the storage capacitor wire signal SCS1 (first phase) has "L" level (the first section) during the horizontal scanning period H1 corresponding to the scanning signal line G1, and is level-shifted from "L" level to "H" level (start of the second section) in synchronization with end of the horizontal scanning period H1, and the storage capacitor wire signal SCS2 (second phase) has "H" level (the first section) during the horizontal scanning period H1 corresponding to the scanning signal line G1, and is level-shifted from "H" level to "L" level (start of the second section) in synchronization with end of the horizontal scanning period H1.

Figure 37:
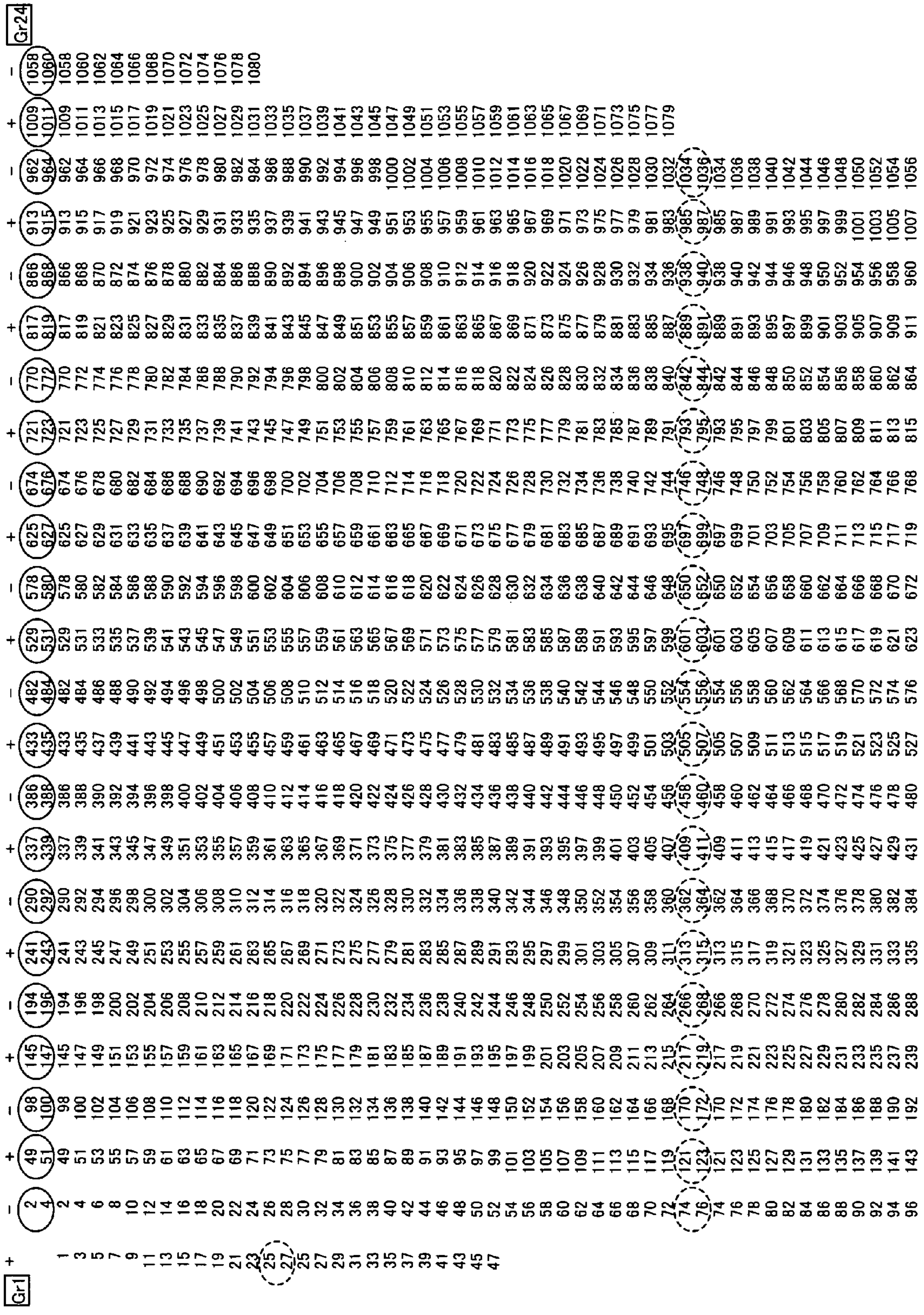
FIG. 37 is a view schematically illustrating an example of how scanning signal lines are divided into groups.

In the present liquid crystal display device, the scanning signal lines may be divided into groups in a manner such that a group G1 (first group) is formed which includes 24 successive odd-numbered scanning signal lines starting from the scanning signal line G1, a group G2 (second group) is formed which includes 48 successive even-numbered scanning signal lines starting from the scanning signal line G2, a group G3 (third group) is formed which includes 48 successive odd-numbered scanning signal lines starting from the scanning signal line G49, groups G4 through G22 are formed in the same way as the groups G2 and G3, group G23 (last group but one) is formed which includes successive odd-numbered scanning signal lines starting from the scanning signal line G1009, and a group G24 (last group) is formed which includes 12 successive even-numbered scanning signal lines starting from the scanning signal line G1058, as shown in FIG. 37.

In FIG. 37, first and second dummy scanning periods are inserted between a horizontal scanning period corresponding to the last horizontal scanning in a preceding group and a horizontal scanning period corresponding to the first horizontal scanning in a succeeding group that is selected immediately after the preceding group. During the first dummy scanning period, a scanning signal line which is the first one to be subjected to horizontal scanning in the succeeding group is subjected to dummy scanning so as to be made active for a predetermined period of time. Then, the scanning signal line is deactivated. During the second dummy scanning period, a scanning signal line which is the second one to be subjected to horizontal scanning in the succeeding group is subjected to dummy scanning so as to be made active for a predetermined period of time. Then, the scanning signal line is deactivated.

Further, two timing adjustment scanning periods (first and second timing adjustment scanning periods) are inserted between a horizontal scanning period corresponding to a scanning signal line G(96*j*+23) (j is an integer in a range from 0 to 10) and a horizontal scanning period corresponding to a scanning signal line G(96*j*+25). During the first timing adjustment scanning period, the scanning signal line G(96*j*+25) is subjected to timing adjustment scanning so as to be made active for a predetermined period of time. Then, the scanning signal line G(25*j*+25) is deactivated. During the second timing adjustment scanning period, a scanning signal line G(96*j*+27) is subjected to timing adjustment scanning so as to be made active for a predetermined period of time. Then, the scanning signal line G(96*j*+27) is deactivated. Further, two timing adjustment scanning periods (first and second timing adjustment scanning periods) are inserted between a horizontal scanning period corresponding to a scanning signal line G(96*k*+72) (k is an integer in a range from 0 to 10) and a horizontal scanning period corresponding to a scanning signal line G(96*k*+74). During the first timing adjustment scanning period, the scanning signal line G(96*k*+74) is subjected to timing adjustment scanning so as to be made active for a predetermined period of time. Then, the scanning signal line G(96*k*+74) is deactivated. During the second timing adjustment scanning period, a scanning signal line G(96*k*+76) is subjected to timing adjustment scanning so as to be made active for a predetermined period of time. Then, the scanning signal line G(96*k*+76) is deactivated.

Figure 38:
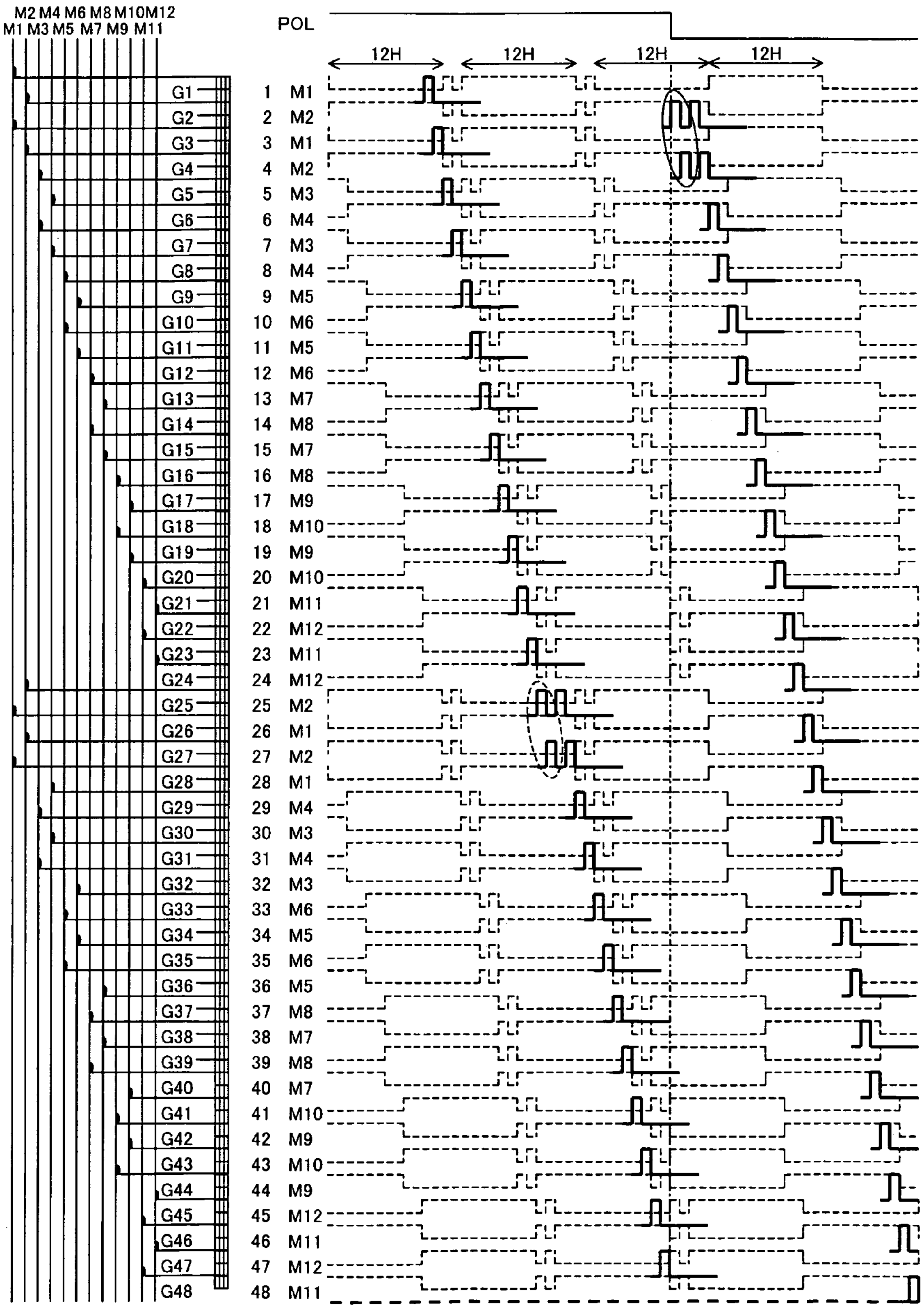
FIG. 38 is a timing chart showing exemplary driving (upstream side) carried out in the case of FIG. 37.

In this case, each of the storage capacitor wire signals SCS1 through SCS1081 supplied to storage capacitor wires CS1 through CS1080 has any one of waveforms of 1.2 phases (first through twelfth phases represented by the storage capacitor wire signals SCS1 through SCS12, respectively), as shown in FIG. 38.

An odd-numbered phase has a basic waveform that is repeated and that is constituted by a first section in which a Low level continues for 12H, a second section in which a High level continues for 1H, a third section in which a Low level continues for 1H, a fourth section in which a High level continues for 12H, a fifth section in which a Low level continues for 1H, a sixth section in which a High level continues for 1H, a seventh section in which a Low level continues for 12H, and a eighth section in which a High level continues for 12H, and an even-numbered phase has a basic waveform that is repeated and that is constituted by a first section in which a High level continues for 12H, a second section in which a Low level continues for 1H, a third section in which a High level continues for 1H, a fourth section in which a Low level continues for 12H, a fifth section in which a High level continues for 1H, a sixth section in which a Low level continues for 1H, a seventh section in which a High level continues for 12H, and a eighth section in which a Low level continues for 12H. Note that the second phase represented by the storage capacitor wire signal SCS2 is identical to one obtained by inverting the first phase represented by the storage capacitor wire signal SCS1. Note also that one of any two successive odd-numbered phases is behind the other one which is followed by the one by 1H, and one of any two successive even-numbered phases is behind the other one which is followed by the one by 1H. For example, the third phase represented by the storage capacitor wire signal SCS3 is behind the first phase represented by the storage capacitor wire signal SCS1 by 1H, and the fourth phase represented by the storage capacitor wire signal SCS4 is behind the second phase represented by the storage capacitor wire signal SCS2 by 1H.

A storage capacitor wire signal SCS(48*j*+1) (j is an integer in a range from 0 to 22), a storage capacitor wire signal SCS(48*j*+3), a storage capacitor wire signal SCS(48*k*+26) (k is an integer in a range from 0 to 21), and a storage capacitor wire signal SCS(48*k*+28) have the first phase, a storage capacitor wire signal SCS(48*j*+2), a storage capacitor wire signal SCS(48*j*+4), a storage capacitor wire signal SCS(48*j*+25), and a storage capacitor wire signal SCS(48*k*+27) have the second phase, a storage capacitor wire signal SCS(48*j*+5), a storage capacitor wire signal SCS(48*j*+7), a storage capacitor wire signal SCS(48*k*+30), and a storage capacitor wire signal SCS(48*k*+32) have the third phase, a storage capacitor wire signal SCS(48*j*+6), a storage capacitor wire signal SCS (48*j*+8), a storage capacitor wire signal SCS(48*k*+29), and a storage capacitor wire signal SCS(48*k*+31) have the fourth phase, a storage capacitor wire signal SCS(48*j*+9), a storage capacitor wire signal SCS(48*j*+11), a storage capacitor wire signal SCS(48*k*+34), and a storage capacitor wire signal SCS (48*k*+36) have the fifth phase, a storage capacitor wire signal SCS(48*j*+10), a storage capacitor wire signal SCS(48*j*+12), a storage capacitor wire signal SCS(48*k*+33), and a storage capacitor wire signal SCS(48*k*+35) have the sixth phase, a storage capacitor wire signal SCS(48*j*+13), a storage capacitor wire signal SCS(48*j*+15), a storage capacitor wire signal SCS(48*k*+38), and a storage capacitor wire signal SCS(48*k*+40) have the seventh phase, a storage capacitor wire signal SCS(48*j*+14), a storage capacitor wire signal SCS(48*j*+16), a storage capacitor wire signal SCS(48*k*+37), and a storage capacitor wire signal SCS(48*k*+39) have the eighth phase, a storage capacitor wire signal SCS(48*j*+17), a storage capacitor wire signal SCS(48*j*+19), a storage capacitor wire signal SCS(48*k*+42), and a storage capacitor wire signal SCS(48*k*+44) have the ninth phase, a storage capacitor wire signal SCS(48*j*+18), a storage capacitor wire signal SCS(48*j*+20), a storage capacitor wire signal SCS(48*k*+41), and a storage capacitor wire signal SCS(48*k*+43) have the tenth phase, a storage capacitor wire signal SCS(48*j*+21), a storage capacitor wire signal SCS(48*j*+23), a storage capacitor wire signal SCS(48*k*+46), and a storage capacitor wire signal SCS(48*k*+48) have the eleventh phase, and a storage capacitor wire signal SCS(48*j*+22), a storage capacitor wire signal SCS (48*j*+24), a storage capacitor wire signal SCS(48*k*+45), and a storage capacitor wire signal SCS(48*k*+47) have the twelfth phase. As shown in FIG. 38, storage capacitor wire signals of the first through twelfth phases are supplied to the storage capacitor main wires M1 through M12, respectively.

As shown in FIG. 38, the storage capacitor wire signal SCS1 (first phase) has "L" level (the first section) during the horizontal scanning period H1 corresponding to the scanning signal line G1, and is level-shifted from "L" level to "H" level (start of the second section) at a timing when 1H elapses from end of the horizontal scanning period H1, and the storage capacitor wire signal SCS2 (second phase) has "H" level (the first section) during the horizontal scanning period H1 corresponding to the scanning signal line G1, and is level-shifted from "H" level to "L" level (start of the second section) at a timing when 1H elapses from end of the horizontal scanning period H1.

Figure 39:
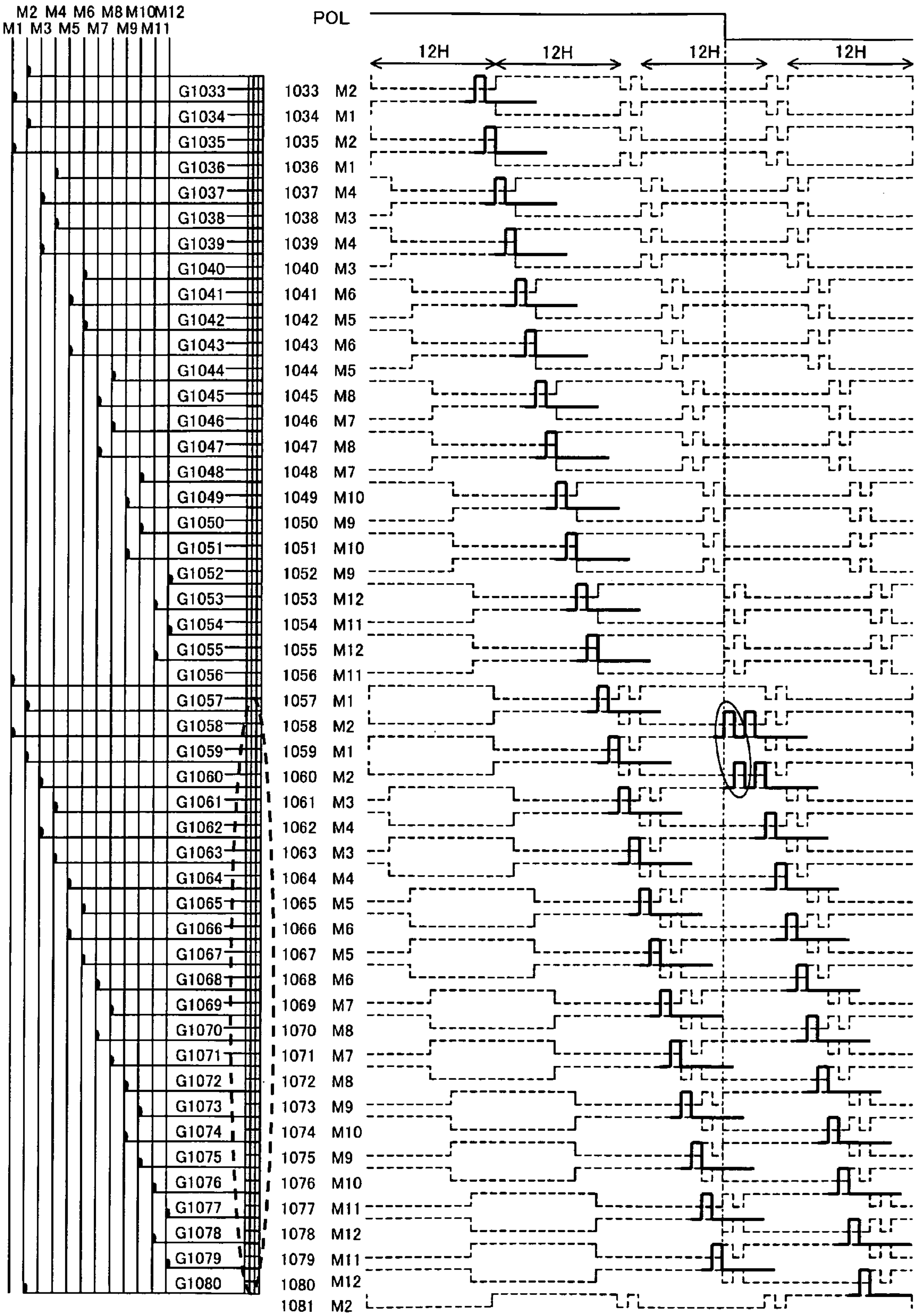
FIG. 39 is a timing chart showing exemplary driving (downstream side) carried out in the case of FIG. 37.

In a case where the timing adjustment scanning periods are set as shown in FIG. 37 and where the storage capacitor wire signals SCS1 through SCS1081 are set as above, bright are dark sub-pixels are alternately disposed in a range from the scanning signal line G1 to the scanning signal line G1058, whereas a set of dark sub-pixel, bright sub-pixel, bright sub-pixel, and dark sub-pixel is repeatedly disposed in a range from the scanning signal line G1058 to the scanning signal line G1080, as shown in FIG. 39. That is, checkered pattern display cannot be achieved in a pixel connected to the scanning signal line G1058 and the subsequent pixels.

Figure 40:
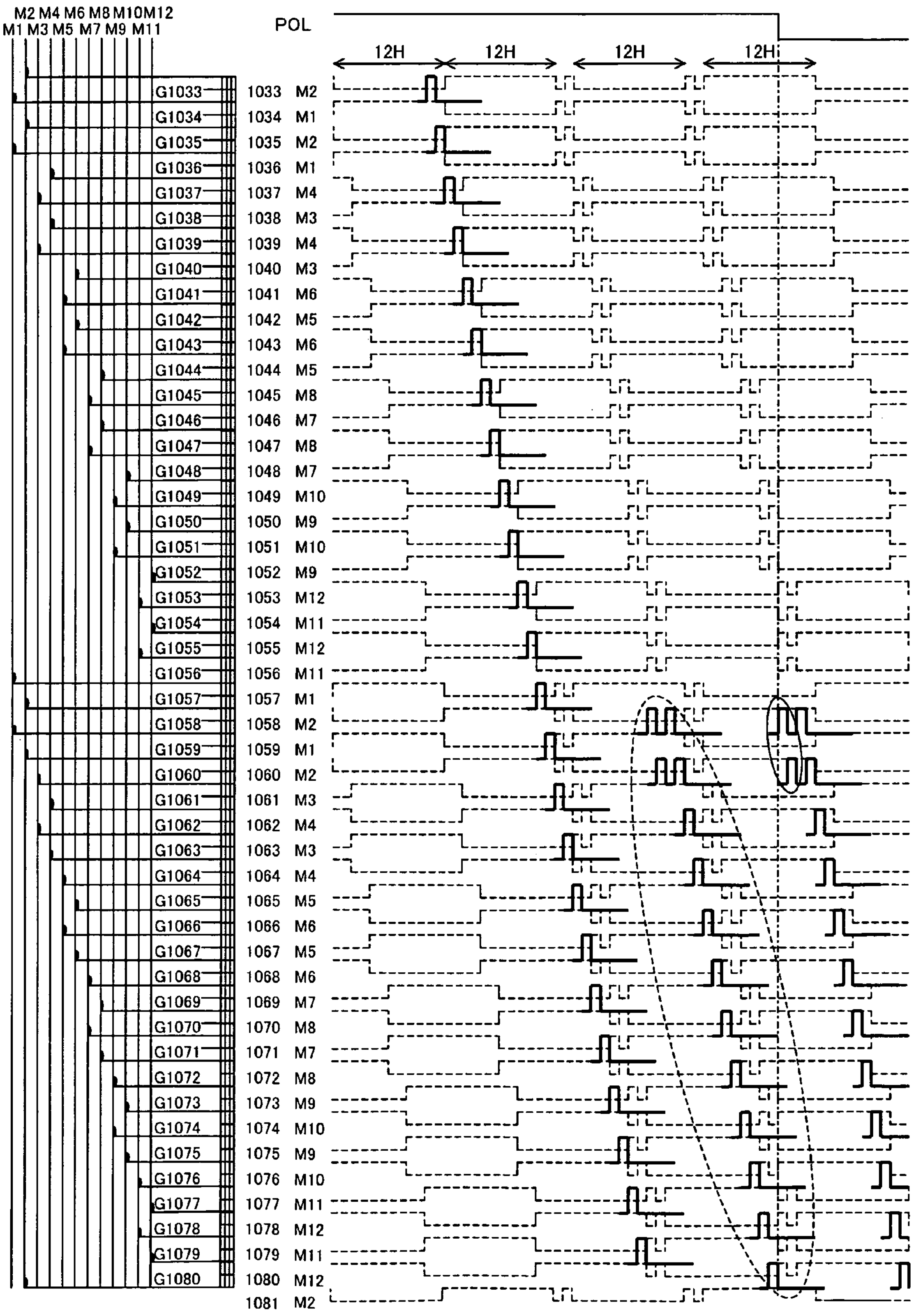
FIG. 40 is a timing chart showing an improvement example of FIG. 39.

In view of this, it is desirable that 14 timing adjustment scanning periods (first through fourteenth TA periods) be inserted between a horizontal scanning period corresponding to horizontal scanning of the scanning signal line G1079 and a dummy scanning period corresponding to dummy scanning of the scanning signal line G1058 as shown in FIG. 40. The scanning signal line G1058 is subjected to timing adjustment scanning during the first TA, the scanning signal line G1060 is subjected to timing adjustment scanning during the second TA, the scanning signal line G1058 is subjected to timing adjustment scanning during the third TA, the scanning signal line G1060 is subjected to timing adjustment scanning during the fourth TA, and even-numbered ones out of the scanning signal lines G1062 through G1080 are sequentially subjected to timing adjustment scanning during the fifth TA through fourteenth TA. This makes it possible to preserve checkered pattern display in the pixel connected to the scanning signal line G1058 and the subsequent pixels.

Figure 41:
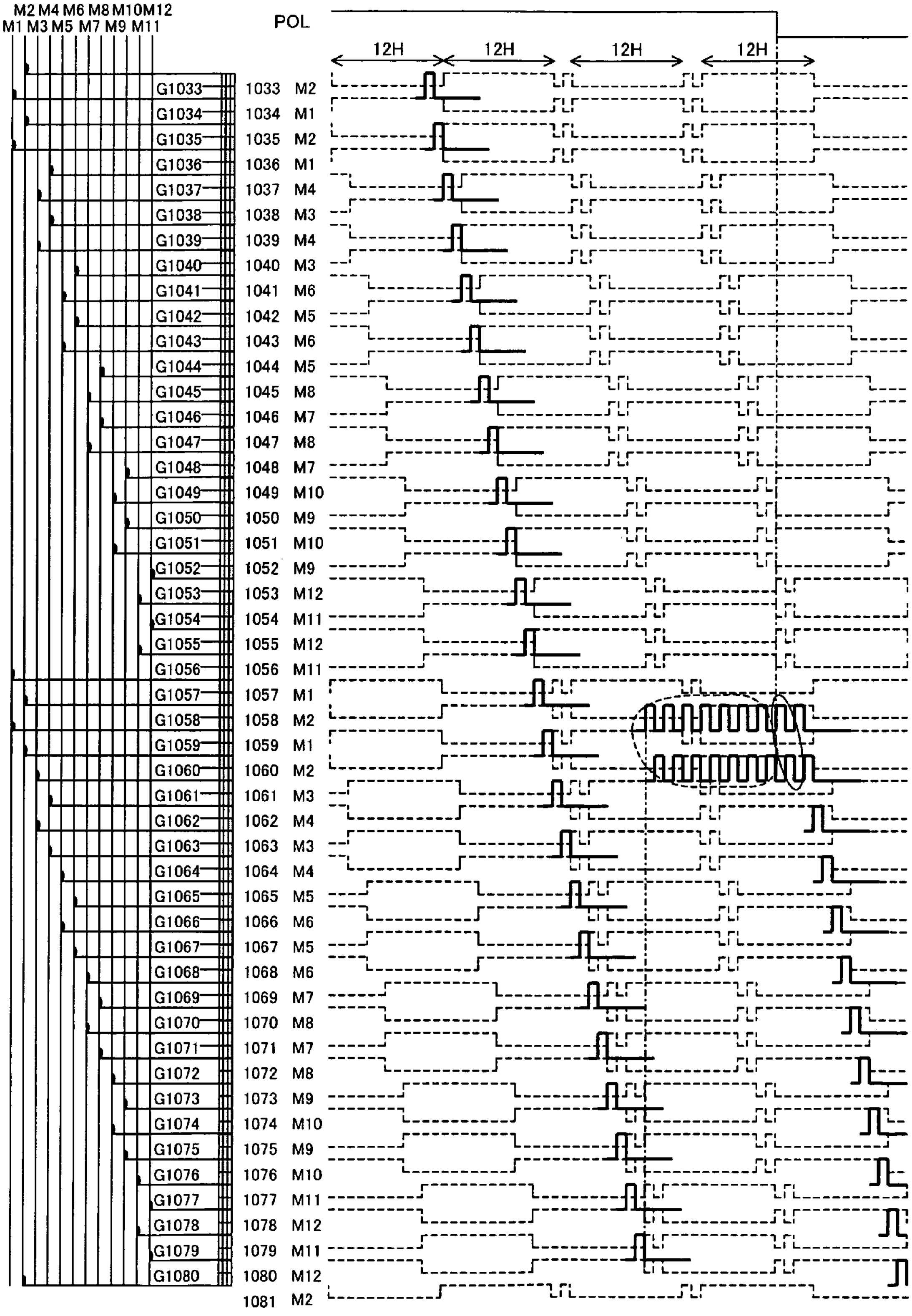
FIG. 41 is a timing chart showing another improvement example of FIG. 39.

Alternatively, it is also possible that (i) 14 timing adjustment scanning periods (first through fourteenth TA periods) are inserted between a horizontal scanning period corresponding to horizontal scanning of the scanning signal line G1079 and a dummy scanning period corresponding to dummy scanning of the scanning signal line G1058, and (ii) the scanning signal line G1058 and the scanning signal line G1060 are alternately subjected to timing adjustment scanning (specifically, the scanning signal line G1058 is subjected to timing adjustment scanning during the first TA, the scanning signal line G1060 is subjected to timing adjustment scanning during the second TA, the scanning signal line G1058 is subjected to timing adjustment scanning again during the third TA, the scanning signal line G1060 is subjected to timing adjustment scanning again during the fourth TA . . . ) as shown in FIG. 41. This makes it possible to preserve checkered pattern display in the pixel connected to the scanning signal line G1058 and the subsequent pixels.

Figure 42:
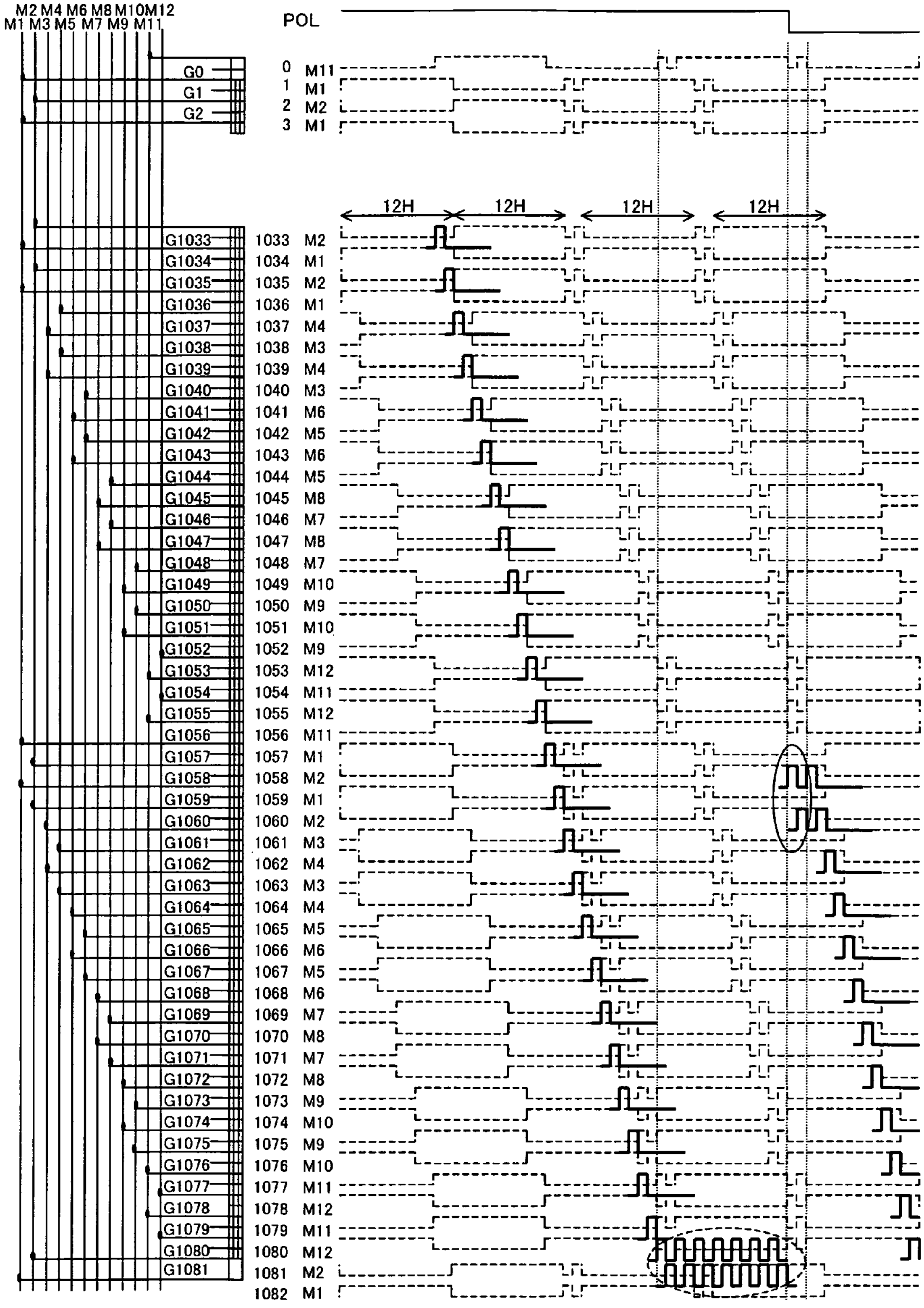
FIG. 42 is a timing chart showing still another improvement example of FIG. 39.

Alternatively, it is also possible that (i) 14 timing adjustment scanning periods (first through fourteenth TA periods) are inserted between a horizontal scanning period corresponding to horizontal scanning of the scanning signal line G1079 and a dummy scanning period corresponding to dummy scanning of the scanning signal line G1058, and (ii) the scanning signal line G1080 and a dummy scanning signal line G1081 which is disposed outside the display area (e.g., a lower end portion of the panel) are alternately subjected to timing adjustment scanning (specifically, the scanning signal line G1080 is subjected to timing adjustment scanning during the first TA, the dummy scanning signal line G1081 is subjected to timing adjustment scanning during the second TA, the scanning signal line G1080 is subjected to timing adjustment scanning again during the third TA, the dummy scanning signal line G1081 is subjected to timing adjustment scanning again during the fourth TA . . . ) as shown in FIG. 42. This makes it possible to preserve checkered pattern display in the pixel connected to the scanning signal line G1058 and the subsequent pixels.

Note that the dummy scanning signal line G1081 is disposed so as to be adjacent to the scanning signal line G1080, and is connected to a dummy pixel provided outside the display area (the lower end portion of the panel). The dummy pixel provided in the lower end portion of the panel forms capacitance with each of the storage capacitor wire CS1081 and a dummy storage capacitor wire CS1082. The dummy storage capacitor wire CS1082 is connected to the storage capacitor main wire M1 for example.

Figure 43:
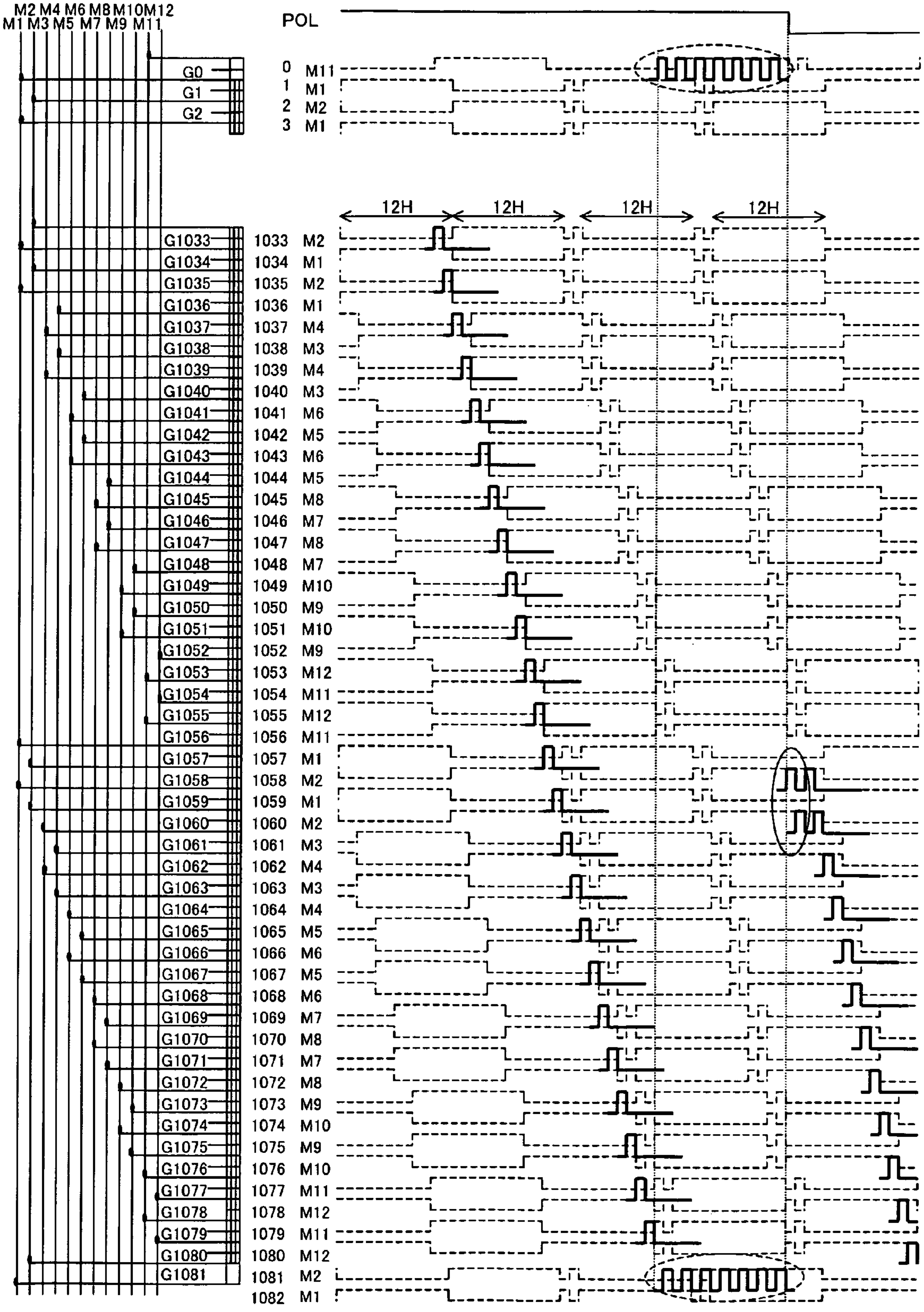
FIG. 43 is a timing chart showing still another improvement example of FIG. 39.

Alternatively, it is also possible that (i) 14 timing adjustment scanning periods (first through fourteenth TA periods) are inserted between a horizontal scanning period corresponding to horizontal scanning of the scanning signal line G1079 and a dummy scanning period corresponding to dummy scanning of the scanning signal line G1058, and (ii) a dummy scanning signal line G0 which is disposed outside the display area (upper end portion of the panel) and a dummy scanning signal line G1081 which is disposed outside the display area (lower end portion of the panel) are alternately subjected to timing adjustment scanning (specifically, the scanning signal line G0 is subjected to timing adjustment scanning during the first TA, the dummy scanning signal line G1081 is subjected to timing adjustment scanning during the second TA, the dummy scanning signal line G0 is subjected to timing adjustment scanning again during the third TA, the dummy scanning signal line G1081 is subjected to timing adjustment scanning again during the fourth TA . . . ) as shown in FIG. 43. This makes it possible to preserve checkered pattern display in the pixel connected to the scanning signal line G1058 and the subsequent pixels.

Note that the dummy scanning signal line G0 is disposed so as to be adjacent to the scanning signal line G1, and is connected to a dummy pixel provided outside the display area (the upper end portion of the panel). The dummy pixel provided in the upper end portion of the panel forms capacitance with each of a dummy storage capacitor wire CS0 and the storage capacitor wire CS1. The dummy storage capacitor wire CS0 is connected to the storage capacitor main wire M11 for example. Further, the dummy scanning signal line G1081 is disposed so as to be adjacent to the scanning signal line G1080, and is connected to a dummy pixel provided outside the display area (the lower end portion of the panel). The dummy pixel provided in the lower end portion of the panel forms capacitance with each of the storage capacitor wire CS1081 and a dummy storage capacitor wire CS1082. The dummy storage capacitor wire CS1082 is connected to the storage capacitor main wire M1 for example.

Figure 44:
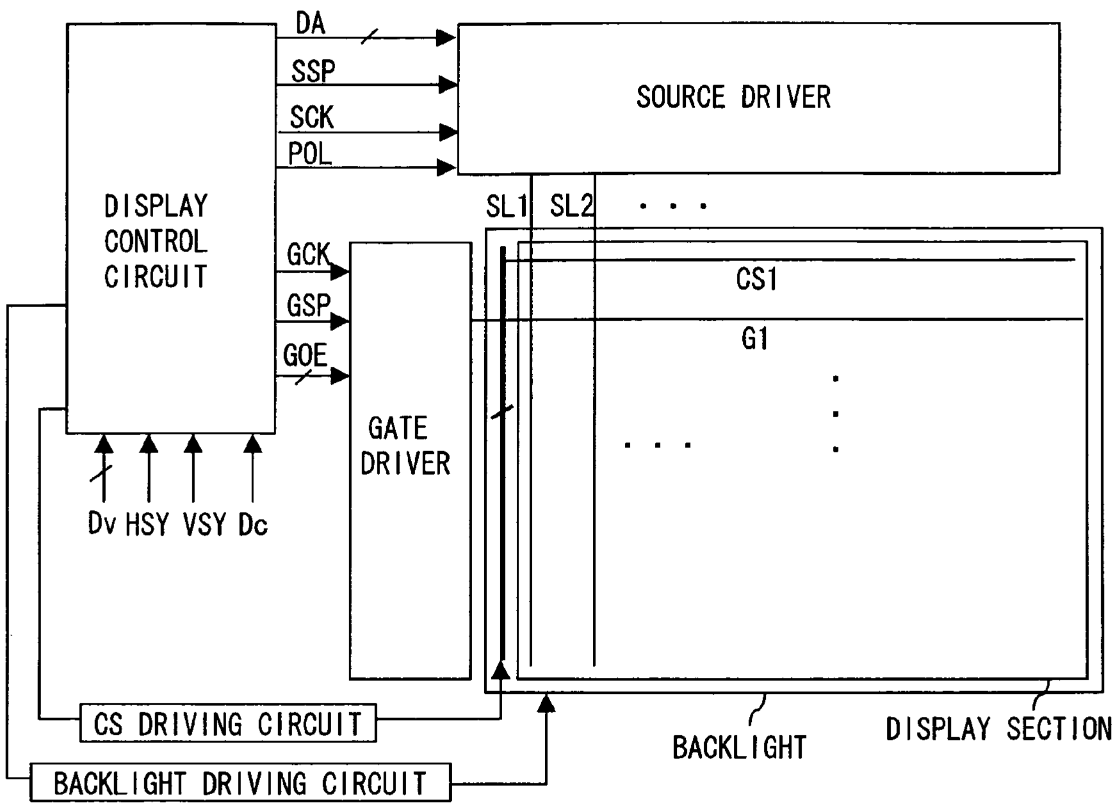
FIG. 44 is a block diagram explaining an overall configuration of the present liquid crystal display device.

FIG. 44 is a block diagram illustrating a configuration of the present liquid crystal display device. As illustrated in FIG. 44, the present liquid crystal display device includes a display section (liquid crystal panel), a source driver, a gate driver, a backlight, a backlight driving circuit, a display control circuit, and a CS driving circuit (storage capacitor wire driving circuit). The source driver drives the data signal lines. The gate driver drives the scanning signal lines. The CS driving circuit drives the storage capacitor wires (CS wires) via the storage capacitor main wires. The display control circuit controls the source driver, the gate driver, the CS driving circuit, and the backlight driving circuit.

The display control circuit receives, from an external signal source (e.g., tuner), a digital video signal Dv indicative of an image to be displayed, a horizontal sync signal HSY and a vertical sync signal VSY that correspond to the digital video signal Dv, and a control signal Dc for controlling display operation. Based on the signals Dv, HSY, VSY, and Dc thus received, the display control circuit generates and outputs, as signals for causing the display area to display the image indicated by the digital video signal Dv, a data start pulse signal SSP, a data clock signal SCK, a digital image signal DA (corresponding to the video signal Dv) indicative of the image to be displayed, a gate start pulse signal GSP, a gate clock signal GCK, a gate driver output control signal (scanning signal output control signal) GOE, and a polarity inverting signal POL for controlling a polarity of a signal electric potential supplied to a data signal line.

More specifically, the video signal Dv is subjected to timing adjustment etc. in an internal memory as necessary, and is then outputted, as the digital image signal DA, from the display control circuit. The data clock signal SCK is generated as a signal constituted by pulses corresponding to respective pixels of the image indicated by the digital image signal DA. The data start pulse signal SSP that becomes high level (H level) every 1 horizontal scanning period only for a predetermined period of time is generated based on the horizontal sync signal HSY. The gate start pulse signal GSP that becomes H level every 1 frame period (1 vertical scanning period) only for a predetermined period of time is generated based on the vertical sync signal VSY. The gate clock signal GCK is generated based on the horizontal sync signal HSY. The gate driver output control signal GOE is generated based on the horizontal sync signal HSY and the control signal Dc.

Among the signals thus generated in the display control circuit, the digital image signal DA, the polarity inverting signal POL, the data start pulse signal SSP, and the data clock signal SCK are supplied to the source driver, whereas the gate start pulse signal GSP, the gate clock signal GCK, and the gate driver output control signal GOE are supplied to the gate driver.

Based on the digital image signal DA, the data clock signal SCK, the data start pulse signal SSP, and the polarity inverting signal POL, the source driver sequentially generates data signals for each horizontal scanning period as analog electric potentials corresponding to pixels values on scanning signal lines of the image indicated by the digital image signal DA. The data signals are supplied to the data signal lines (SL1 and SL2).

The gate driver generates scanning signals based on the gate start pulse signal GSP, the gate clock signal GCK, and the gate driver output control signal GOE. The scanning signals are respectively supplied to the scanning signal lines so that the scanning signal lines are selectively driven.

The data signal lines and the scanning signal lines of the display area (liquid crystal panel) are thus driven by the source driver and the gate driver so that a signal, electric potential is written from a data signal line to a pixel electrode via a TFT connected to a selected scanning signal line. Thus, a voltage whose intensity depends on the digital image signal DA is applied to the liquid crystal layer. The voltage application controls how much light emitted from the backlight is transmitted. Thus, the image indicated by the digital video signal Dv is displayed on the pixels.

Figure 45:
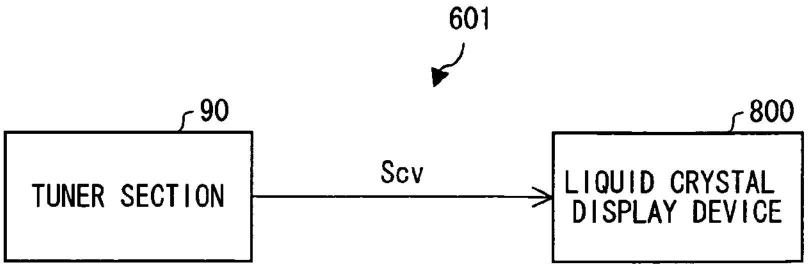
FIG. 45 is a block diagram explaining functions of the present television receiver.
Figure 46:
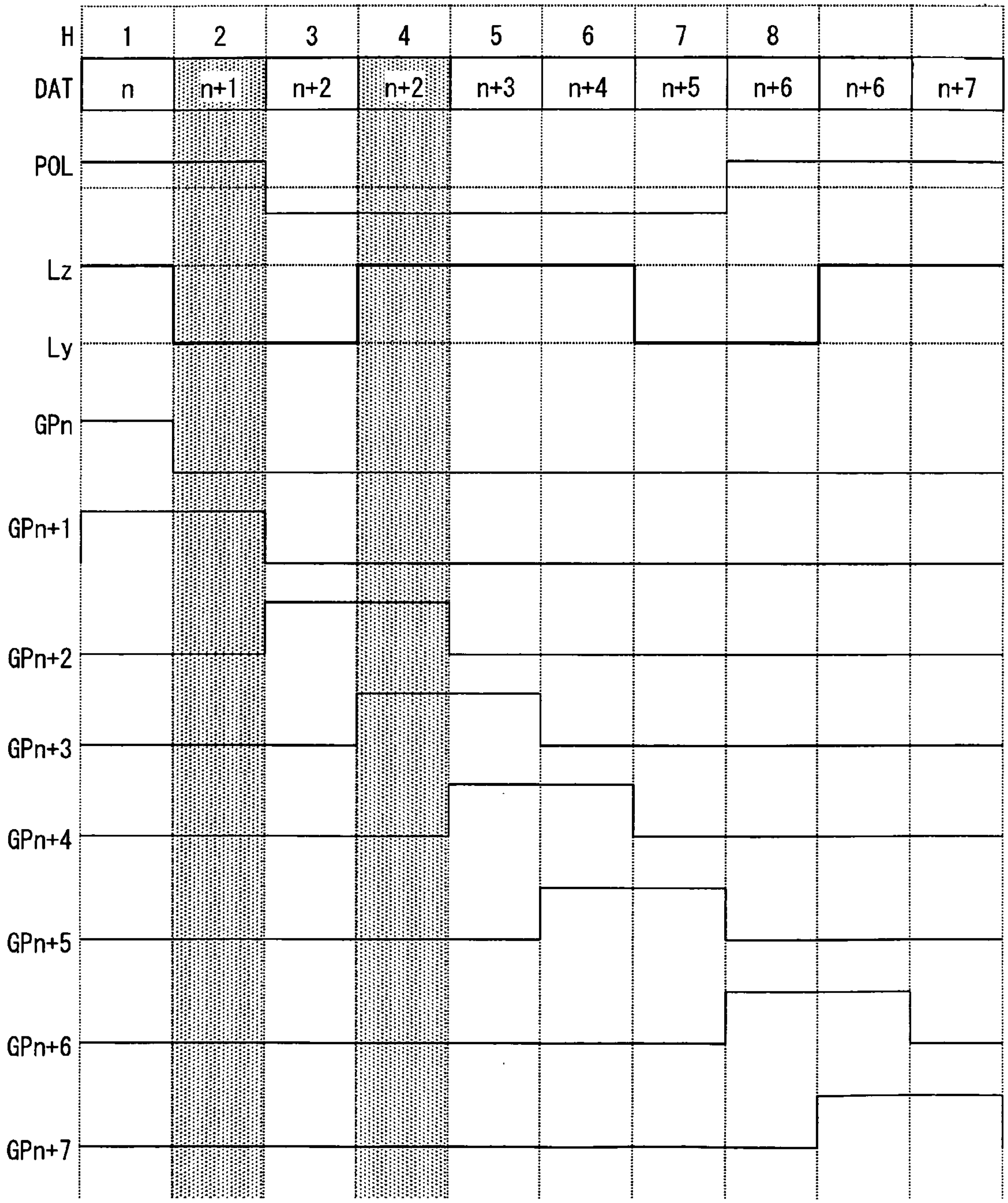
FIG. 46 is a timing chart showing exemplary driving of a conventional liquid crystal display device.

In a case where an image based on television broadcast is displayed by a liquid crystal display device 800, a tuner section 90 is connected to the liquid crystal display device 800, as shown in FIG. 45. Thus, a present television receiver 601 is configured. The tuner section 90 extracts a channel signal to be received from waves (high-frequency signals) received by an antenna (not illustrated), and converts the channel signal into an intermediate frequency signal. The tuner section 90 detects the intermediate frequency signal so as to extract a complex color video signal Scv as a television signal. The complex color video signal Scv is supplied to the liquid crystal display device 800 as described above, and the liquid crystal display device 800 displays an image based on the complex color video signal Scv.

The term "polarity of electric potential" used herein indicates whether the electric potential is greater or smaller than a reference electric potential. The term "electric potential of positive polarity" refers to an electric potential that is greater than the reference electric potential, and the term "electric potential of negative polarity" refers to an electric potential that is smaller than the reference electric potential. The reference electric potential may be Vcom (common electric potential) which is an electric potential of a common electrode (counter electrode) or may be any other electric potential.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

A liquid crystal display device of the present invention is suitably applicable to a liquid crystal television for example.

REFERENCE SIGNS LIST

G1 through G1080: Scanning signal line
Gr1 through Gr46: Group
B1 through G45: Block
P1 through P1080: Pixel
D1 through D1080: Video data
Da, Db, Dc, Dd: Dummy data
H1 through H1080: Horizontal scanning period
DS1: First dummy scanning period
DS2: Second dummy scanning period
SL1, SL2: Data signal line
601: Television receiver
800: Liquid crystal display device

The invention claimed is:

1. A liquid crystal display device comprising:

pixels each of which is provided in a display area and includes a plurality of sub-pixels; and scanning signal lines provided in the display area;

the scanning signal lines being divided into groups each of which includes a plurality of scanning signal lines, the groups being sequentially selected, signal electric potentials of an identical polarity being sequentially supplied to a data signal line while scanning signal lines belonging to a selected group are sequentially scanned horizontally, the polarity of the signal electric potentials being inverted when the selected group is changed from a preceding group to a succeeding group, which is selected subsequent to the preceding group, a plurality of dummy scanning periods being inserted between a horizontal scanning period corresponding to a last horizontal scanning in the preceding group and a horizontal scanning period corresponding to a first horizontal scanning in the succeeding group, at least one scanning signal line, which belongs to a group selected after the preceding group, is subjected to dummy scanning during each dummy scanning period so that the at least one scanning signal line is made active for a predetermined period of time, and is then deactivated, the number of scanning signal line(s) to be made active during each dummy scanning period is the same as the number of scanning signal line(s) to be made active during each horizontal scanning period, each horizontal scanning period is equal in length to each of the plurality of dummy scanning periods, and during each of the plurality of dummy scanning periods, either (i) a different one of the scanning signal lines is subjected to the dummy scanning, or (ii) only a same one of the scanning signal lines is subjected to the dummy scanning.

2. The liquid crystal display device according to claim 1, further comprising:

pixel electrodes; and storage capacitor wires respectively provided corresponding to the pixel electrodes, a single pixel electrode being provided for each of the plurality of sub-pixels, and storage capacitor wire signals respectively supplied to the storage capacitor wires controlling brightness of the plurality of sub-pixels, respectively.

3. The liquid crystal display device according to claim 2, wherein a storage capacitor wire signal supplied to a storage capacitor wire is not level-shifted during writing of a signal electric potential into a pixel electrode that forms capacitance with the storage capacitor wire, and is level-shifted to a positive side or a negative side relative to a reference electric potential in synchronization with or after end of the writing.

4. The liquid crystal display device according to claim 3, wherein a storage capacitor wire signal supplied to a storage capacitor wire that forms capacitance with one of two pixel electrodes included in a pixel is level-shifted in a direction opposite to a direction in which a storage capacitor wire signal supplied to a storage capacitor wire that forms capacitance with the other one of the two pixel electrodes is level-shifted.

5. The liquid crystal display device according to claim 3, wherein the storage capacitor wire signal has a level that is switched every predetermined period of time until one vertical scanning period elapses from the level-shift.

6. The liquid crystal display device according to claim 3, wherein the storage capacitor wire signal maintains a same level until one vertical scanning period elapses from the level-shift.

7. The liquid crystal display device according to claim 2, further comprising:

a plurality of storage capacitor main wires to which different storage capacitor wire signals are supplied, each of the storage capacitor wires being connected to any one of the plurality of storage capacitor main wires.

8. The liquid crystal display device according to claim 2, wherein:

a single storage capacitor wire is provided per gap between two pixels that are adjacent in a direction in which the data signal line extends, and the single storage capacitor wire forms capacitance with a pixel electrode disposed in one of the two pixels and forms capacitance with a pixel electrode disposed in the other one of the two pixels.

9. The liquid crystal display device according to claim 1, wherein a dummy electric potential is supplied to the data signal line during each dummy scanning period.

10. The liquid crystal display device according to claim 9, wherein a polarity of the dummy electric potential is identical to the polarity of the electric potentials in the succeeding group.

11. The liquid crystal display device according to claim 9, wherein:

video data that correspond to respective horizontal scanning of the scanning signal lines are arranged in an order identical to that of the horizontal scanning, 1st through n-th dummy data is inserted between video data corresponding to the last horizontal scanning in the preceding group and video data corresponding to the first horizontal scanning in the succeeding group, the signal electric potentials correspond to the video data, respectively, and the dummy electric potential corresponds to the dummy data.

12. The liquid crystal display device according to claim 11, wherein the dummy data is identical to the video data corresponding to horizontal scanning carried out immediately after the dummy scanning of the at least one scanning signal line subjected to the dummy scanning.

13. The liquid crystal display device according to claim 11, wherein the dummy data is identical to the video data corresponding to horizontal scanning carried out immediately before the dummy scanning of the at least one scanning signal line subjected to the dummy scanning.

14. The liquid crystal display device according to claim 1, wherein:

a time interval between start of a horizontal scanning period and start of corresponding horizontal scanning is equal to a time interval between start of a dummy scanning period and start of a corresponding dummy scanning, and a time interval between end of the horizontal scanning and end of the corresponding horizontal scanning period is equal to a time interval between end of the dummy scanning and end of the corresponding dummy scanning period.

15. The liquid crystal display device according to claim 1, wherein the at least one scanning signal line subjected to dummy scanning belongs to the succeeding group.

16. The liquid crystal display device according to claim 1, wherein the at least one scanning signal line subjected to dummy scanning includes a scanning signal line, which is a first one to be subjected to horizontal scanning in the succeeding group.

17. The liquid crystal display device according to claim 1, wherein the at least one scanning signal line subjected to dummy scanning includes a scanning signal line, which belongs to a group selected after the succeeding group.

18. The liquid crystal display device according to claim 1, wherein each of the scanning signal lines is activated in synchronization with start of corresponding horizontal scanning, and is deactivated in synchronization with end of the corresponding horizontal scanning.

19. The liquid crystal display device according to claim 1, wherein each of the scanning signal lines is activated in synchronization with start of horizontal scanning or dummy scanning carried out immediately before corresponding horizontal scanning, and is deactivated in synchronization with end of the corresponding horizontal scanning.

20. The liquid crystal display device according to claim 18, wherein the at least one scanning signal line subjected to dummy scanning is activated in synchronization with start of the dummy scanning of the at least one scanning signal line, and is deactivated in synchronization with end of the dummy scanning of the at least one scanning signal line.

21. The liquid crystal display device according to claim 19, wherein the at least one scanning signal line subjected to dummy scanning is activated in synchronization with start of horizontal scanning or dummy scanning carried out immediately before corresponding dummy scanning, and is deactivated in synchronization with end of the corresponding dummy scanning.

22. The liquid crystal display device according to claim 18, wherein a width of a gate pulse for activating each of the scanning signal lines is equal to a single horizontal scanning period.

23. The liquid crystal display device according to claim 19, wherein a width of a gate pulse for activating each of the scanning signal lines is two times as wide as a single horizontal scanning period.

24. The liquid crystal display device according to claim 2, wherein:

a timing adjustment scanning period is inserted between a predetermined horizontal scanning period and a horizontal scanning period or a dummy scanning period, which comes next after the predetermined horizontal scanning period, and a scanning signal line is subjected to timing adjustment scanning during the timing adjustment scanning period so as to be made active for a predetermined period of time, and is then deactivated.

25. The liquid crystal display device according to claim 2, wherein:

a timing adjustment scanning period is inserted between a predetermined horizontal scanning period and a horizontal scanning period or a dummy scanning period, which comes next after the predetermined horizontal scanning period, and a dummy scanning signal line provided in a non-display area is subjected to timing adjustment scanning during the timing adjustment scanning period so as to be made active for a predetermined period of time, and is then deactivated.

26. The liquid crystal display device according to claim 24, wherein the plurality of dummy scanning periods and the timing adjustment scanning period are inserted between a horizontal scanning period corresponding to last horizontal scanning in a next-to-last group and a horizontal scanning period corresponding to first horizontal scanning in a last group.

27. The liquid crystal display device according to claim 1, wherein one of the preceding group and the succeeding group includes only odd-numbered scanning signal lines, and the other one of the preceding group and the succeeding group includes only even-numbered scanning signal lines in a case where a predetermined scanning signal line in the display area is a first scanning signal line in counting.

28. The liquid crystal display device according to claim 27, wherein:

the predetermined scanning signal line and subsequent scanning signal lines in the display area are divided into blocks by borders parallel to the scanning signal lines, a group that is selected first is constituted by odd-numbered scanning signal lines included in a most upstream side block or constituted by even-numbered scanning signal lines included in the most upstream side block, the most upstream side block including the predetermined scanning signal line and being disposed at one end, a group that is selected last is constituted by odd-numbered scanning signal lines included in a most downstream side block or constituted by even-numbered scanning signal lines included in the most downstream side block, the most downstream side block being disposed at the other end, each of groups other than the group that is selected first and the group that is selected last is constituted by even-numbered scanning signal lines included in adjacent two blocks or constituted by odd-numbered scanning signal lines included in adjacent two blocks, and the groups are sequentially selected in an order from an upstream side to a downstream side.

29. The liquid crystal display device according to claim 27, wherein:

the predetermined scanning signal line and subsequent scanning signal lines in the display area are divided into blocks by borders parallel to the scanning signal lines, the preceding group includes odd-numbered scanning signal lines included in one of the blocks and the succeeding group includes even-numbered scanning signal lines included in the one of the blocks, or the preceding group includes even-numbered scanning signal lines included in one of the blocks and the succeeding group includes odd-numbered scanning signal lines included in the one of the blocks, and the groups are selected in an order from a group included in a most upstream side block to a group included in a most downstream block, the most upstream side block including the predetermined scanning signal line and being disposed at one end, and the most downstream block being disposed at the other end.

30. The liquid crystal display device according to claim 1, wherein:

a predetermined scanning signal line and subsequent scanning signal lines in the display area are divided into blocks by borders parallel to the scanning signal lines, scanning signal lines in each of the blocks constitute a group, and groups thus created are sequentially selected in an order from a group constituted by scanning signal lines in a most upstream side block to a group constituted by scanning signal lines in a most downstream side block, the most upstream side block including the predetermined scanning signal line and being disposed at one end, and the most downstream block being disposed at the other end.

31. A liquid crystal display device comprising:

a plurality of pixels each of which includes a plurality of sub-pixels;

a plurality of data signal lines; and a plurality of scanning signal lines;

signal electric potentials of a first polarity being supplied to the plurality of data signal lines during a first period constituted by a plurality of horizontal scanning periods, and signal electric potentials of a second polarity being supplied to the plurality of data signal lines during a second period constituted by a plurality of successive horizontal scanning periods, the second period being subsequent to the first period;

during each of a plurality of dummy scanning periods inserted between the first period and the second period, scanning signal lines of the same number as scanning signal lines activated in each horizontal scanning period being made active for a predetermined period of time, and being then deactivated;

each horizontal scanning period is equal in length to each of the plurality of dummy scanning periods; and during each of the plurality of dummy scanning periods, either (i) a different one of the scanning signal lines is subjected to a dummy scan, or (ii) only a same one of the scanning signal lines is subjected to the dummy scan.

32. The liquid crystal display device according to claim 31, wherein during a horizontal scanning period within the second period or after the second period, the scanning signal lines that are made active during the plurality of dummy scanning periods are made active for a predetermined period of time, and are then deactivated.

33. The liquid crystal display device according to claim 32, wherein during a horizontal scanning period within the second period which horizontal scanning period is not a first one among the horizontal scanning periods of the second period, the scanning signal lines that are active during the plurality of dummy scanning periods are made active for a predetermined period of time, and are then deactivated.

34. The liquid crystal display device according to claim 31, wherein a dummy electric potential of the second polarity is supplied to the plurality of data signal lines during the plurality of dummy scanning periods.

35. The liquid crystal display device according to claim 31, wherein during a timing adjustment scanning period inserted between a predetermined horizontal scanning period and a horizontal scanning period or a dummy scanning period, which comes next after the predetermined horizontal scanning period, scanning signal lines of the same number as scanning signal lines activated in each horizontal scanning period being made active for a predetermined period of time, and being then deactivated.

36. The liquid crystal display device according to claim 31, wherein a scanning signal line driving circuit performs interlace scanning.

37. A method for driving a liquid crystal display device which includes scanning signal lines disposed in a display area, the scanning signal lines being divided into groups each of which includes a plurality of scanning signal lines, the groups being sequentially selected, and signal electric potentials of an identical polarity being sequentially supplied to a data signal line while scanning signal line belonging to a selected group are sequentially scanned horizontally, the method comprising:

inverting the polarity of the signal electric potentials when the selected group is changed from a preceding group to a succeeding group, which is selected subsequent to the preceding group, inserting a plurality of dummy scanning periods between a horizontal scanning period corresponding to last horizontal scanning in the preceding group and a horizontal scanning period corresponding to first horizontal scanning in the succeeding group, causing at least one scanning signal line, which belongs to a group selected after the preceding group, to be subjected to dummy scanning during each of the plurality of dummy scanning periods so that the at least one scanning signal line is made active for a predetermined period of time, and is then deactivated, the number of scanning signal line(s) to be made active during each dummy scanning period is the same as the number of scanning signal line(s) to be made active during each horizontal scanning period, each horizontal scanning period is equal in length to each dummy scanning period, and during each of the plurality of dummy scanning periods, either (i) a different one of the scanning signal lines is subjected to the dummy scanning, or (ii) only a same one of the scanning signal lines is subjected to the dummy scanning.

38. A television receiver comprising:

a liquid crystal display device as set forth in claim 1; and a tuner section that receives television broadcast.

* * * * *